US008430196B2

(12) United States Patent
Halliday

(10) Patent No.: US 8,430,196 B2
(45) Date of Patent: Apr. 30, 2013

(54) DEFORMABLE ARMORED LAND VEHICLE

(75) Inventor: Donald R. Halliday, Powell, OH (US)

(73) Assignee: Hal-Tech Limited, Plain City, OH (US)

( * ) Notice: Subject to any disclaimer, the term of this patent is extended or adjusted under 35 U.S.C. 154(b) by 0 days.

(21) Appl. No.: 13/293,271

(22) Filed: Nov. 10, 2011

(65) Prior Publication Data

US 2012/0181100 A1 Jul. 19, 2012

Related U.S. Application Data

(63) Continuation-in-part of application No. 12/344,630, filed on Dec. 29, 2008, now Pat. No. 8,205,703.

(51) Int. Cl.
*B62D 23/00* (2006.01)
*F41H 5/14* (2006.01)

(52) U.S. Cl.
USPC ............... 180/89.1; 296/187.07; 296/193.04; 89/36.09; 89/929

(58) Field of Classification Search .............. 180/89.1, 180/89.11; 280/748, 785; 296/187.07, 193.01, 296/193.03, 193.04, 193.05, 19, 37.6; 89/36.05, 89/36.07, 36.08, 36.09, 929; 2/2.5, 6.6, 6.7; 114/61.1; D12/311, 312; 440/12.56, 12.63, 440/12.64
See application file for complete search history.

(56) References Cited

U.S. PATENT DOCUMENTS

| | | | | |
|---|---|---|---|---|
| 4,492,282 A | * | 1/1985 | Appelblatt et al. | 180/68.1 |
| 7,228,927 B2 | * | 6/2007 | Hass et al. | 180/65.25 |
| 2007/0186762 A1 | * | 8/2007 | Dehart et al. | 89/36.09 |
| 2010/0011948 A1 | | 1/2010 | Johnson et al. | |
| 2011/0148147 A1 | | 6/2011 | Tunis et al. | |
| 2012/0174746 A1 | | 7/2012 | Mills et al. | |
| 2012/0193940 A1 | * | 8/2012 | Tunis et al. | 296/187.07 |
| 2012/0297966 A1 | * | 11/2012 | Hunn et al. | 89/36.02 |
| 2012/0312607 A1 | * | 12/2012 | Joynt et al. | 180/54.1 |

FOREIGN PATENT DOCUMENTS

WO WO2010123606 A1 10/2010

OTHER PUBLICATIONS

Burrell & Soltesz, HMMWV Improvements "Monster Garage" program, U.S. Army Research, Development and Engineering Commmand, Tank Automotive Research, Development, and Engineering Center, pp. 1-6, retreival date: Jun. 6, 2012, available at http://www.dtic.mil/dtic/tr/fulltext/u2/a494483.pdf.

(Continued)

*Primary Examiner* — Joseph Rocca
(74) *Attorney, Agent, or Firm* — James R. Klaiher; Pryor Cashman LLP

(57) ABSTRACT

An armored land vehicle comprising a first hull portion and an engine compartment which form a central chassis (CC) adapted to receive second hull portions on both sides and the rear of the CC. The CC and hull portions have generally V-shaped undersides with slanted, upwardly extending sides to create multiple blast venting paths to deflect blast energy away from the vehicle occupants. These blast paths comprise one or more blast vents through the vehicle for further reducing occupant exposure to blast energy. The engine compartment and front and rear tractive units can comprise an open framework, allowing significant under vehicle blast venting between the hull portions, through the engine compartment, and around the hull portions, thereby increasing survivability of the crew. The hull portions can be designed to rotate and/or be frangible to increase the blast-venting through the vehicle.

31 Claims, 50 Drawing Sheets

OTHER PUBLICATIONS

Burrell & Soltesz, HMMWV Improvements "Monster Garage" program, U.S. Army Research, Development and Engineering Command, Tank Automotive Research, Development, and Engineering Center, pp. 1-6, retrieval date: Jun. 6, 2012, available at http://www.dtic.mil/dtic/tr/fulltext/u2/a504192.pdf.

Feickert, Joint Light Tactical Vehicle (JLTV) Background and Issues for Congress, Jul. 18, 2011.

U.S. Appl. No. 12/807,818 to George C. Tunis et al. See Applicant's Preliminary Amendment entered Aug. 23, 2011.

U.S. Appl. No. 12/807,818 to George C. Tunis et al. See Examiner's Non-Final Office Action entered Nov. 8, 2012.

\* cited by examiner

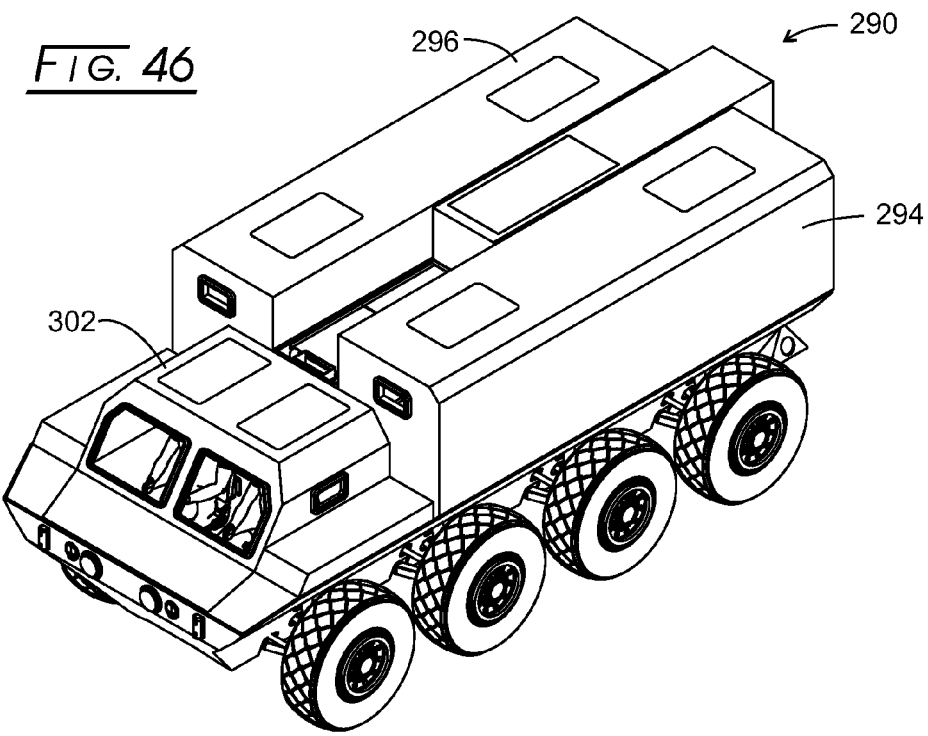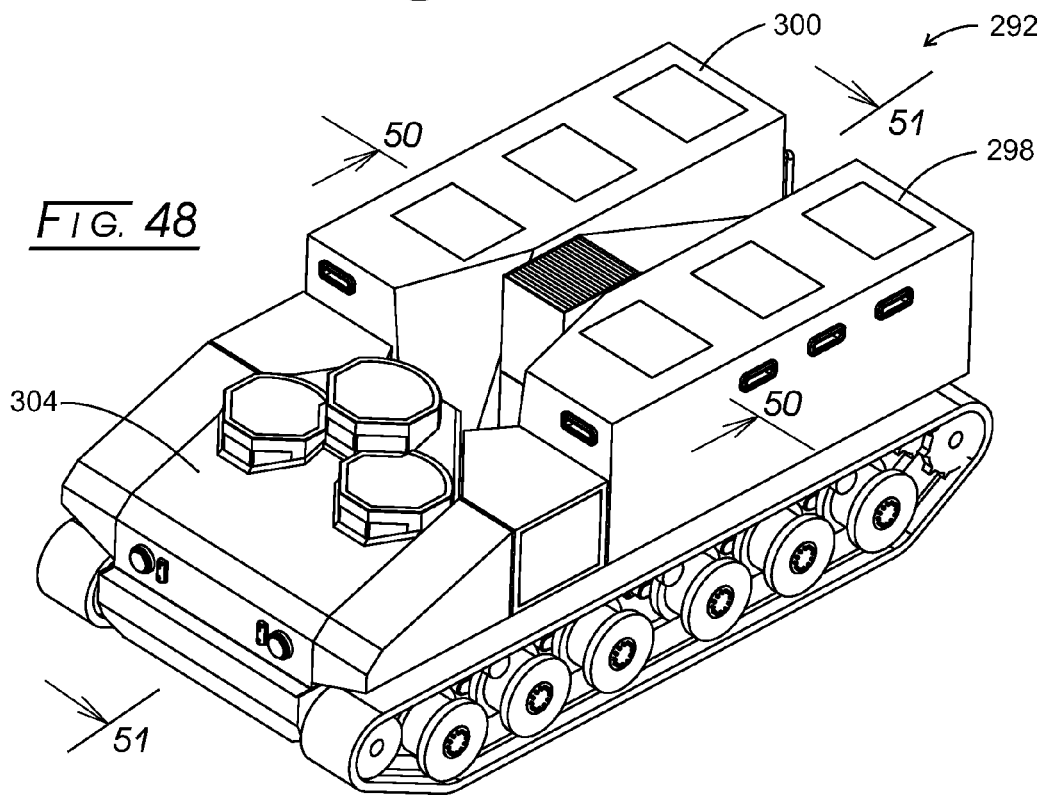

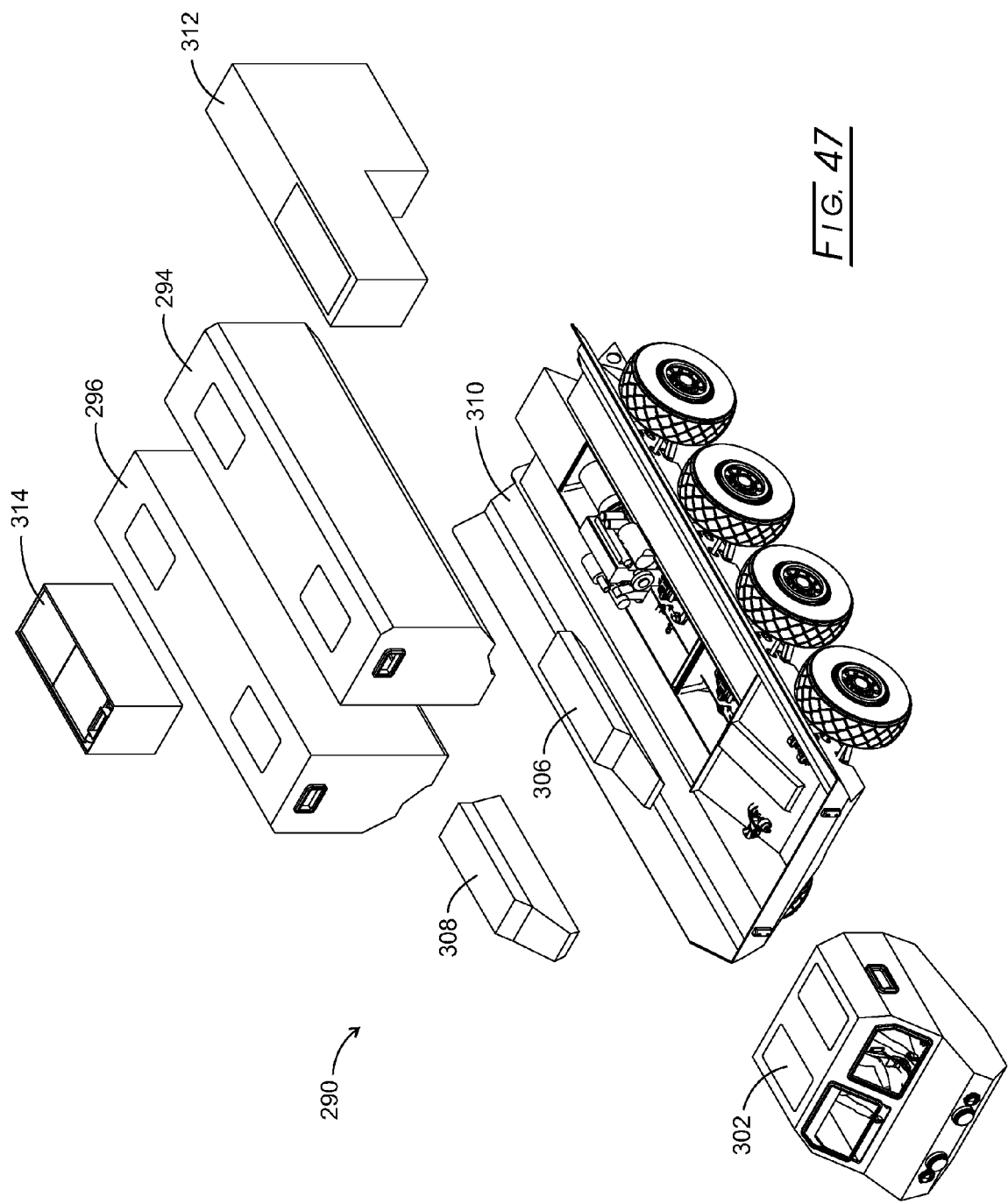

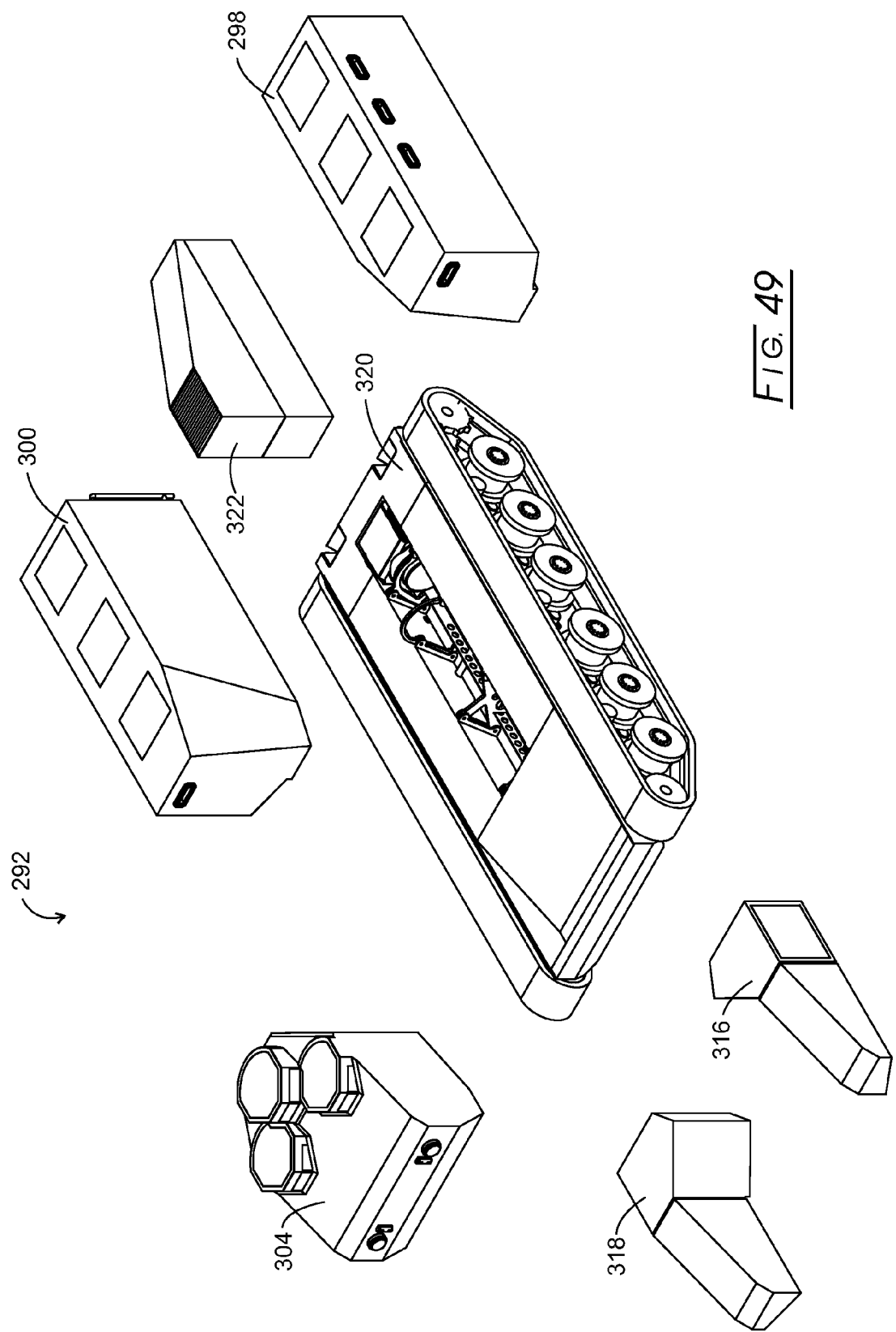

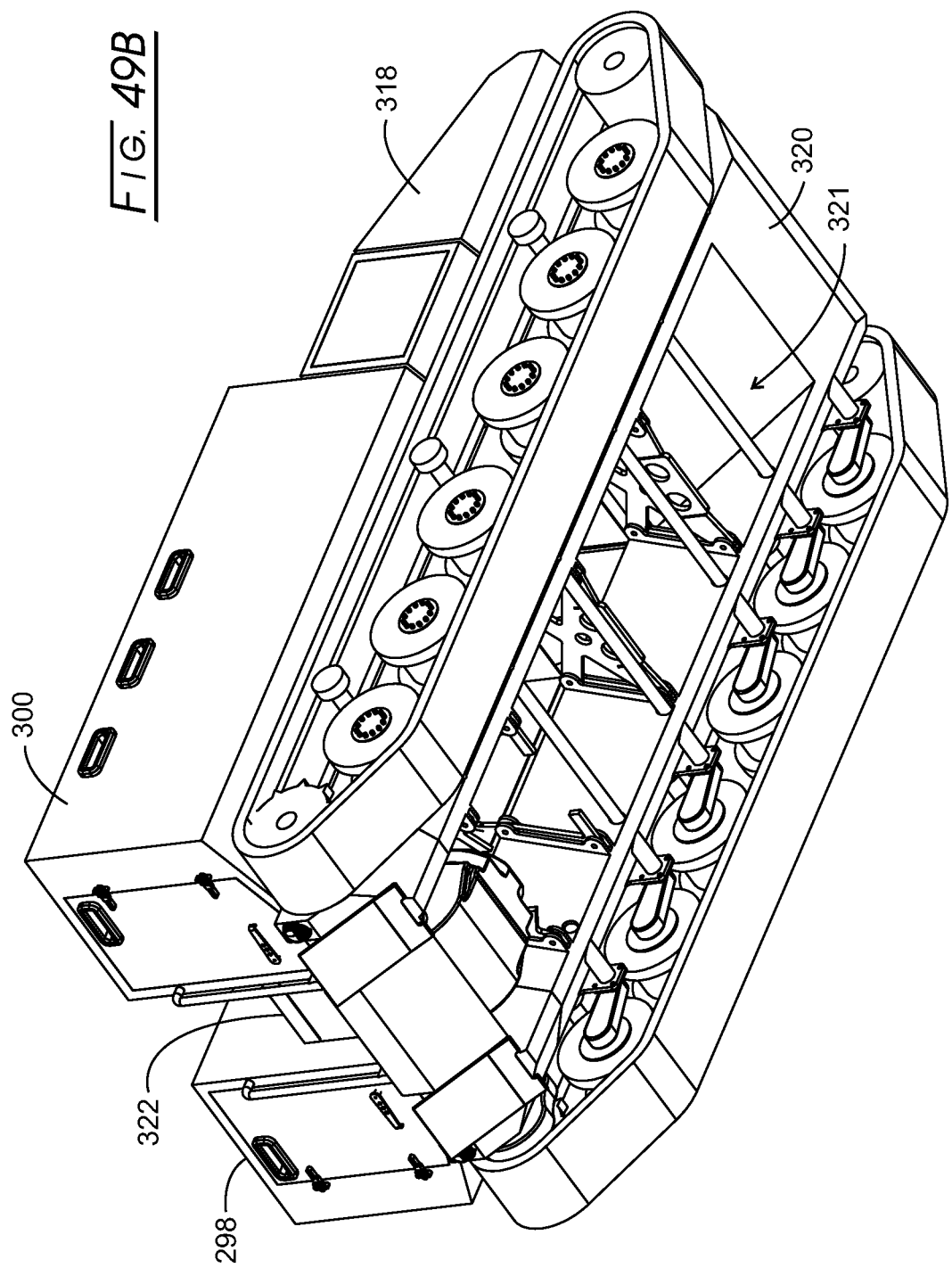

DEFORMABLE ARMORED LAND VEHICLE

CROSS-REFERENCE TO RELATED APPLICATIONS

This application is a continuation-in-part of application Ser. No. 12/344,630 filed on Dec. 29, 2008, which issued as U.S. Pat. No. 8,205,703 on Jun. 26, 2012; and PCT application PCT/US09/69122, filed on Dec. 22, 2009; the disclosures of both applications being incorporated herein by reference.

STATEMENT REGARDING FEDERALLY SPONSORED RESEARCH

Not applicable.

BACKGROUND

The present disclosure relates to motorized vehicles suitable for military use and more particularly to a modular military vehicle that can also be adapted for non-military uses and law enforcement purposes.

A multi-purpose vehicle, suitable for military, homeland security, border patrol, disaster/emergency response, and other uses, should be versatile. It should be able to protect the operators and be highly deliverable to any site, adaptable, maintainable, and agile. Also, it should be armored and operable over rugged terrain and hostile environments, including, for example, desert, jungle, and frigid conditions. Such vehicle further should be highly maneuverable.

It is such a vehicle that the present disclosure is addressed.

BRIEF SUMMARY

The disclosed modular vehicle is able to be compartmentalized through modular, severable, frangible sub-systems or components with a view to reducing effects of under-vehicle shock/blast, ballistic, and other undesirable kinetic forces acting on the vehicle occupants.

Modularity includes a central driver module and engine module with chassis, which form a central chassis module or CCM. The driver module is capable of carrying, for example, 1 or more occupants, and can be common in design regardless of function and/or use. Pods, then, can be attached to the CCM to provide different functions including, for example, troop carrier, ambulance, cargo, etc. Such design allows the army/agency to transport pods and not fully dedicated (i.e., single use) vehicles. Pods are more readily transported to other field areas of need, so long as at the new site has the means to attach/detach such pods to the CCM. For present purposes, "multipurpose pod" means a pod that can function as a trooper carrier, ambulance (e.g. litter for a person in need of medical attention), cargo carrier, and the like. There really is no limitation on what a multipurpose pod can transport and, thus, such term should be construed broadly.

In some vehicle variants, the pods may be permanently attached to create a single occupant space. The principles behind the design of the pods remain the same whether attached or integrated into the vehicle.

The CCM architecture has a blast deflecting V-shaped hull that directs blast energy around each of the occupant areas. As used herein "V-shaped" means that the hull has a relatively narrow flat bottom with upwardly extending sides to create a generally V-shape. Such upwardly extending sides may be flat, curvilinear, or a combination of flat and curvilinear surfaces. For present purposes, such upwardly extending sides aid in directly blast energy upwardly around occupant spaces. Both curvilinear and V-shape will be used herein for convenience with the understanding of their meaning as set forth herein.

This V-shape hull combined with an open framework for the engine module creates multiple blast paths around and through the vehicle, which significantly increases protection in a blast event. For definitional purposes, curvilinear shaped, as used herein, includes V-shaped, which includes asymmetric V, a V-shape that has curved sides, combination of V shapes, multifaceted, or any other shape that reduces the strike face and deflects the blast effectively around the occupant spaces of the vehicle. Unlike in existing vehicles, the flat surface area on the underside of the chassis below the pods/modules facing the ground now can be minimized, reducing the likelihood that the vehicle is turned over or that this surface area is penetrated in a blast event. Additionally the CCM incorporates materials, component frangibility, and energy absorption systems to increase occupant protection by reducing energy imparted onto the occupants and minimizing fragmentation effects.

Providing one or more chimneys through the vehicle may enhance this shape. For present purposes, a "chimney" is a blast energy venting path through the vehicle—not just around the modules/pods—in order to reduce occupant exposure to such blast energy. For example, the engine module, and front and rear tractive units, can manufactured with an open framework, allowing significant under vehicle blast venting between the side pods, through the engine module, and forward and rearward of the vehicle; thereby, increasing survivability of the crew. The pods can be designed to rotate and/or be frangible to increase the blast-venting path through and around the vehicle. Such blast energy venting through the engine module is a "chimney" for present purposes In a mid engine variant, placing the engine module close to the center of the vehicle between the side pods reduces the possibility of these components being damaged and disabling the vehicle with small arms fire. By simply creating small top and rear armored panels these drive elements become well protected. In summary, this open framework design allows for excellent blast venting and provides good small arms fire protection.

Engine (or motor) and gearbox together are separate and located to the front, side, or rear of the driver module. This design isolates heat, noise, fumes etc., from the driver module and personnel therein significantly increasing the ability of the occupants to perform their duty when they leave the vehicle. Additionally, where possible, locating the cooling and engine air inlet high allows for less contamination of air with dust, and when using the vehicle in hot environments this high inlet position allows the air temperature to the cooling systems to be substantially lower than using air adjacent to the road surface, etc The basic design admits of carrying from 1 to 5 people. Additional crew can be carried in additional occupant pods at the rear of the CCM or the wheelbase can be increased to extend the length of the side occupant pods and the track width can be increased to extend the width of the vehicle.

Each person in the vehicle further can be fitted with a helmet protective collar, such as is used in high speed automobile racing, to help reduce acceleration effects on the lower neck during an explosion. Similarly, the occupants can wear an extended rear ballistic panel (SAPI panels—small arms protection inserts) to allow for increased protection and also to act as helmet support (with straps) to avoid the possible separation of the top spinal cord in the event of extreme accelerations on the head relative to the body. This extension located behind the helmet can serve three functions. The first function is to act as a ballistic barrier for the area of the neck and upper torso. The second function is to serve as helmet support should the soldier be exposed to forces, which may serve to separate the head from the spinal cord in a vehicular accident or similar. Third, soldiers' helmets can often withstand direct rounds on the helmet, but it is desirable for there to be some means to reduce the energy the neck experiences, so that any additional support from the lower torso will help the soldier survive the impact of this round on a helmet. It is thought that this SAPI panel will be secured with Velcro® into position within the soldier's ballistic vest and with the soldiers' ballistic collar. It is thought that a pivot at the top of this extended SAPI panel should be incorporated to allow the head to be turned easily and with comfort.

The military vehicle advantages carry over to law enforcement utilization of the disclosed vehicle. For present purposes, "law enforcement" purposes comprehends (non-military) traditional law enforcement (for example, local police, state police, and the like), homeland security including border patrol and anti-terrorist uses, disaster/emergency uses, and other like non-military law enforcement uses. Thus, law enforcement, for present purposes, includes rescue and emergency uses.

The modular vehicle disclosed herein also has a commercial application wherein the design results in a more fuel efficient vehicle because of the increased aerodynamic efficiency and reduction of weight (no side pods—narrow CCM). Having removable side pods will allow the user to only use the pods that are needed at that time. With the resultant weight reduction and narrow aerodynamic shape, fuel economy is improved. Typical US pickups are adaptable as multi-use vehicles carrying 4 to 5 people and cargo. The disclosed modular vehicle achieves such uses with a side-to-side split of functionality. That is, the modular vehicle has a CCM capable of carrying 2 people and which is common in all configurations. The side pods, which attach to this CCM, have different functions including, for example, carrying people in people pods on a single side or both, carrying cargo in pods that are relatively low to the ground and tall in height, sleeping pods, etc. If required, as with the military design, the commercial modular vehicle can include 4-wheel drive.

The driver module can be narrow and aerodynamic with aerodynamic suspension attachment legs and wheel aerodynamic pods to reduce drag. The rear aerodynamic pods can be removed when adding any side pod, which also will incorporate an aerodynamic covered surface.

BRIEF DESCRIPTION OF THE DRAWINGS

For a fuller understanding of the nature and advantages of the present modular vehicle, reference should be had to the following detailed description taken in connection with the accompanying drawings, in which:

FIG. 19 is an isometric view of the modular military vehicle fitted with side armament that includes missiles, and a rear storage module for carrying, for example, extra armament, missiles, or the like;

FIG. 46 is an isometric view of a tracked vehicle embodiment of the modular military vehicle;

FIG. 47 is an exploded view of the tracked vehicle of FIG. 46;

FIG. 48 is an isometric view of an alternate embodiment of the tracked vehicle embodiment;

FIG. 49 is an exploded view of the an alternate embodiment of the tracked vehicle embodiment of FIG. 48;

FIG. 49B is an underside view showing the open framework of the CCM as applied to a tracked vehicle;

Figure 1:
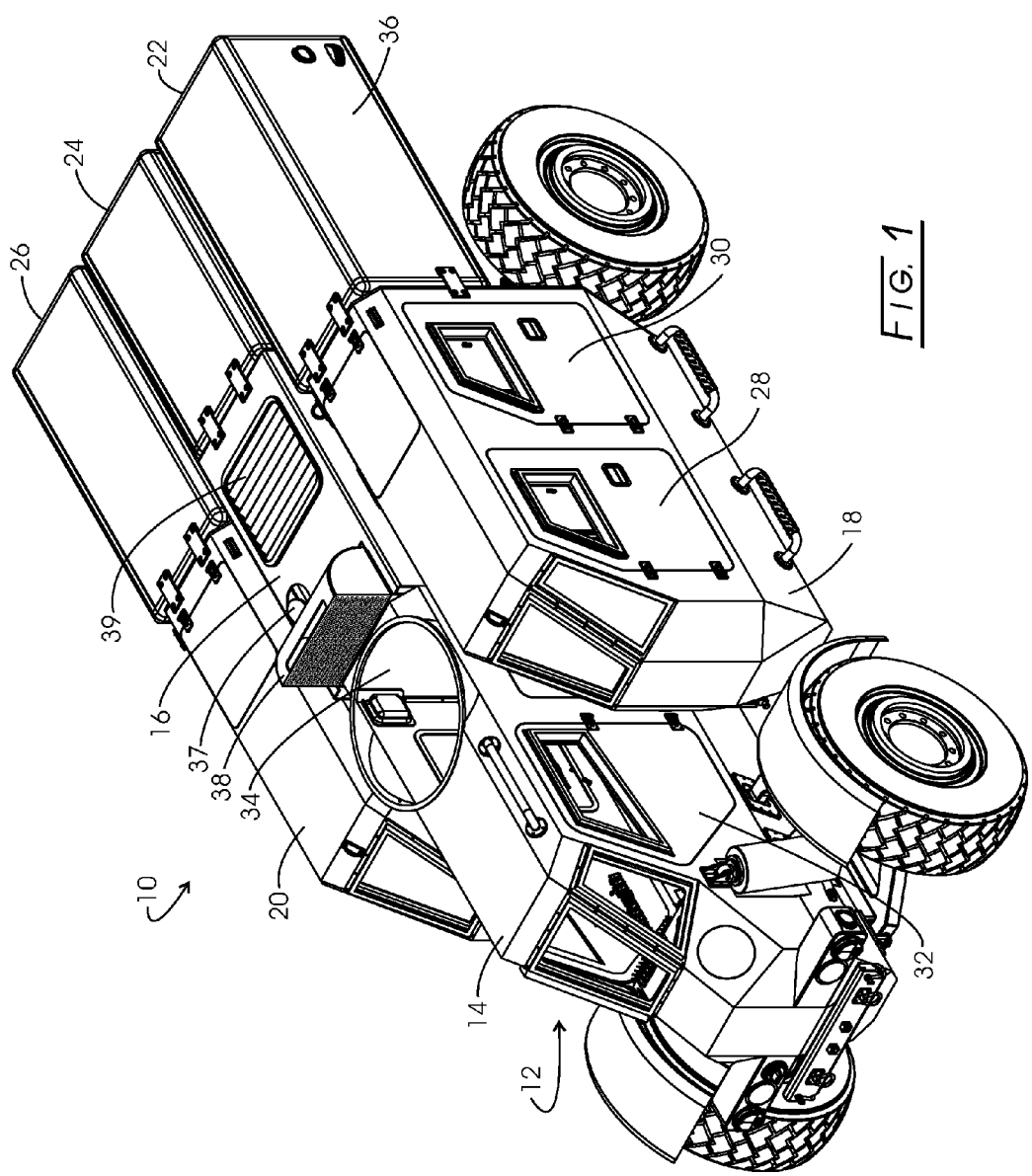
FIG. 1 is an isometric view of the modular military vehicle carrying a pair of occupant side pods and 3 cantilevered cargo pods.

The drawings will be described in greater detail below. Like components will carry the same numerical identification in different drawings and embodiments.

DETAILED DESCRIPTION

The disclosed modular vehicle primarily is designed for military use to reduce occupant injury during an under-vehicle blast event. "Blast events" for present purposes primarily are under vehicle blasts (e.g., roadside blasts), which also include roadside, blasts adjacent to the vehicle. For such use, however, the modular vehicle needs to be readily transported by air (e.g., cargo plane, helicopter, etc.) to remote hostile territory; withstand explosive blasts, bullets, and like insults; be easy to maintain and repair; readily convertible for cargo use, troop transport, wounded soldier (ambulance) transport; provide cover and support for ground soldier advancement; and the like. The disclosed modular vehicle accomplishes each of these tasks and more, as the skilled artisan will appreciate based on the present disclosure. Its design flexibility further enables the disclosed modular vehicle to be adapted for passenger use, civilian ambulance use, civilian cargo use, and the like.

Referring initially to FIGS. 1-5, a modular military vehicle, 10, is shown to include a central chassis module or CCM, 12 (see FIG. 18), composed of a driver module, 14, and an engine module, 16, which contains a powertrain for powering vehicle 10. Vehicle 10 also includes two side pods, 18 and 20, and three rear pods, 22, 24, and 26. Equally these three pods could be a single pod across the rear of the vehicle. In these figures, side pods 18 and 20 carry personnel, while rear pods 22, 24, and 26 carry cargo. Vehicle suspension, steering, wheels/tires, transmission, headlights, windows (glass or polymer, often bullet-proof), and the like will be provided in conventional fashion adapted to the intended use of vehicle 10. Driver module 14 and side modules 18 and 20 all are fitted with doors, such as doors, 28 and 30, on side pod 18, and a door, 32, on driver module 14, for ingress and egress of personnel. Driver module 14 is adapted for in-line front-to-back seating of two personnel with the driver entering module 14 through door 32 and the rear personnel entering module 14 via an overhead opening, 34 or through door 32 without the driver in position and the driver seat having the capacity to tilt forward. Access to cargo modules 22, 24, and 26 can be gained by side or rear doors, such as, for example, a side door, 36, for module 22. Desirably, driver module 14 has a rear bulkhead to allow for ease of building the internal elements of the module 14.

Figure 9:
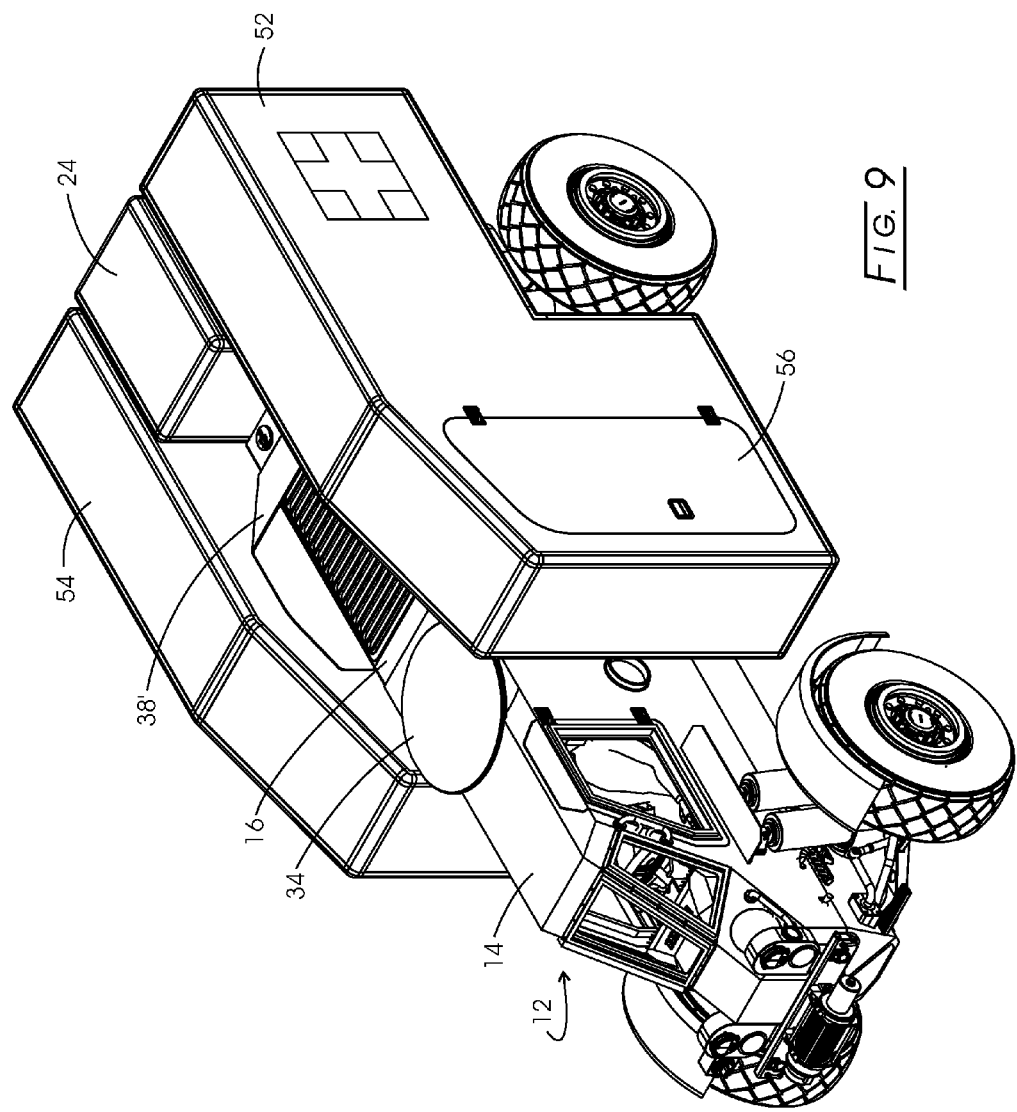
FIG. 9 is an isometric view of the modular military vehicle fitted with ambulance side pods.
Figure 10:
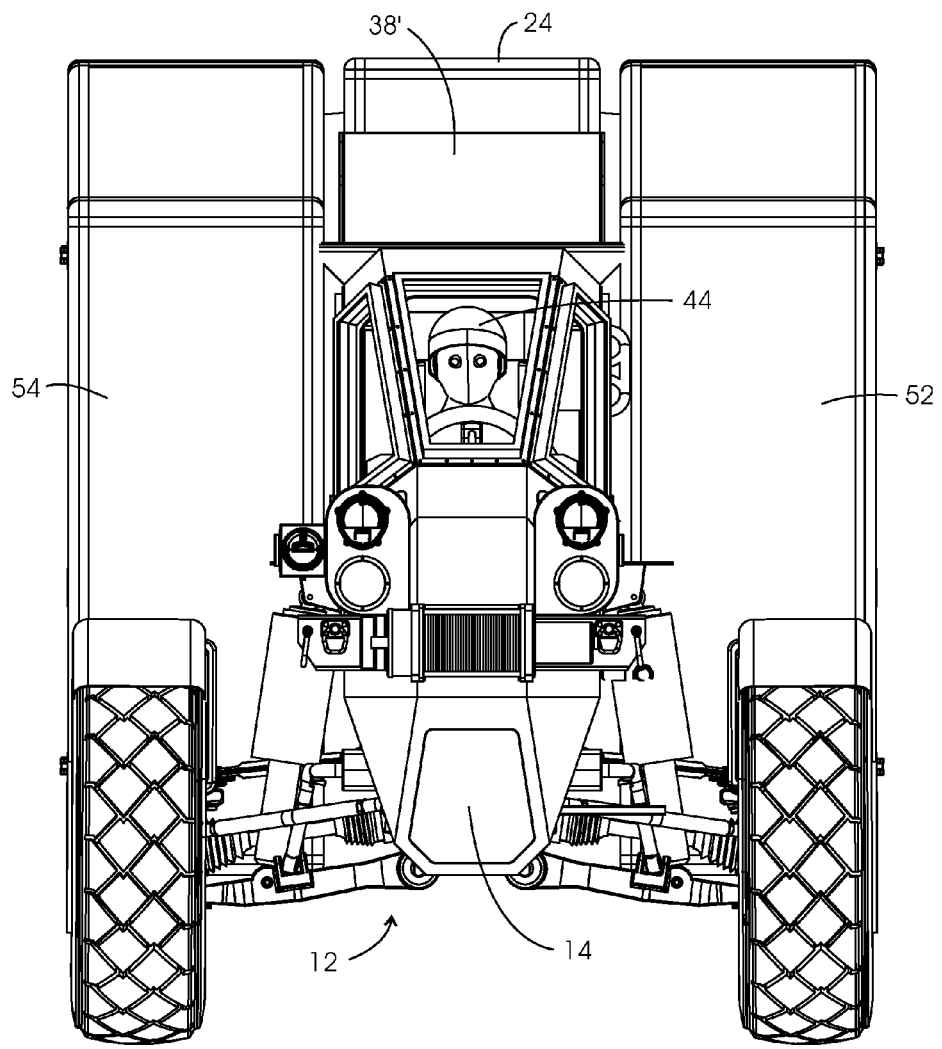
FIG. 10 is a front view of the modular ambulance vehicle of FIG. 9.
Figure 11:
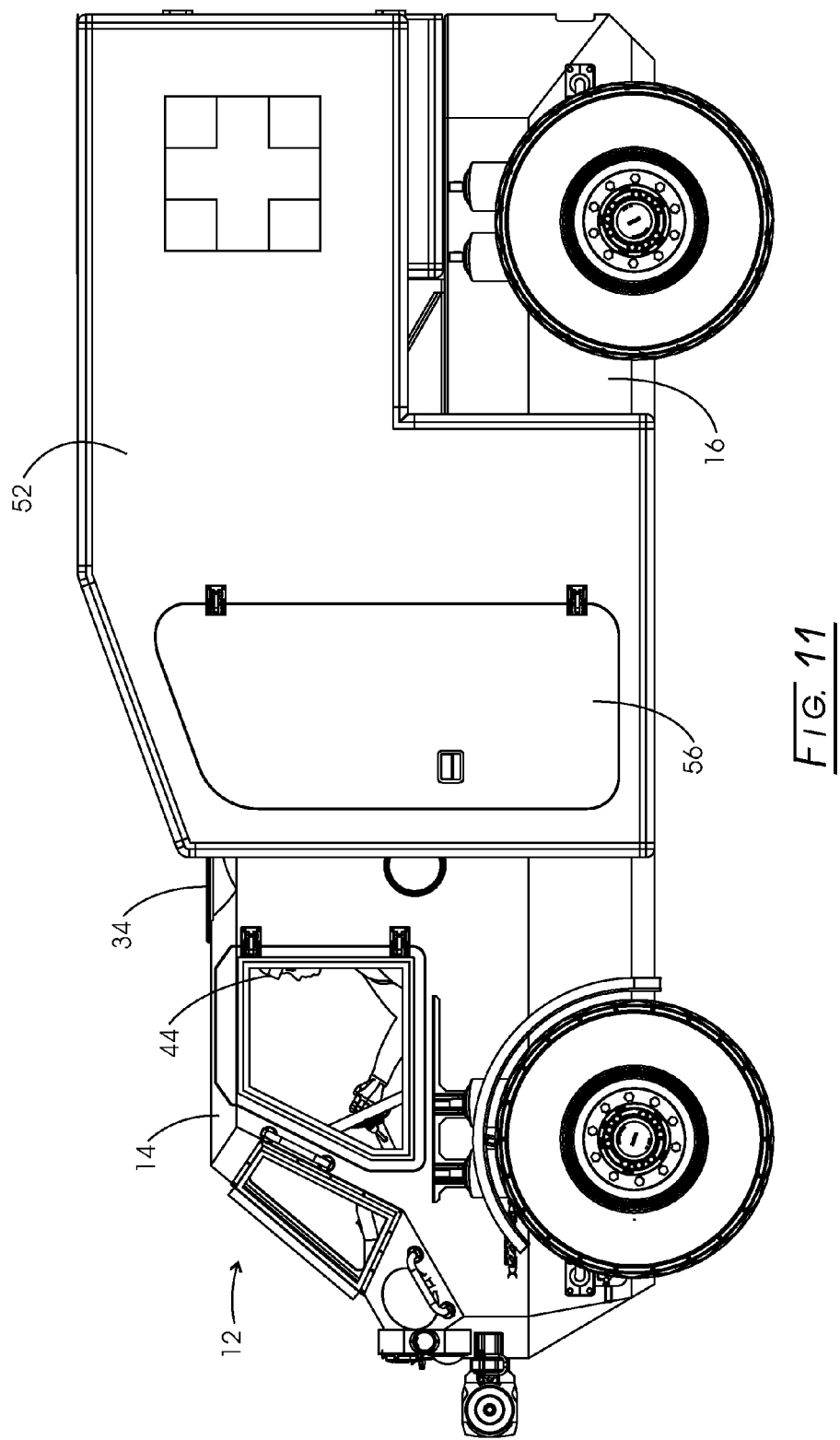
FIG. 11 is a side view of the modular ambulance vehicle of FIG. 9.
Figure 12:
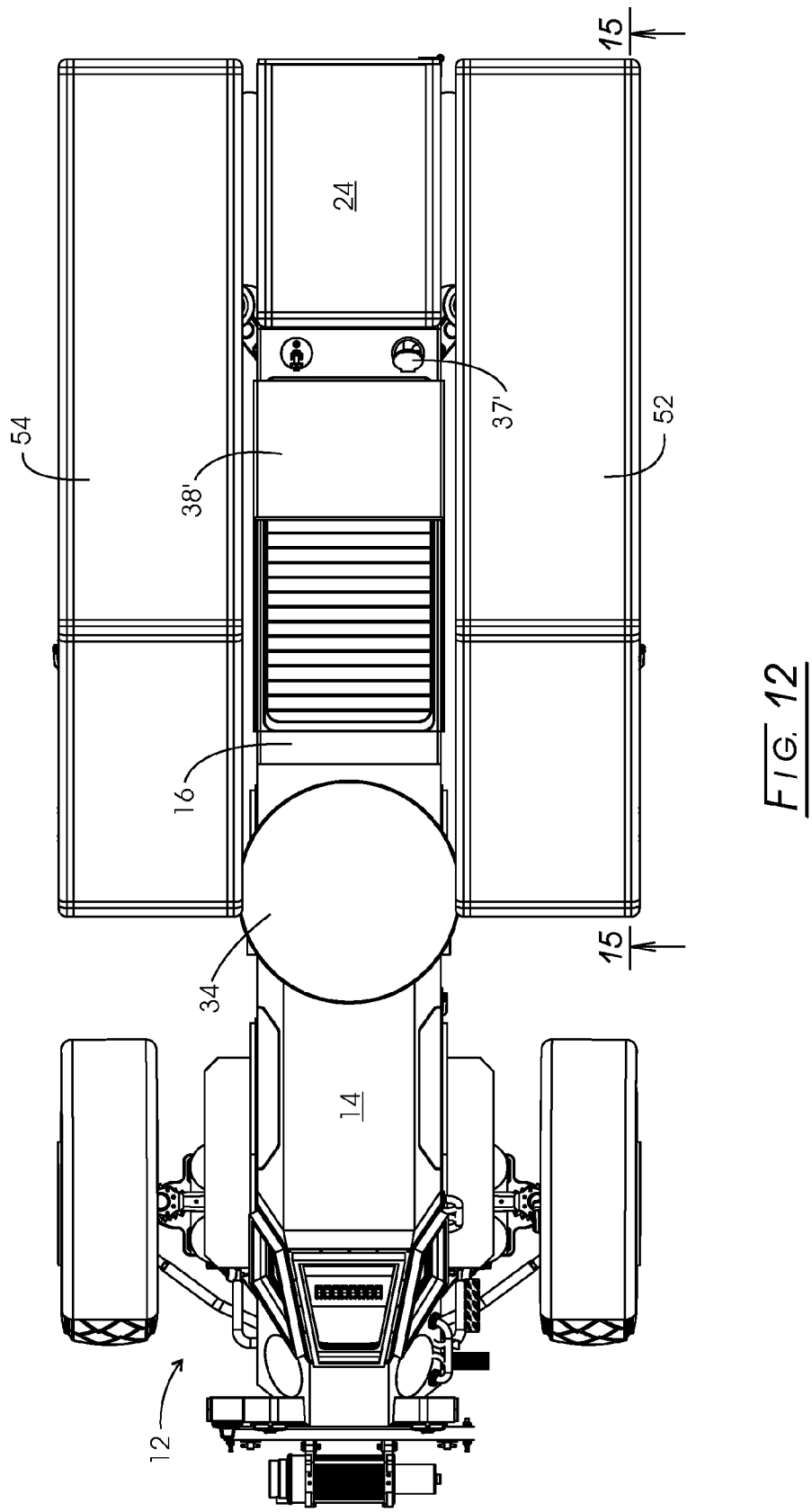
FIG. 12 is a top view of the modular ambulance vehicle of FIG. 9.

A retractable/extendable cooling and engine air inlet duct, 38, is seen in an extended position from the top of engine module 16 (two engine configuration forms shown in FIG. 1 and FIG. 9). Air inlet duct 38 can be retracted or removed. The air vent location atop modular vehicle 10 keeps it above much of the dust created by vehicle 10 and events occurring on the ground in the vicinity of vehicle 10. An exhaust port, 37, for the engine exhaust can be disposed rearward of air inlet 38 or air can exit down over the engine and exit via holes away from the CCM. In one configuration, a grate, 39, allows air to exit the engine compartment. Not only will air be cleaner atop vehicle 10, but it will be cooler than air next to or underneath vehicle 10 particularly when in a hot environment. Such air inlet and exhaust ports also could be located in the sides of engine module 16 close to the top and these same benefits realized. For present purposes, the air inlet and/or exhaust ports are located "about the top" of the engine module by being located in the top of the module or in a side of the module very close to the top thereof.

Figure 2:
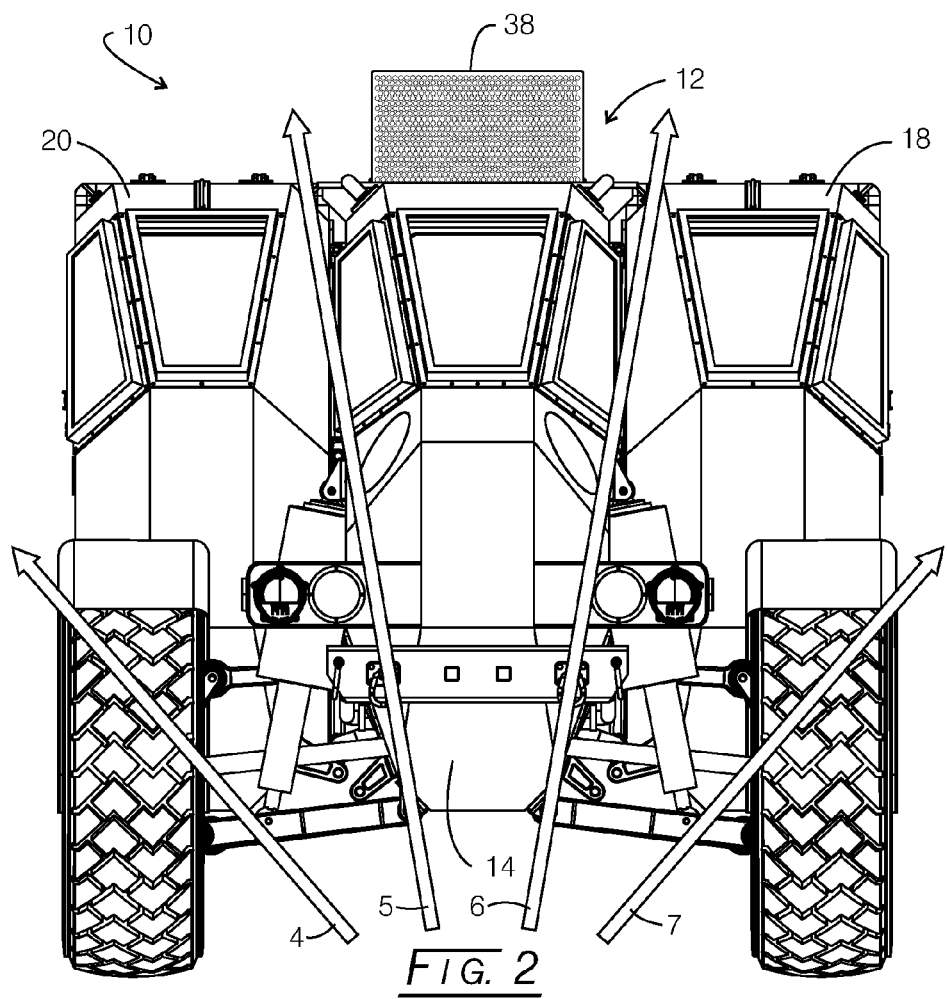
FIG. 2 is a front view of the modular military vehicle of FIG. 1.

The bottoms of each module can be designed with upward slanting sides to aid in deflecting any blasts occurring from underneath modular military vehicle 10 to minimize damage. This under-vehicle blast energy can dissipate upward through the vehicle center and outwardly in more of a conventional format on either side of the vehicle. Arrows 4, 5, 6, and 7 in FIG. 2 represent blast energy paths along which the disclosed vehicle design should urge such blast energy to follow; around the vehicle for arrows 4 and 7, and through the vehicle for arrows 5 and 6. Such blast energy paths avoid direct impact on vehicle occupants. Such blast energy arrows will be used in the drawings as illustrative blast energy paths, but they should not be construed as limiting the disclosure, as such disclosed blast energy paths may not be the exclusive blast energy paths or that all such paths are followed in each blast event or that the blast energy may follow some different paths.

Figure 2A:
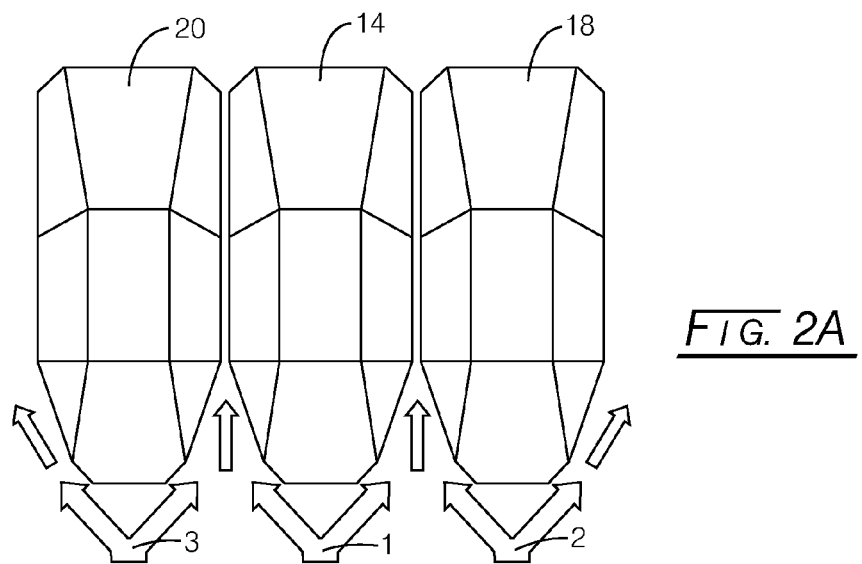
FIG. 2A is a simplified schematic view of the modular military vehicle of FIG. 2 showing the blast venting path resulting from the V-design of the bottoms of the side pods and driver module in this case showing blast venting between the CCM and the side pods shown.
Figure 2B:
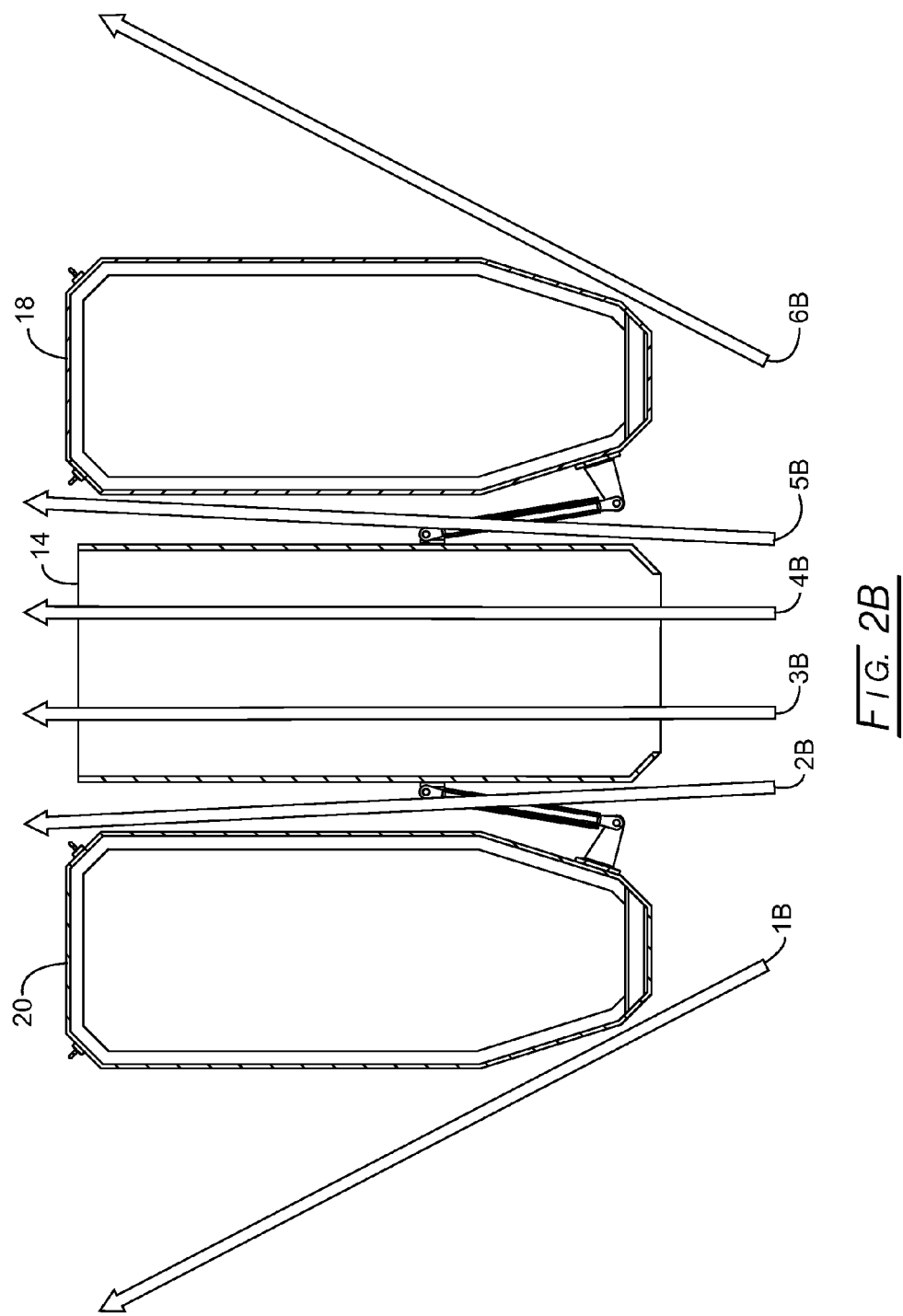
FIG. 2B is a simplified schematic sectional view of the modular military vehicle showing the blast venting paths, not only around the pods and CCM, but also through the open framework of the engine module (a blast venting chimney)
Figure 3:
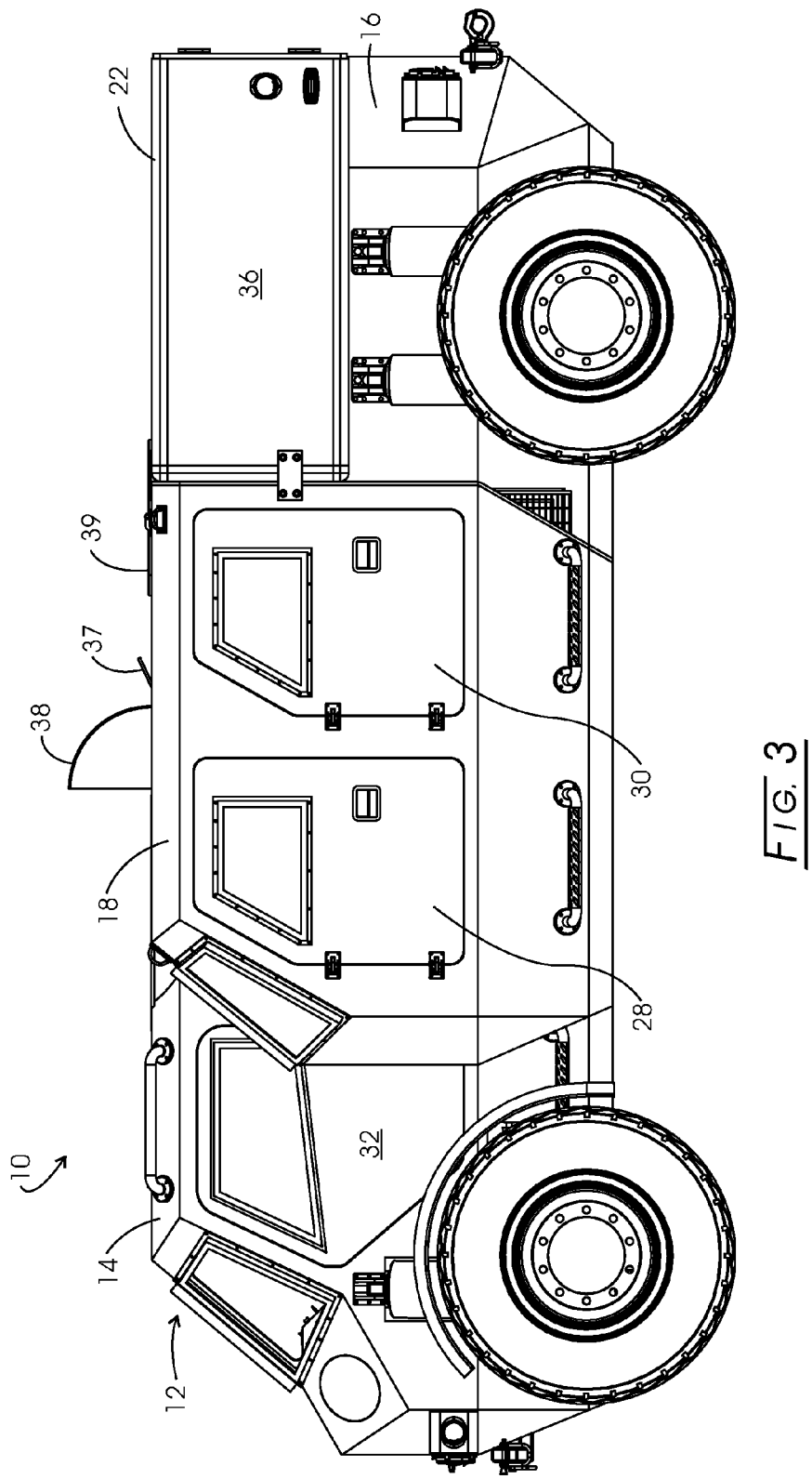
FIG. 3 is a side view of the modular military vehicle of FIG. 1.
Figure 4:
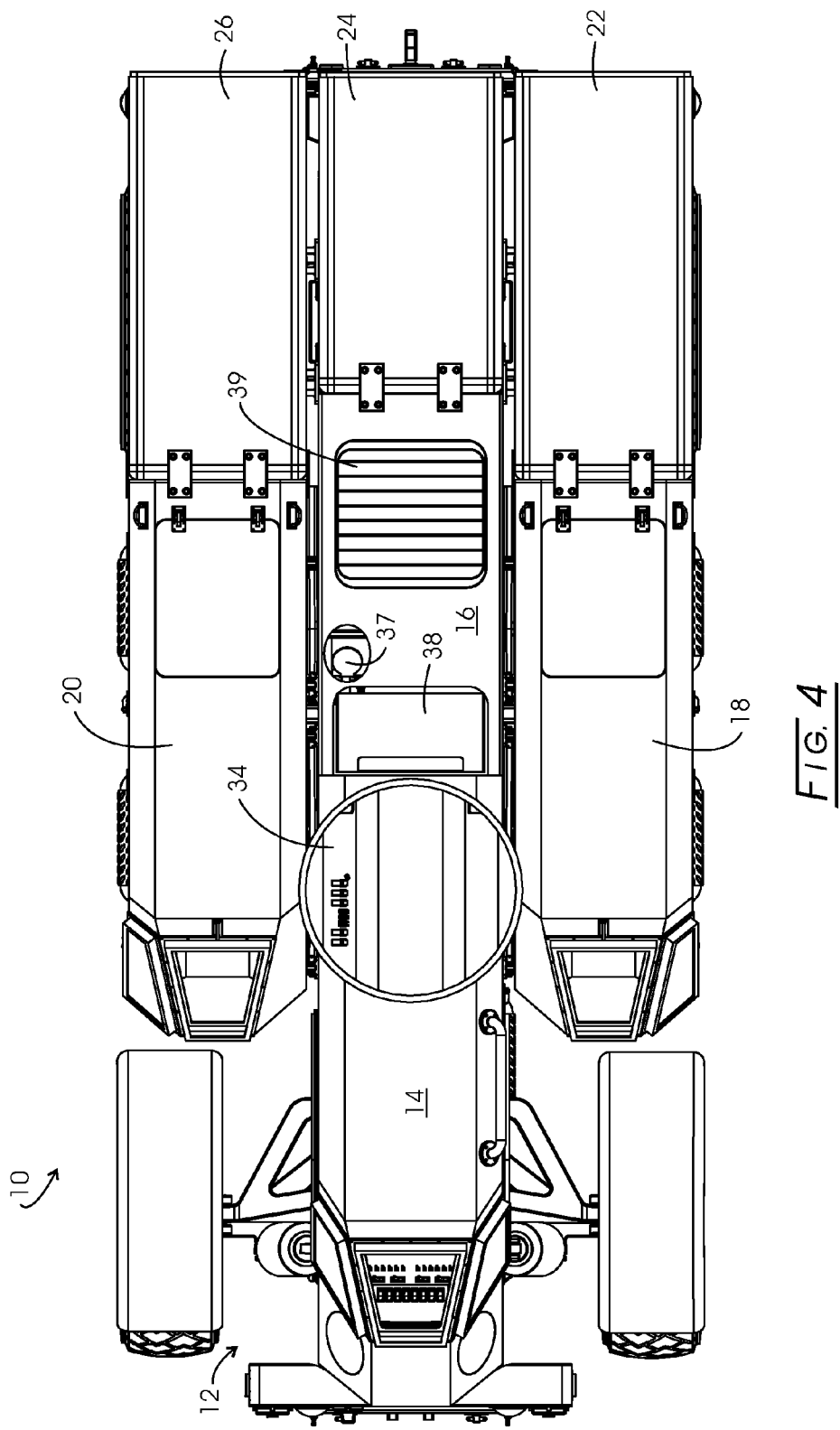
FIG. 4 is an overhead view of the modular military vehicle of FIG. 1.
Figure 5:
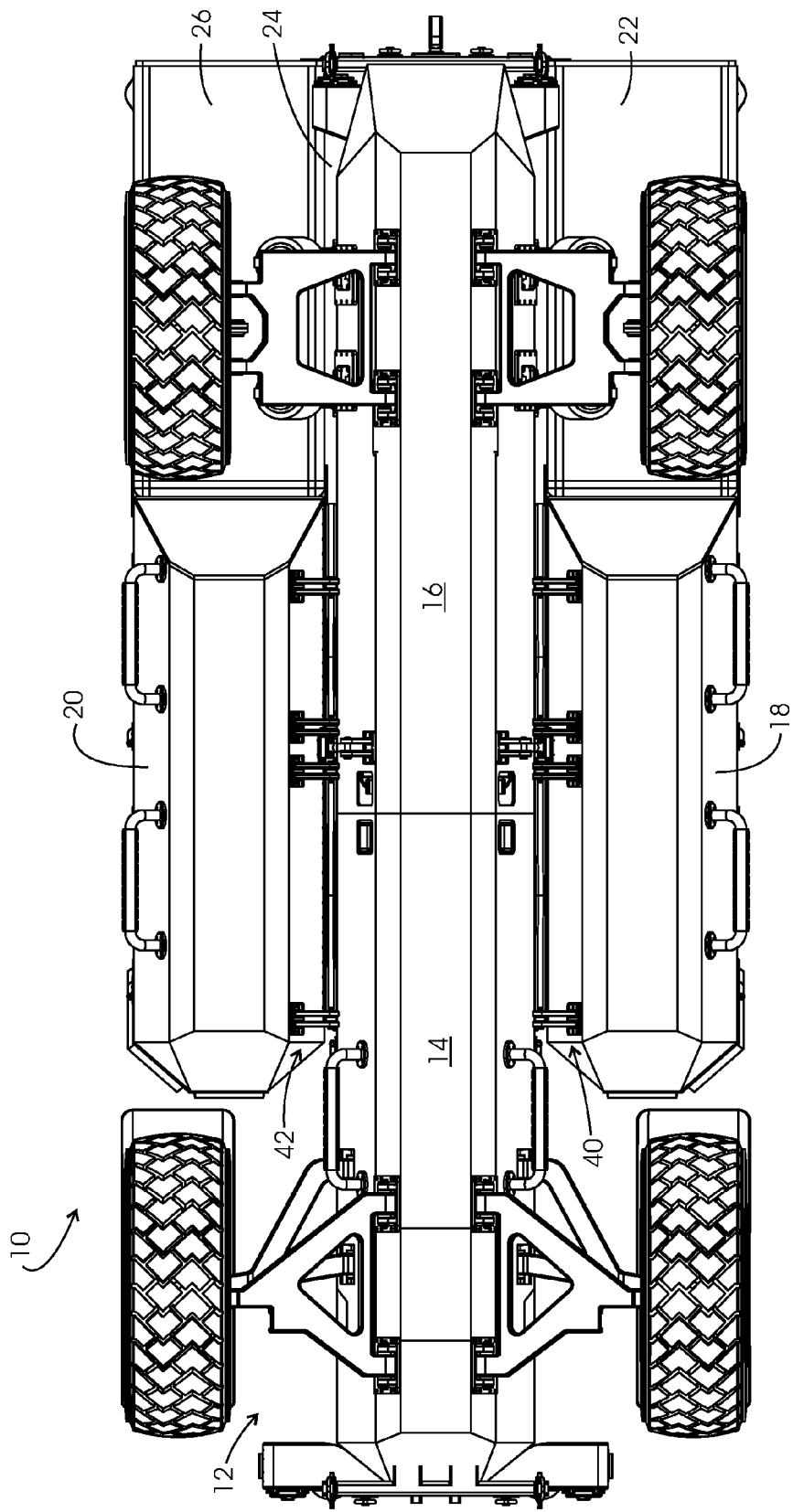
FIG. 5 is an underside view of the modular military vehicle of FIG. 1.

A blast energy dissipation pattern, 1, (see FIG. 2A) for driver module 14; a blast energy dissipation pattern, 2, for side module 18; and a blast energy dissipation pattern, 3, for side module 20, show the blast energy being diverted around the sides of the modules to lessen injury of occupants of vehicle 10. Such pattern along with side modules 18 and 20 that can be controllably blown away from CCM 12 will help in minimizing occupant injury from blasts occurring underneath virtually any area beneath vehicle 10. FIG. 2B additionally shows how the open framework of the engine module allows a blast energy venting paths, 2B-5B, through the vehicle (a blast venting chimney) not just around the modules/pods. Venting paths 1B and 6b are blast venting paths around the outside of the vehicle.

Figure 6:
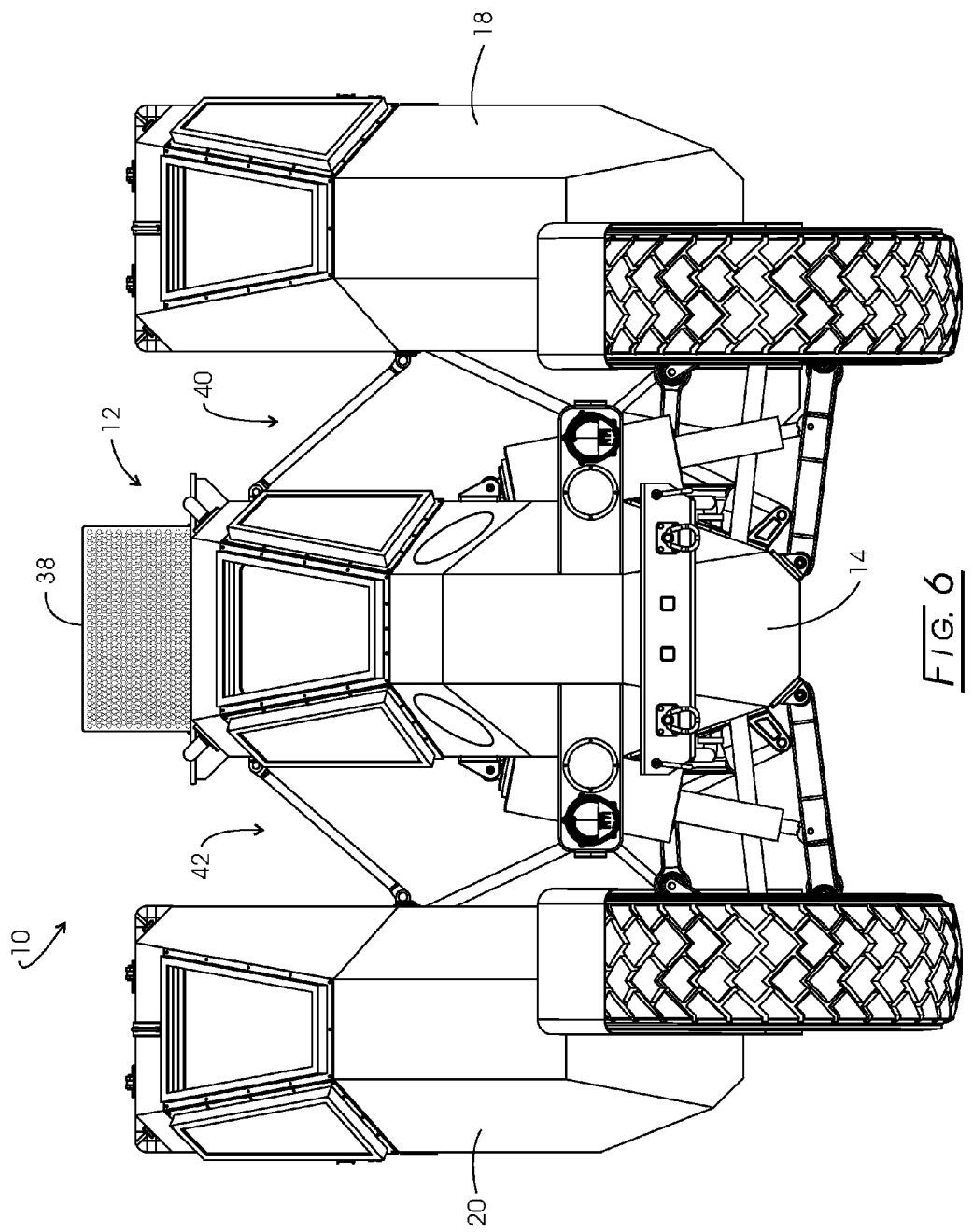
FIG. 6 is a front view like that in FIG. 1 with the side pods deployed.
Figure 7:
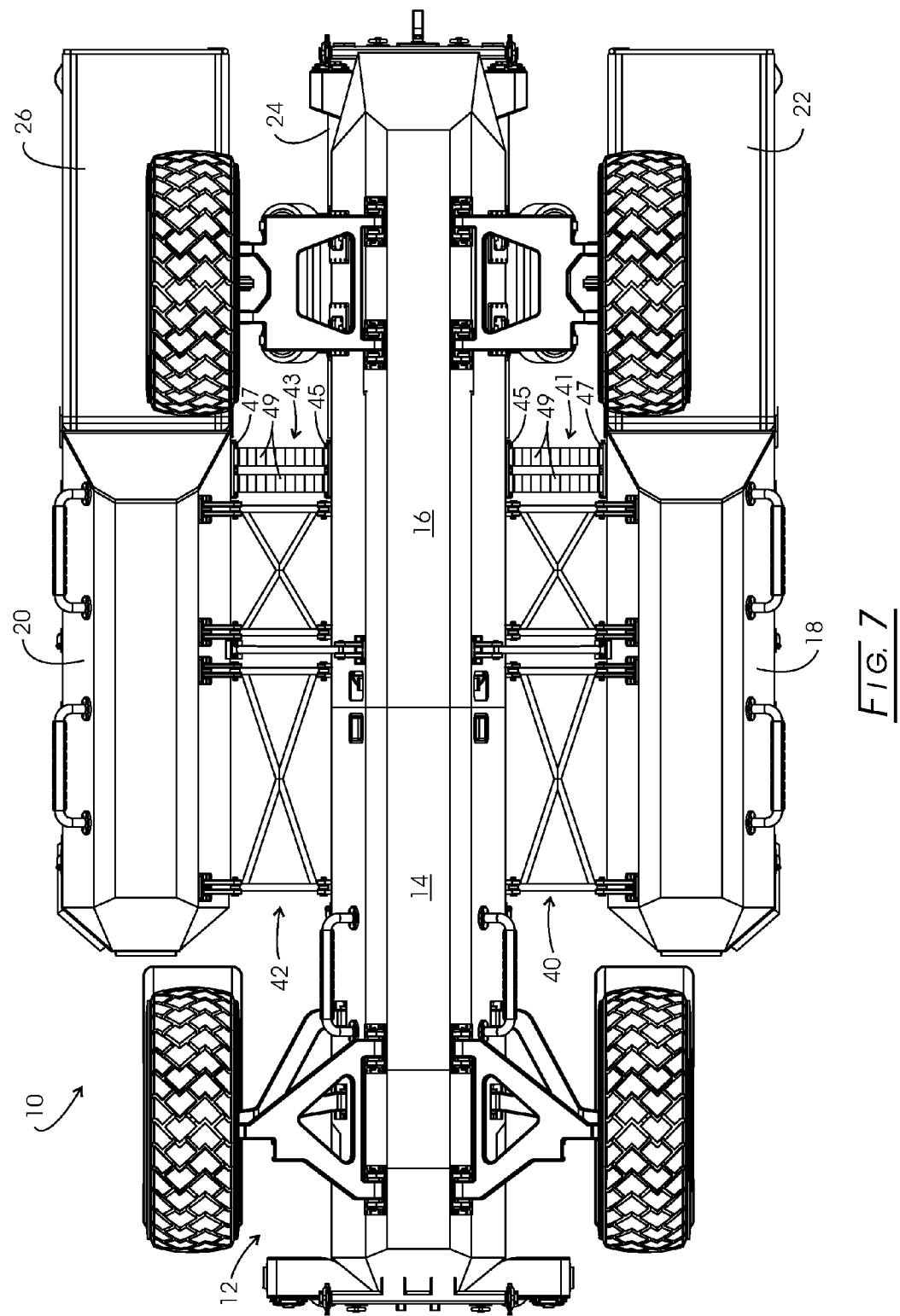
FIG. 7 is an underside view of the pod-deployed vehicle in FIG. 6.

Referring now to FIGS. 6 and 7, side pods 18 and 20 are seen in partially deployed condition up and away from CCM 12 using hydraulic pistons and supporting strut assemblies, 40 and 42, which are conventional in design and operation. Deployment of side pods 18 and 20 enjoys several advantages, including, inter alia, reducing the footprint size subject to road explosions, adding increasing distance from ground blasts, isolating pods subject to damage from blasts and explosions, and providing foot soldier protection between the side pods and CCM 12 (potentially with platforms that deploy for the soldiers to stand on upon deployment of the side pods). The blast deflecting V-shape hull design also has a small horizontal flat section with substantially angled sections that extend upwards creating in this case a V-shaped hull. Such design presents a minimal footprint to explosions and allows for excellent blast energy deflection. The slanted sections and space created between the deployed side pods and CCM 12 deflect the brunt of the explosive force upwards through and away from the vehicle to minimize occupant injury. Additionally the open framework of the engine module and forward and rearward tractive units creates additional blast path and chimney through the vehicle further minimizing the blast energy imparted on the occupants. The modular design permits any damaged pod to be readily replaced in the field and the vehicle put back in operation.

It should be observed that the hydraulic system for deploying the side pods or modules also could be adapted to move the side pods from an operating position adjacent to the CCM to the ground for removing the side pods and from the ground to an operating position. Thus, the hydraulic system could be adapted for putting on and taking off the side pods from the DMACS without the need for extra equipment.

In the event of an explosion, the side pod coupling to the central element can be "frangible", permitting the side pod to be dislodged by the explosion. It is thought that, to absorb some of the energy of the blast explosion, it is possible that an attenuation system can be placed between the side pod and the CCM as part of the frangible system. The addition of this dampening mechanism may allow the pod to still remain attached to the CCM without breaking the frangible coupling and, yet, still allow the blast energy to vent upwardly between the pods.

Figure 6A:
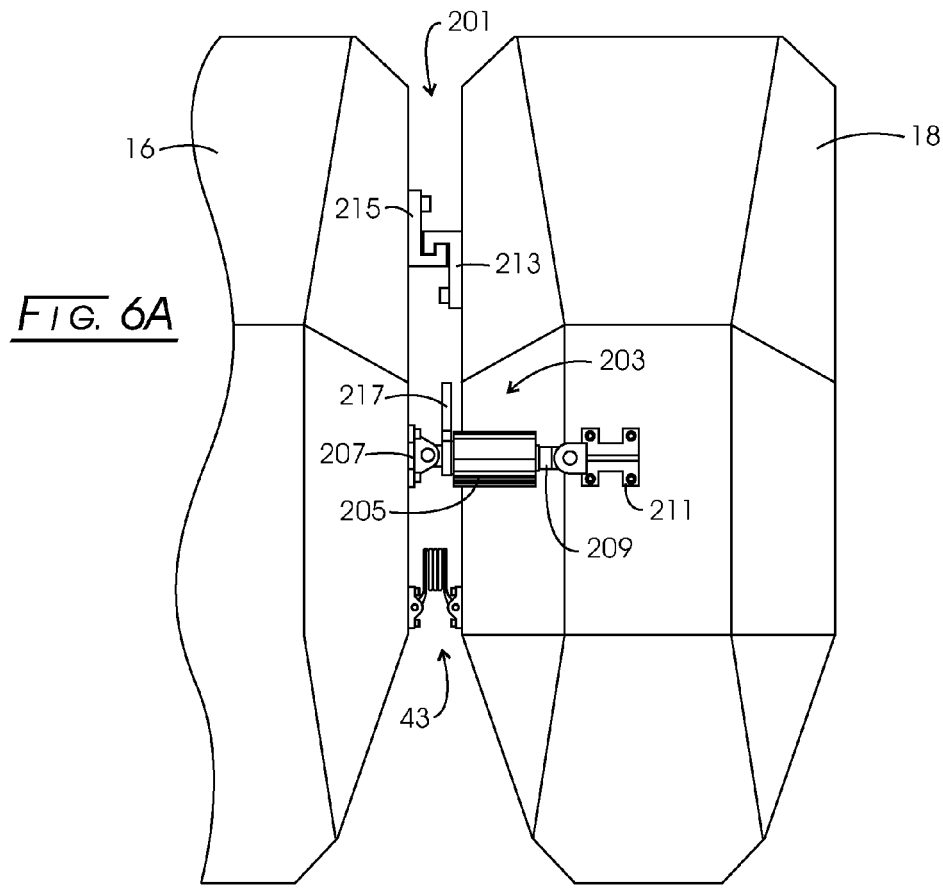
FIG. 6A is an enlarged view of the frangible coupling system of the side pods to the CCM.
Figure 6B:
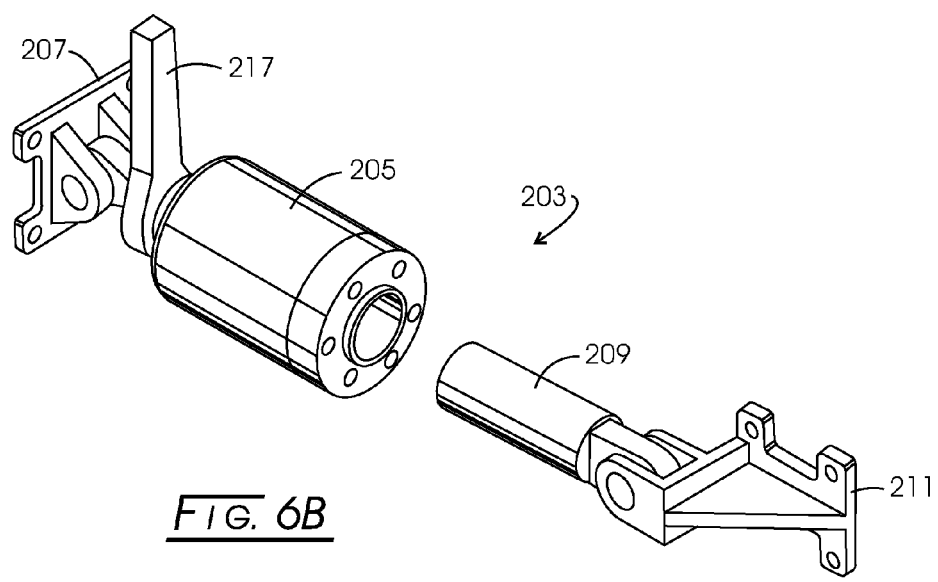
FIG. 6B is an isometric of the shock absorbed element of the frangible coupling system depicted in FIG. 6A.

With reference to FIGS. 6A, 6B, and 7, side module 18 is illustrated affixed to engine module 16 using an interlocking bracket assembly, 201, a cylinder assembly, 203, and a tether assembly, 43. Together, these items make up the frangible coupling of the central element to the side pod. Interlocking bracket assembly 201 is composed of a pair of "L" brackets, 213 and 215, which are retained in interlocked relationship by gravity. Additionally, blast-attenuating assembly 203 (such as a cylinder assembly) is composed of a cylinder, 205, associated bracket, 207, a handle, 217, and interlining rod, 209, and associated bracket, 211. Hooking a side pod to the CCM is quick and easy by dint of the design of the frangible coupling assembly. Handle 217 is rotatable to cause pressure from cylinder 205 to be exerted on inserted rod 209. This ensures that the side pod will stay attached during travel, such as, for example, over rough roads. The force of a blast, however, will cause rod 209 to withdraw from cylinder 205 and the tethers will limit the distance of travel of the dislodged pod.

The side pod also can be retained to the CCM by means of tether assemblies (see also FIGS. 7A and 7B), 41 and 43, whose ends are retained on both the CCM and the side pod by brackets, 45 and 47. The straps, 49, most likely will be in the form of webbing having a degree of elasticity and stitched together in a snaked or accordion pattern so that when the pod moves away from the CCM the stitching is broken as the tether unfolds.

Figure 7A:
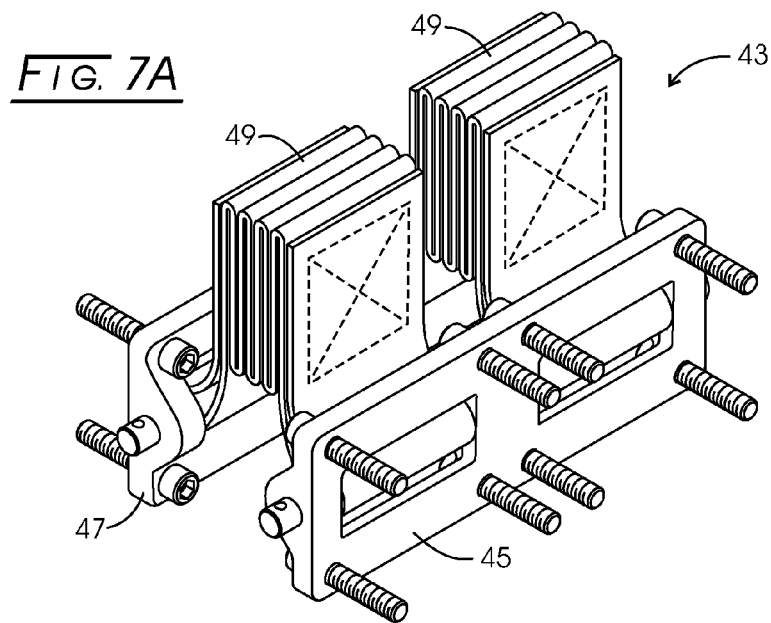
FIG. 7A is an isometric view of one of the tether assemblies seen in FIG. 7.
Figure 7B:
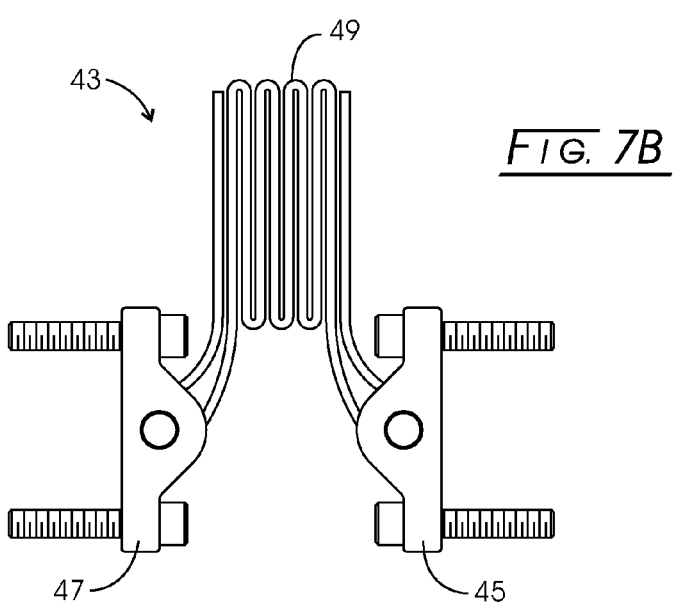
FIG. 7B is a side view of the tether assembly shown in FIG. 7B.

The frangible coupling assembly and tether, then, are able to further absorb some of the explosion energy during an explosion, beneath the vehicle. In particular, the cylinder assembly pulls apart with some force as is typical for a cylinder and rod assembly, and by the tether stretching in much the same way that seat belts absorb energy during an accident. Here, however, in order for the pods not to decelerate too violently at the end of the straps, most likely some elasticity will be incorporated into the straps. As shown in FIGS. 7, 7A, and 7B, at least one pair of straps (for example, 3 pairs per side module) can be used for each side pod. This number is arbitrary and could be greater or lesser in number.

Figure 8:
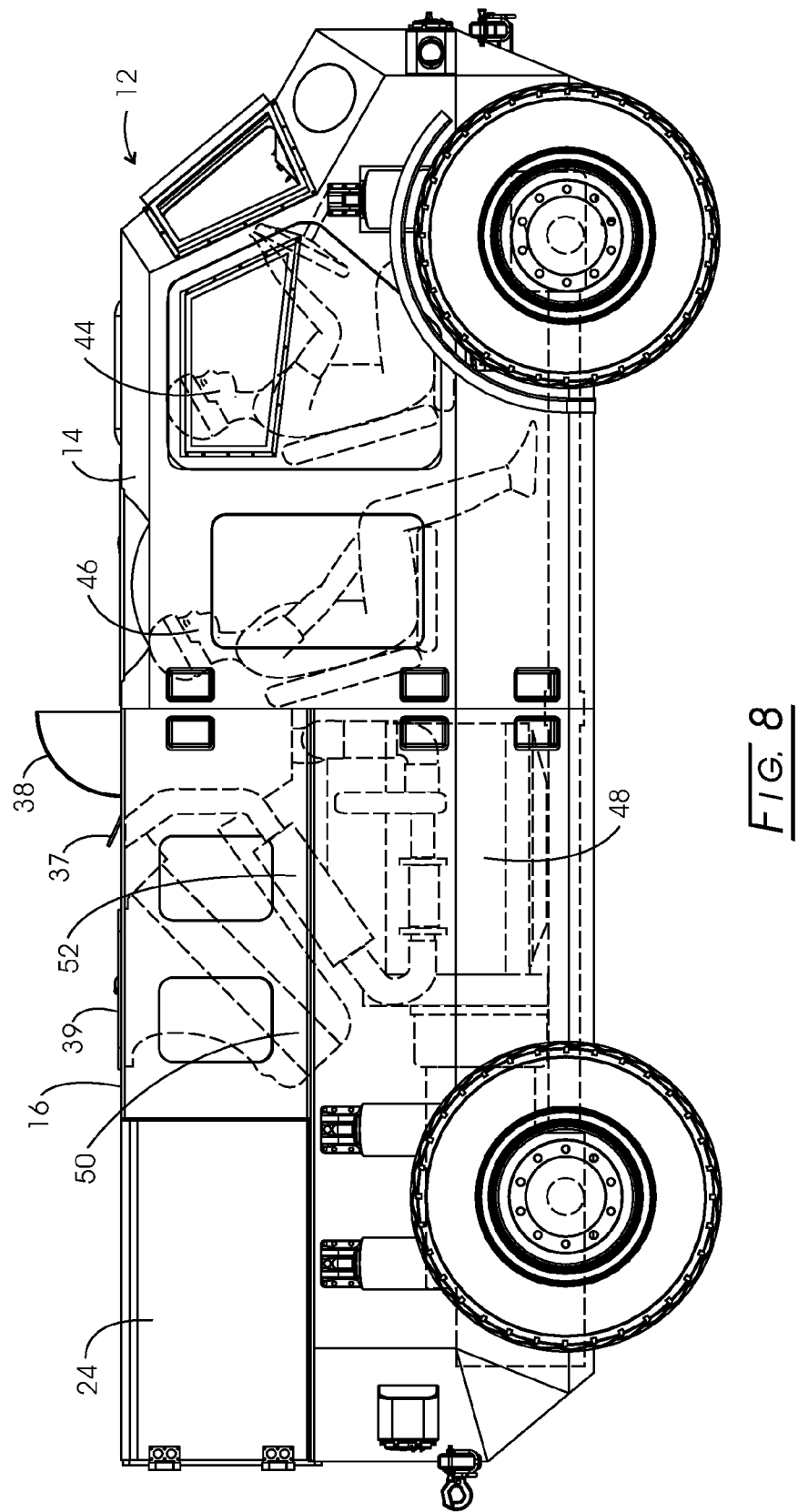
FIG. 8 is a side view of the modular military vehicle of FIG. 1 showing seated personnel, engine, and the like in phantom.

Personnel, 44 and 46, seated in driver module 14 are seen in FIG. 8. Also seen is an engine, 48, a radiator, 50, and a exhaust assembly, 52. Air for engine 48 and to cool radiator 50 is admitted through air inlet duct 38. Exhaust passed through exhaust assembly 52 passes to the atmosphere through port 37. Fresh air for personnel 44 and 46 is admitted via air inlets 38 on each side of the CCM above the engine (FIG. 14 rectangular hole above engine module 16). As observed earlier, locating the air inlets and exhaust atop vehicle 10 will minimize dust entry into vehicle 10.

Figure 13:
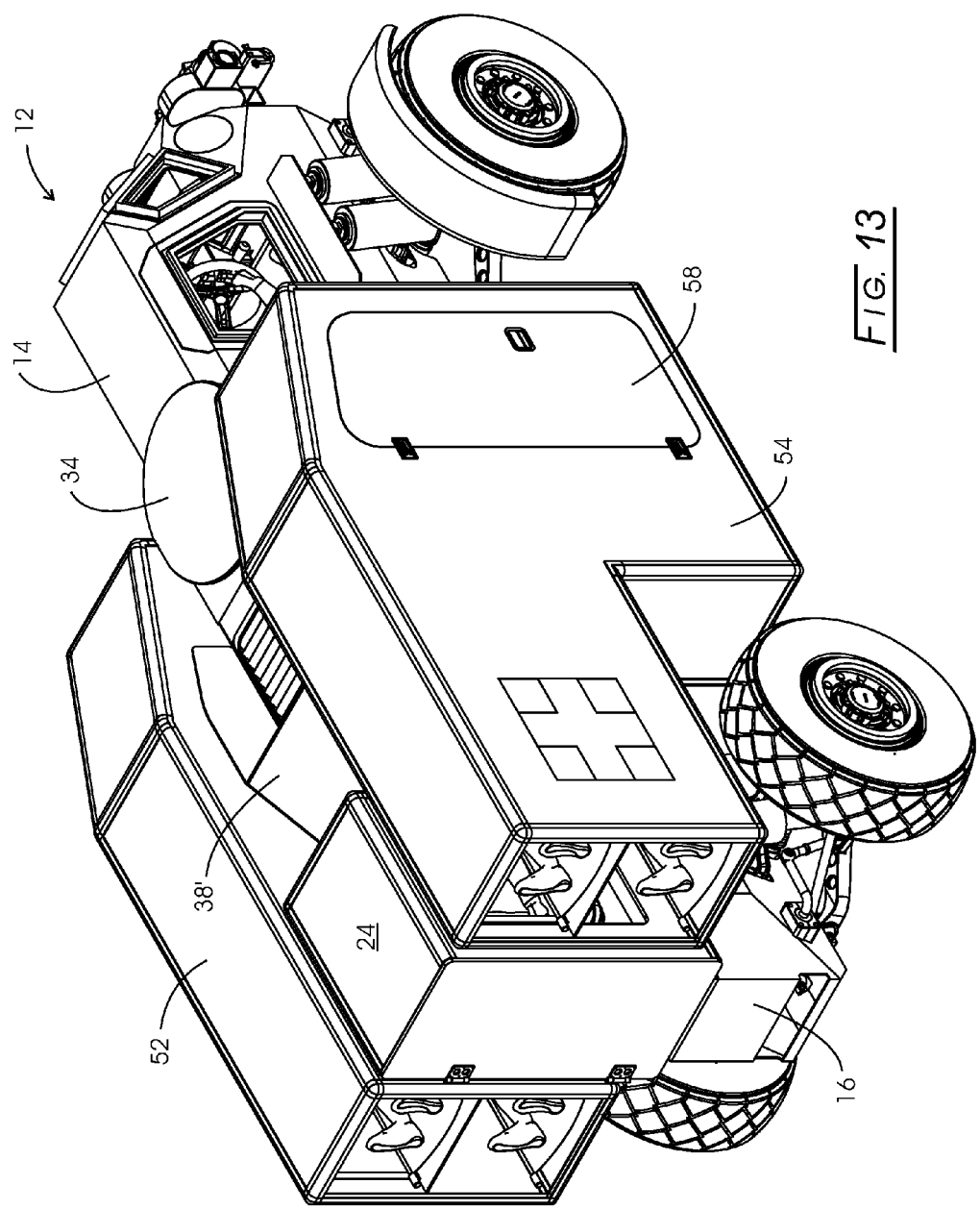
FIG. 13 is a rear isometric view of the modular ambulance vehicle of FIG. 9.
Figure 15:
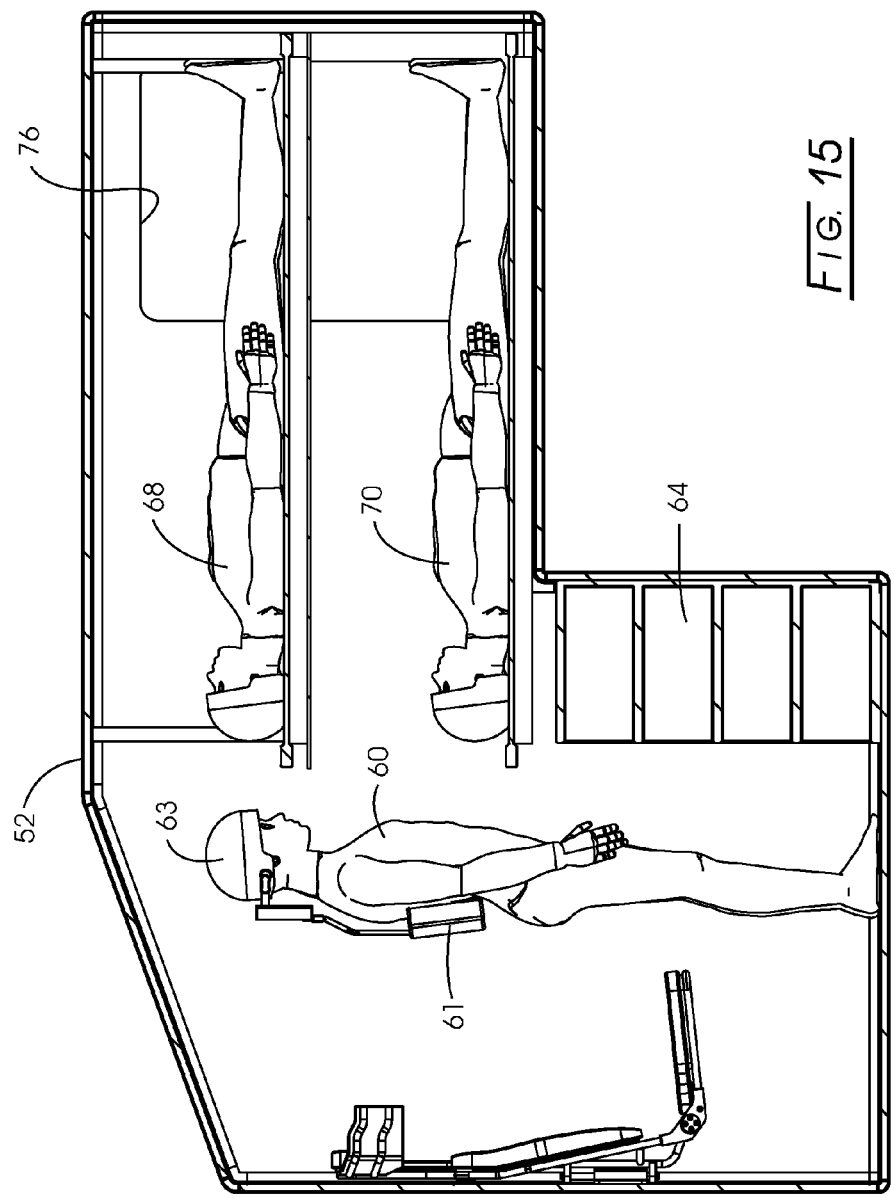
FIG. 15 is a sectional view taken along line 15-15 of FIG. 12.

In FIGS. 9-13, litter side pods, 52 and 54, have been attached to CCM 12 to create a modular ambulance. CCM 12 remains unchanged from the previous drawings, except for an air intake, 38', and exhaust, 37'. Litter side pods 52 and 54 may or may not be deployable. Litter side pod 52 is fitted with a door, 56, while litter side pod 54 also is fitted with a door, 58 (see FIG. 13). Medic personnel can enter litter side pods 52 and 54 through doors 56 and 58. Wounded soldiers can be placed in litter side pods 52 and 54 conveniently through rear access openings in litter side pods 52 and 54, such as is illustrated in FIG. 13. Doors, netting, or other restrictions will be provided to keep the litters in litter side pods 52 and 54. In FIG. 15, a medic, 60, is seen in medic pod 52 where he can attend to the needs of wounded soldiers on litters, 68 and 70, or can be seated on a seat, 62. A storage bin, 64, is provided to house medicines, instruments, and like items.

Figure 14:
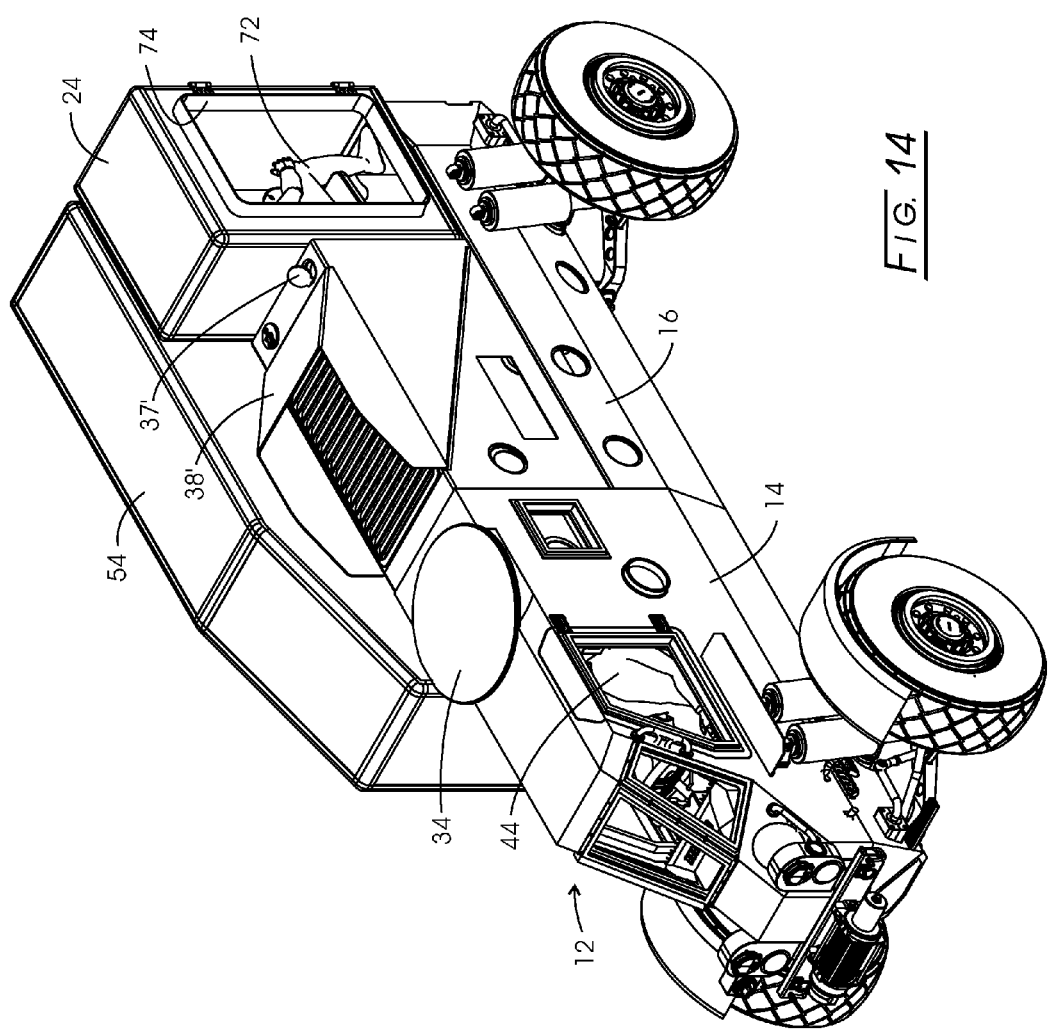
FIG. 14 is an isometric view of the modular military vehicle with only 1 side pod, but with a rear occupant pod.

Illustrated in FIG. 14, the narrow aspect of litter side pods 52 and 54 permit medic to easily only treat the upper torso and head of the wounded soldier, pod 24 is an occupant pod for carrying an additional medic, 72, which can treat the legs and lower torso of the wounded soldiers. In order to accomplish such treatment, an access, 74, is created in pod 24 which mates with a similar access, 76, in pod 52. Similar accesses are provided for medic 72 to treat wounded soldiers in pod 54.

Medic 60 is fitted with a SAPI panel, 61, affixed to his helmet, 63. Personnel 44 and 46 seated in driver module 14 also could be fitted with a SAPI panel, as, indeed, could any personnel confined within military module vehicle 10. FIGS. 28-31 illustrate medic 60 again, standing and sitting. SAPI panel 61 is seen affixed to helmet 63 in addition to medic 60, regardless of whether in a seated or standing position. Such extended panel 61 from the SAPI pack will be secured with, for example, Velcro® into position within the soldier's ballistic vest and with the soldiers' ballistic collar. It is thought that a pivot at the top of this extended SAPI panel should be incorporated to allow the head to be turned easily and with comfort.

Figure 16:
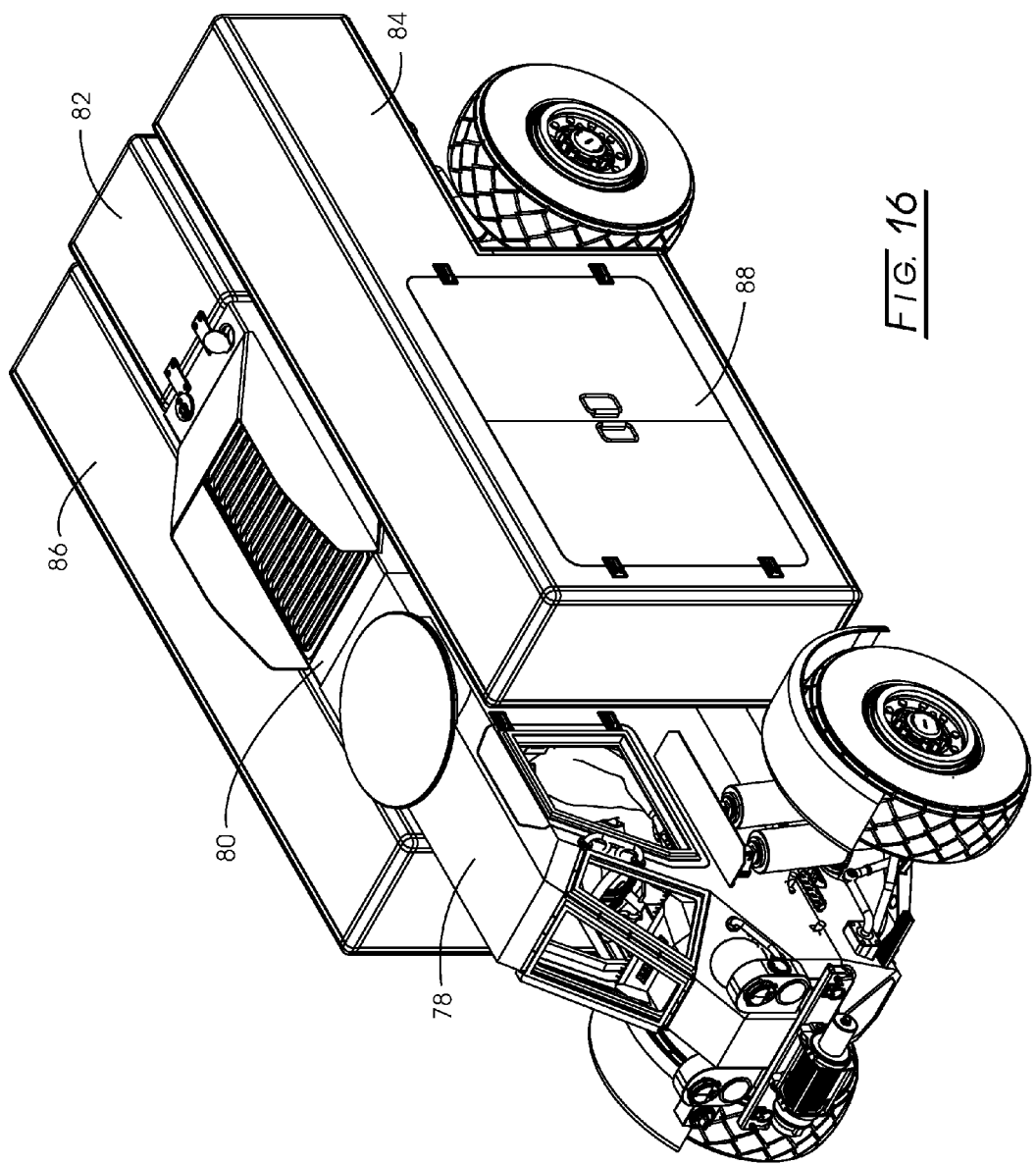
FIG. 16 is an isometric view of the modular military vehicle fitted with cargo side pods.
Figure 17:
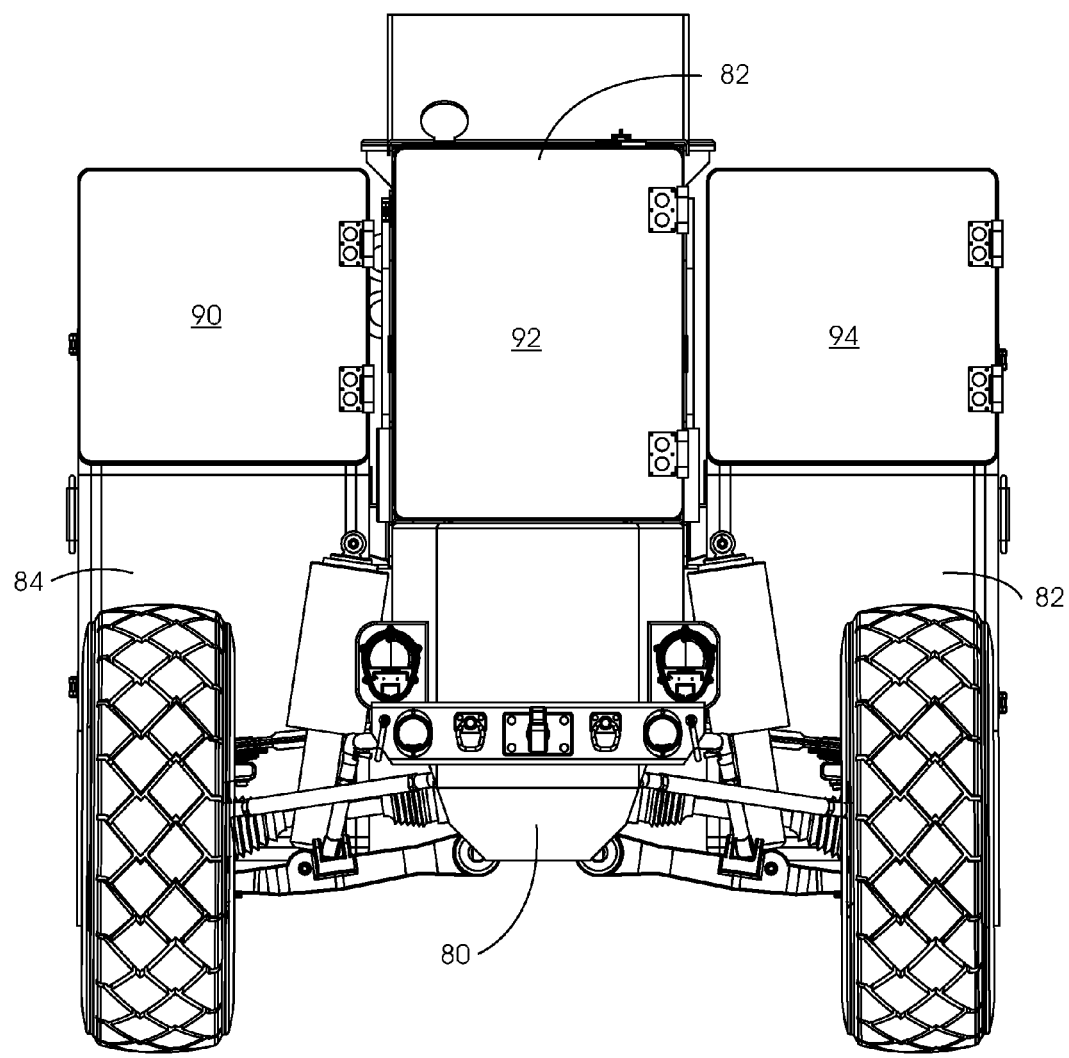
FIG. 17 is a rear view of the modular cargo vehicle of FIG. 16.

Referring to FIGS. 16 and 17, an extended version of the modular vehicle is illustrated. Such extended modular vehicle includes an extended central element composed of a driver module, 78, and engine module, 80, either of both of which can be extended in length compared to modular vehicle 10. Engine module 80 carries a rear cargo pod, 82, while side pods, 84 and 86, are disposed alongside driver pod 78 and engine pod 80. Pods 82, 84, and 86, all are cargo pods that can be adapted to carry, ammunition, food, supplies, petrol, water, medical supplies, etc. Access is gained to side pod 84 via a door assembly, 88. Rear doors, 90, 92, and 94, can be provided for each of the modules also.

Figure 18:
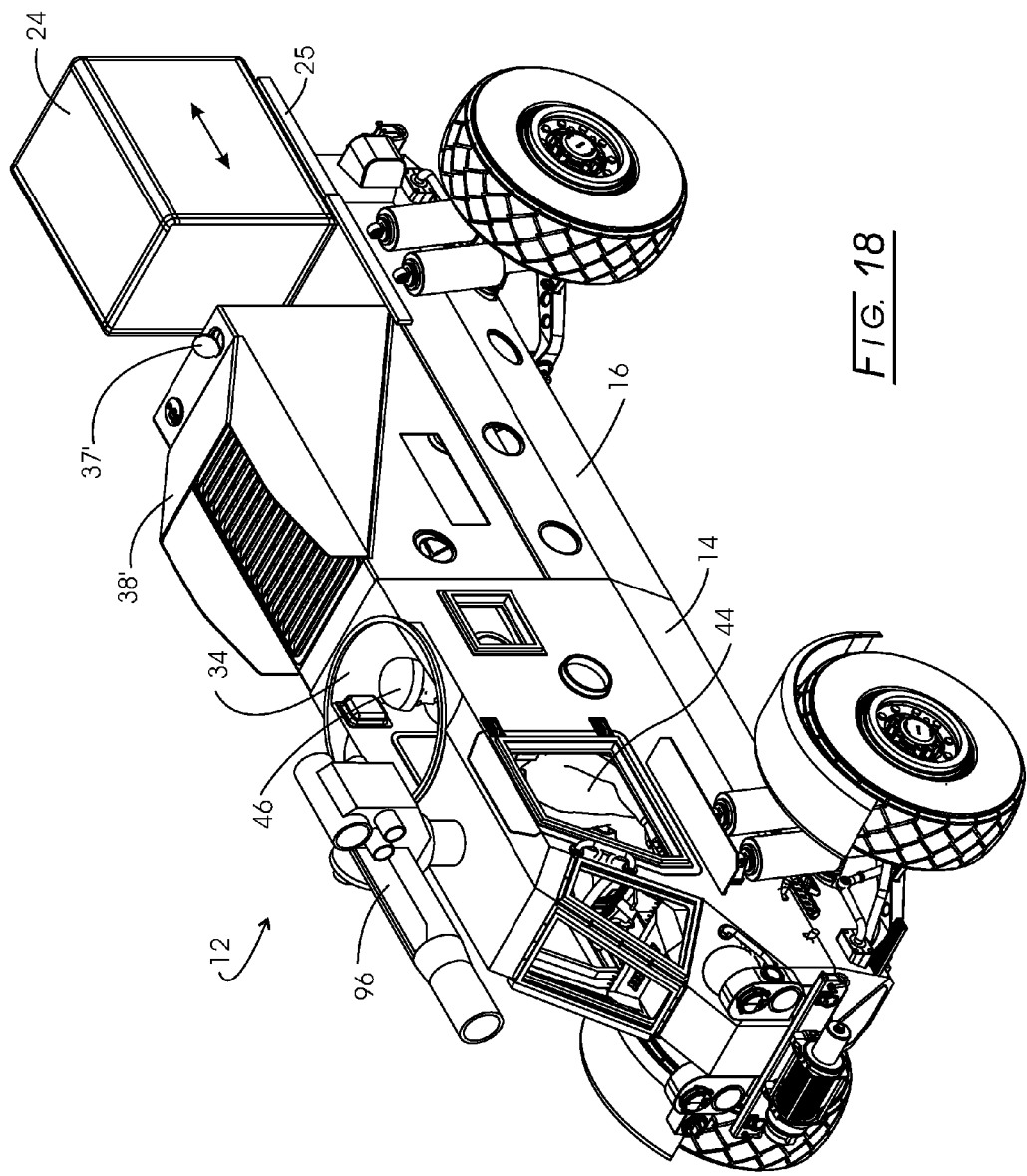
FIG. 18 is an isometric view of the modular military vehicle without side pods, but fitted with top-mounted armament and a movable rear storage module.

CCM 12 is illustrated in FIG. 18. In this embodiment a portable missile launcher, 96, is disposed atop driver module 14 and is desirably controlled by personnel 46, so that driver 44 can concentrate on driving CCM 12. Pod 24 is mounted on rails, such as a rail, 25, and another rail on the far side of CCM 12 that is not seen in FIG. 18. Moving pod 24 away from CCM 12 rearwardly also permits repair/maintenance access to the powertrain in engine module 16 and to the transmission and other drive train elements disposed therein. A cover conveniently at the rear of CCM 12, for example, could be opened to provide such servicing access. Powertrain for present purposes includes an engine or motor, transmission, and other components necessary to power the disclosed vehicle.

That CCM 12 can be operated as a stand-alone vehicle is an advantage of the design disclosed herein. For that reason, CCM 12 and all disclosed pods can be manufactured from aluminum or composite material for weight reduction. Also, a layer "up armor" can be provided as a ballistic layer from a variety of composite materials presently used to shield military vehicles. When the side modules/pods are attached, they provide additional shielding for CCM 12 and drive components from being struck by ballistic impact. The engine module can incorporate sacrificial paneling covering the engine module open framework. These panels are designed to not withstand significant blast pressure and shatter in a blast event allowing significant blast venting through the engine compartment.

From the front, a narrow profile is presented, thus reducing the area vulnerable to being struck by bullets, shrapnel, or the like. Aligning personnel in a single row permits such narrow front profile. Similarly having each occupant in a narrow pod allows the effective use of occupant side curtain and front air bags deployed in the event of a blast or accident. Basically being able to encase the occupants between inflated air bags and the seat should increase their likelihood of survival during a blast or accident. Additionally, the narrow profile of the occupant pod will help to contain the occupants' legs during a blast event, resulting in fewer lower leg injuries.

Virtually all surfaces of all occupant modules/pods are designed to be manufactured from relatively flat, planar material (stressed skin) which contributes to reduced manufacturing costs.

Engine 48 can be any internal combustion engine powered by gasoline, diesel fuel, or the like, optionally turbocharged or supercharged; or can be a turbine engine; or any other power plant designed to propel vehicle 10. While the suspension is conventional for this type of vehicle, independent suspension is advantageous. It is possible that the vehicle also could incorporate an alternative drive system like electric or hydraulic motor.

Figure 19:
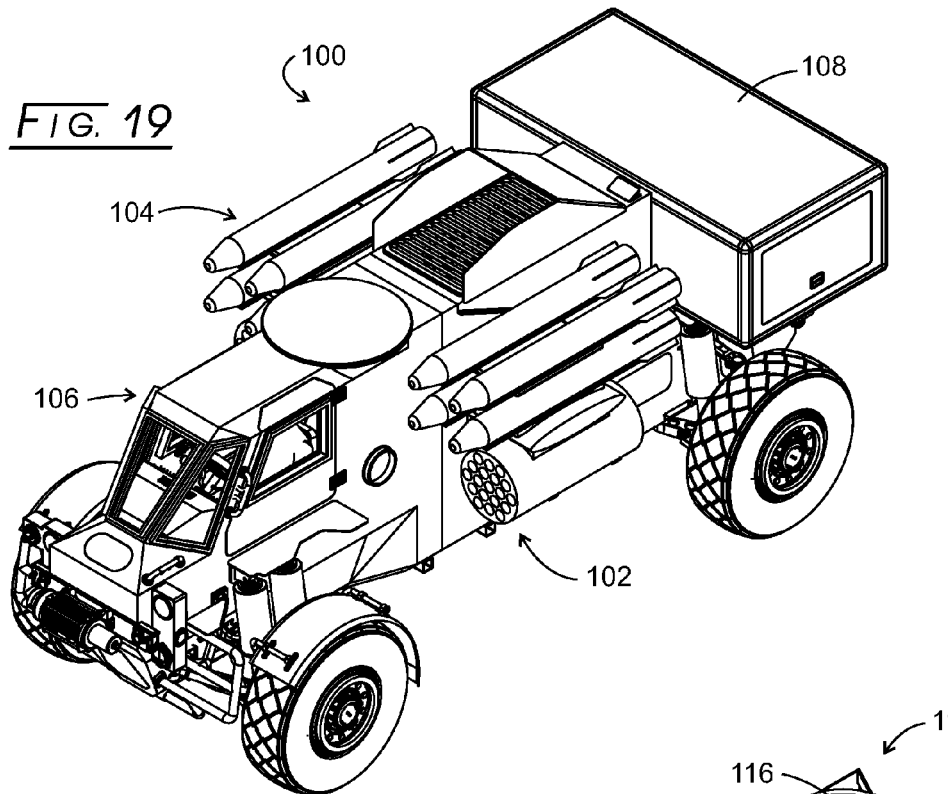

FIG. 19 illustrates a mobile missile launcher version, 100, of the vehicle disclosed herein. In particular, a pair of side missile pods, 102 and 104, is affixed on either side of a CCM, 106. Personnel located within CCM 106 can control missile launch and target, or the target can be fed into an onboard computer remotely, say, for example, from air or ground reconnaissance. A rear storage pod, 108, can convey spare missiles, for example or additional armament, such as, for example, an air-to-ground or air-to-air, or anti-tank, etc., missile. Armament, such as missiles, may require elevation to clear the CCM during firing.

Figure 20:
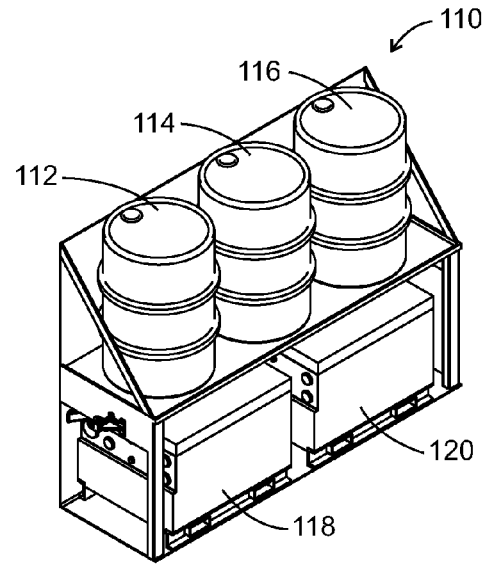
FIG. 20 is an isometric view of a side pod transport for conveying electrical generators and fuel drums.

FIG. 20 shows an additional side pod, 110, for transforming the modular combat vehicle into a mobile generator unit, conveying fuel drums, 112, 114, and 116; along with generators, 118 and 120. One or two such mobile generator side pods enable power to be brought into remote field or other locations.

Figure 21:
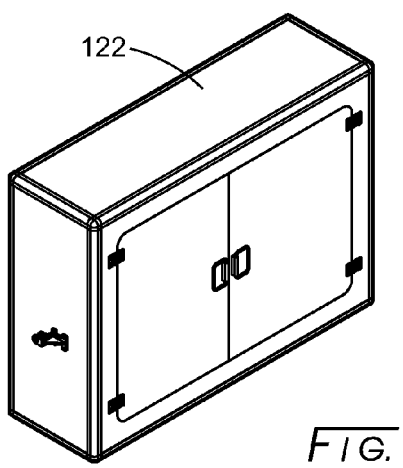
FIG. 21 is an isometric view of a side pod transport configured as a storage cabinet.

FIG. 21 shows another cargo side pod, 121. One or two of such side pods can be carried by the CCM. Again, the user can use almost any combination of pods on the CCM for extreme flexibility and utility. These non-occupant pods are all sacrificial and frangible during an under-vehicle blast event, further reducing the blast energy transferred to the vehicle occupants.

Figure 22:
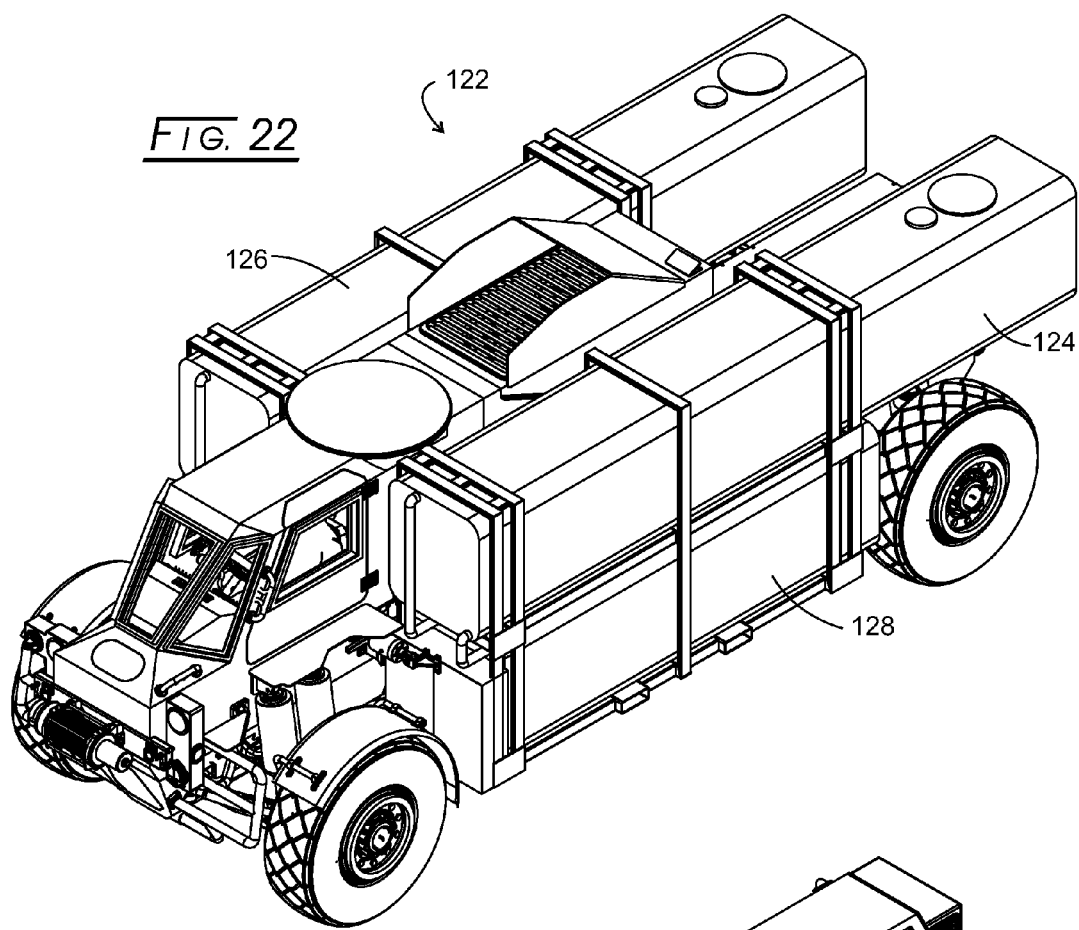
FIG. 22 is an isometric side view of the modular military vehicle adapted as a fuel tanker by configuring with side and rear fuel tanks.

FIG. 22 illustrates a fuel tanker, 122, where fuel tanks are the side pods. In particular, upper side pods, 124 and 126, have upper rear access for fuel. A pair of lower fuel pods, 128 and 130 (not seen), can be in fuel connection with upper fuel pods 124 and 126, or separately accessible.

Figure 23:
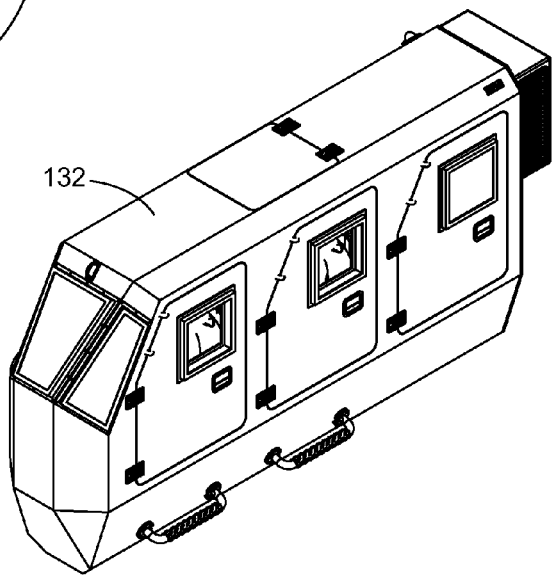
FIG. 23 is an isometric view of a side pod configured to convey 3 soldiers.

FIG. 23 illustrates yet another troop occupant pod, 132, for conveying 3 soldiers per side pod. Again, one or both side pods could be the 3-troop versions.

Figure 24:
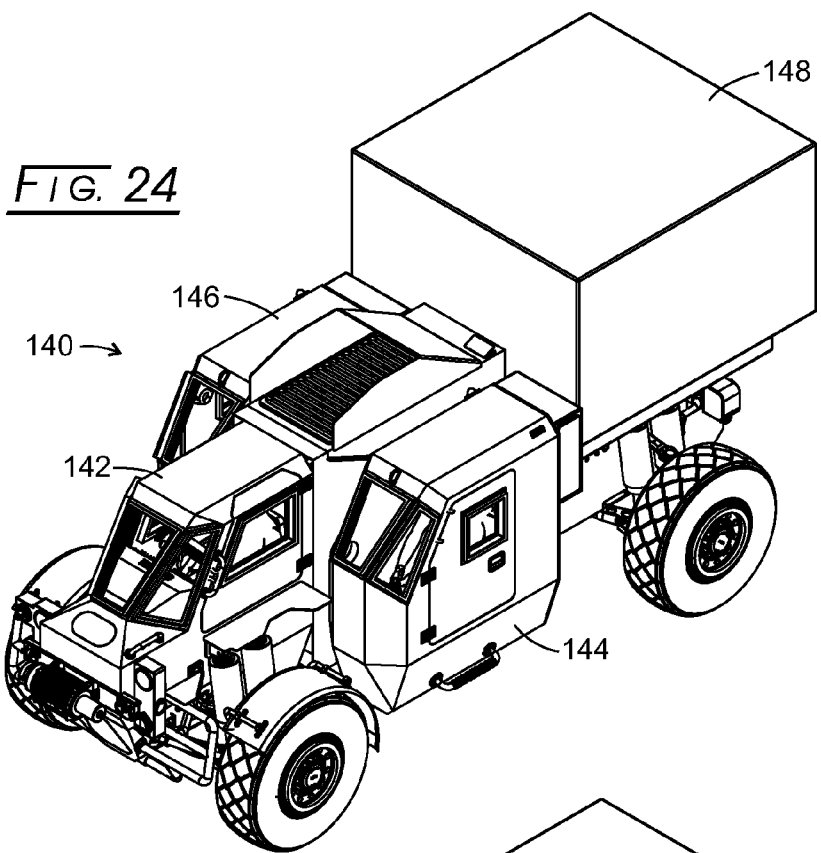
FIG. 24 is an isometric view of the short wheelbase modular military vehicle with a pair of single soldier side pods, a single drive CCM module and a rear shelter.
Figure 25:
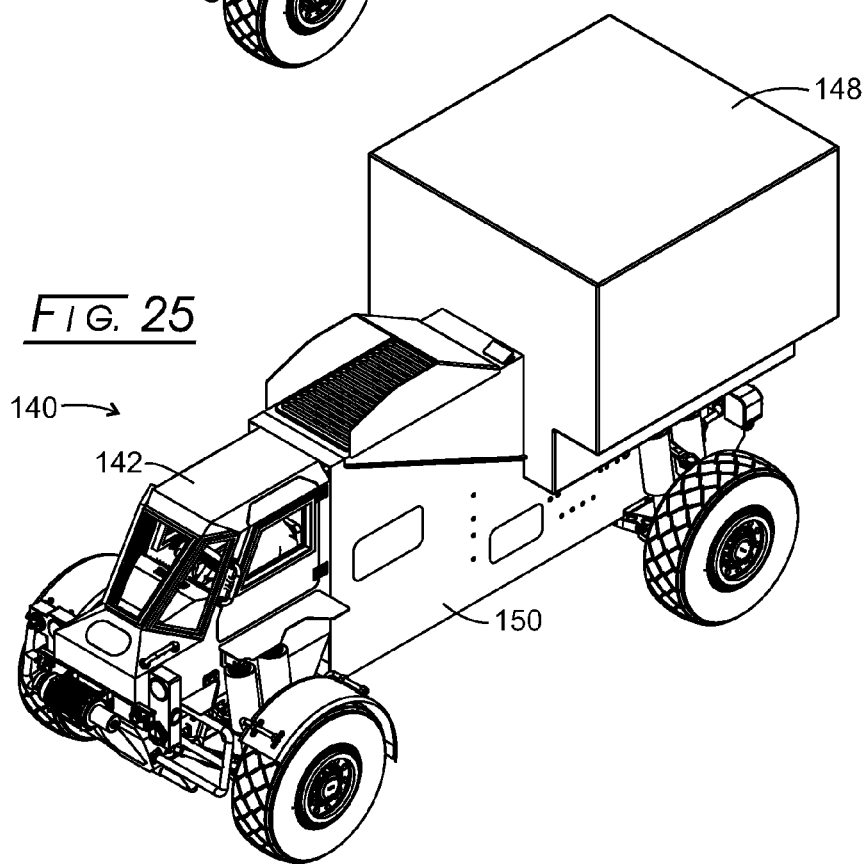
FIG. 25 is the short wheelbase shelter modular military vehicle of FIG. 24 with no soldier side pods.

FIG. 24 illustrates a military vehicle, 140, configured with a short wheelbase, so as to accommodate only a single soldier (driver) in a CCM, 142. Side pods, 144 and 146, carry but a single soldier. Military vehicle 140, then, carries only 3 soldiers. At the rear, is a shelter, 148, for transport into the field (e.g., combat zone). FIG. 25 illustrates vehicle 140 without side pods. An engine module, 150, is revealed also.

Figure 26:
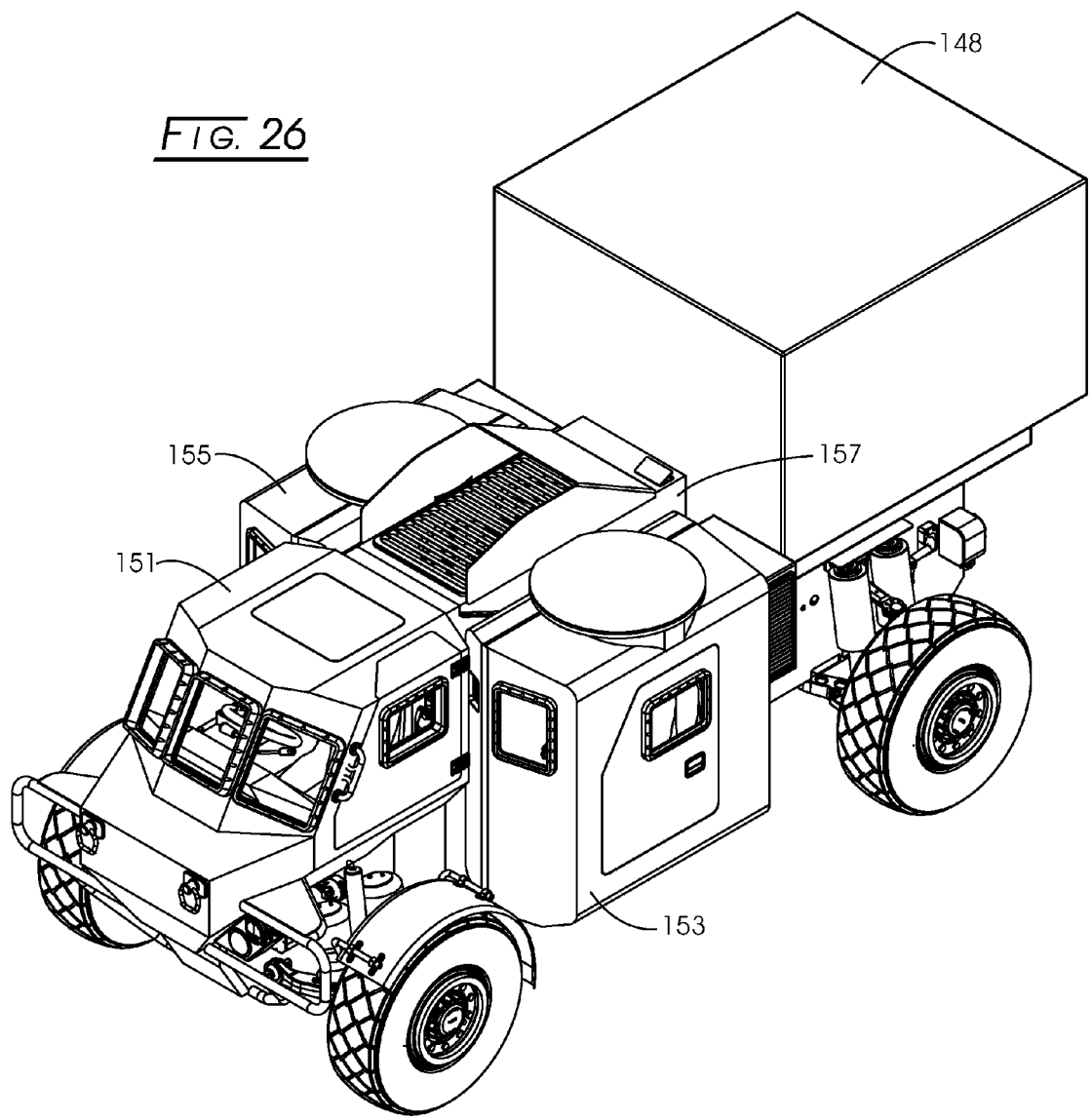
FIG. 26 is an isometric view of another modular military vehicle embodiment having a one-person driver module, side pods for soldiers, and a rear cargo shelter.

FIG. 26 illustrates a military vehicle having a driver module, 151, seating only the driver. A pair of side pods, 153 and 155, is attached to an engine module, 157. Shelter 148 is carried at the rear of the vehicle.

Figure 27:
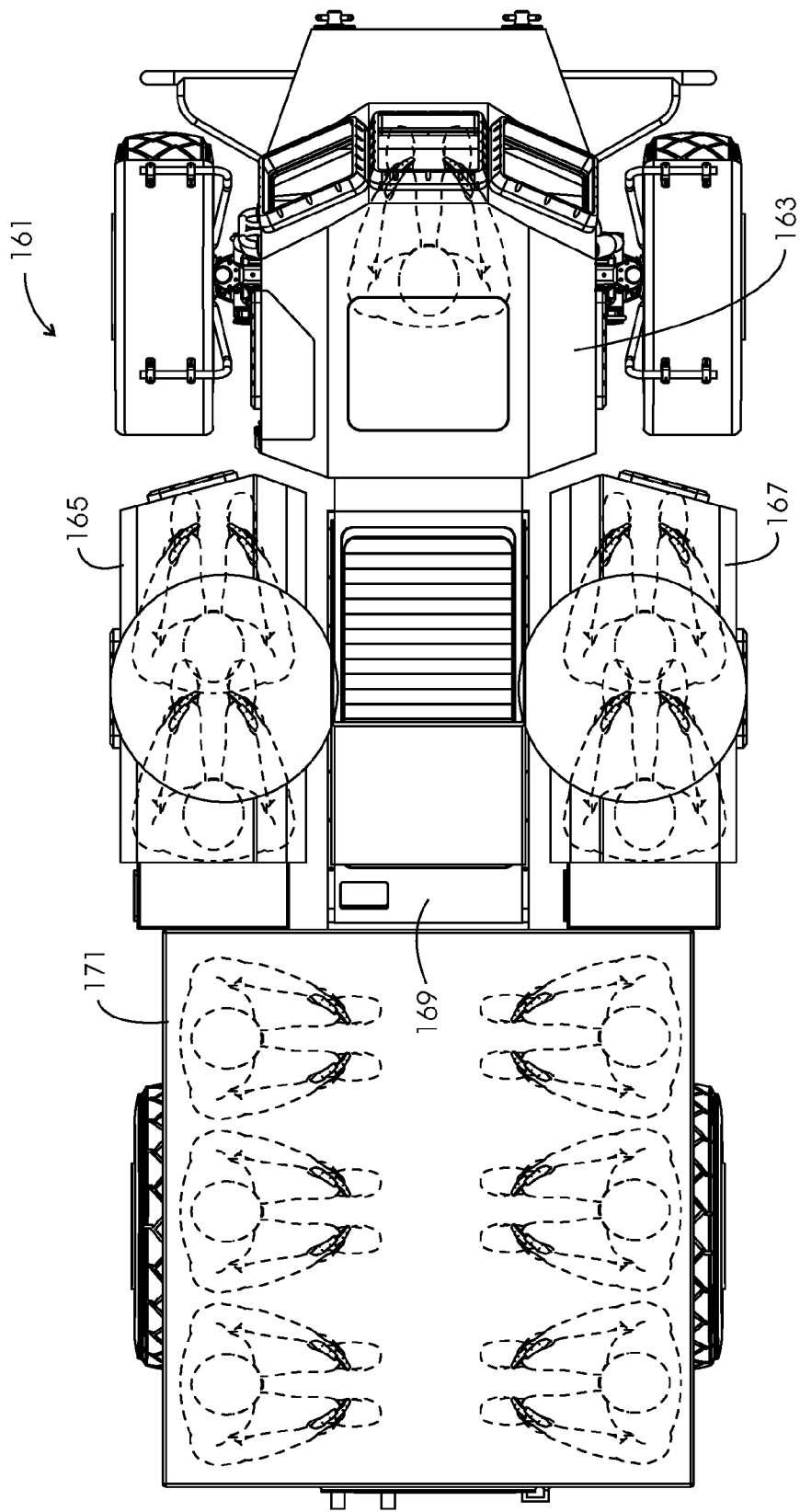
FIG. 27 is an overhead view of another modular military vehicle embodiment designed only for troop transport.
Figure 28:
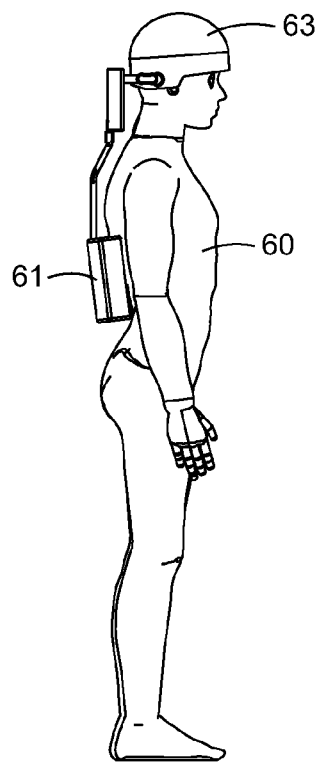
FIG. 28 is a side isometric view of a standing soldier (medic from FIG. 15) fitted with a SAPI (small arms protection inserts) panel affixed to his helmet.
Figure 29:
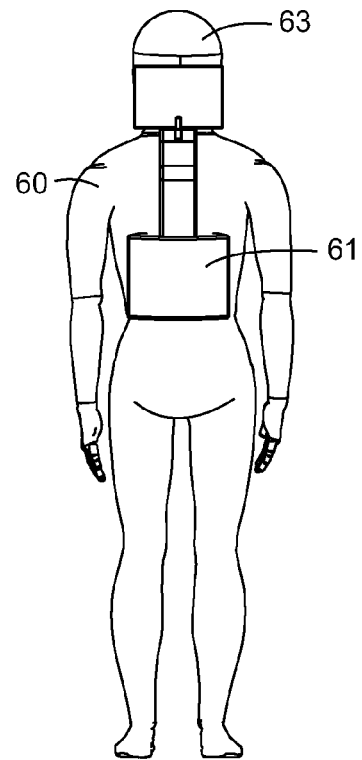
FIG. 29 is a rear view of the medic of FIG. 28 showing the back-carried SAPI unit.
Figure 30:
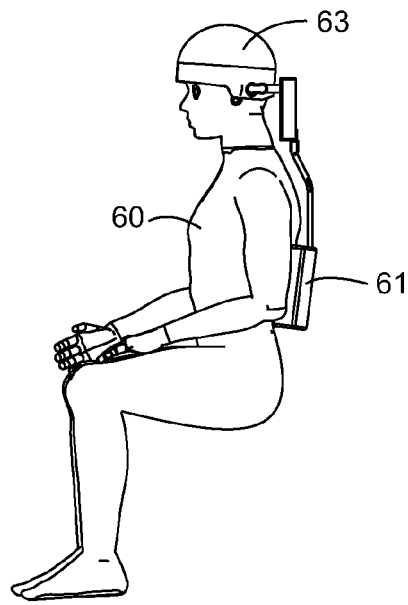
FIG. 30 is a side view of the medic seated, but still wearing the extended SAPI unit.
Figure 31:
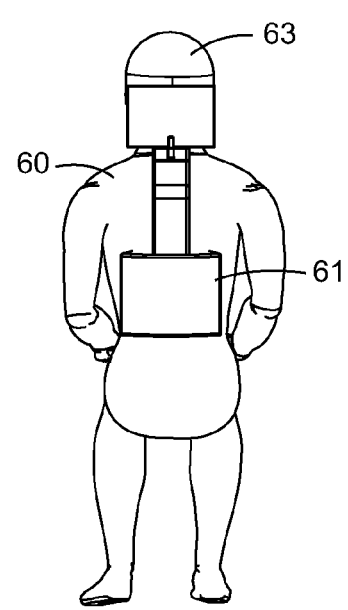
FIG. 31 is a rear view of the seated medic of FIG. 30.
Figure 32:
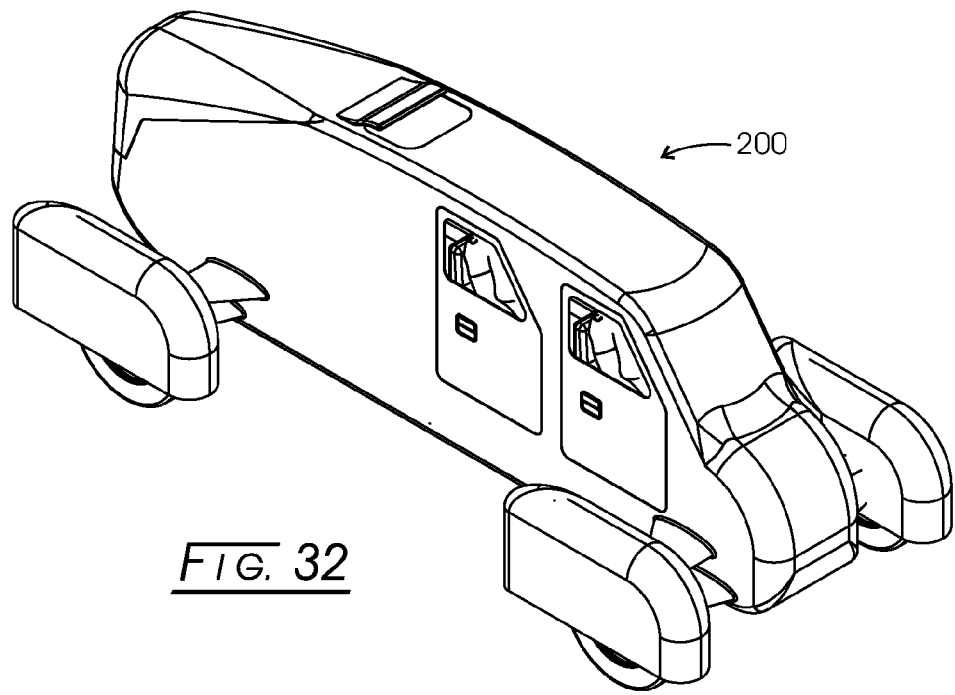
FIG. 32 is an isometric view of a streamlined modular passenger vehicle without side pods.

The design flexibility of the disclosed modular military vehicle is enveloped in FIG. 27. A troop transport only modular military vehicle, 161, is illustrated. In order to increase the troop capacity, a driver module, 163, has been widened behind the driver in order to accommodate additional instruments, material, goods, etc. Occupant side pods, 165 and 167, accommodate another 2 soldiers each and are carried by an engine module, 169. Finally, a rear occupant pod, 171, accommodates another 6 soldiers. The total troop capacity of modular military vehicle 161 is 11 troops. In this view, the blast venting chimney exit area in the center of the vehicle is through the engine module and between pods 165, 167, 163, and 171.

Figure 36:
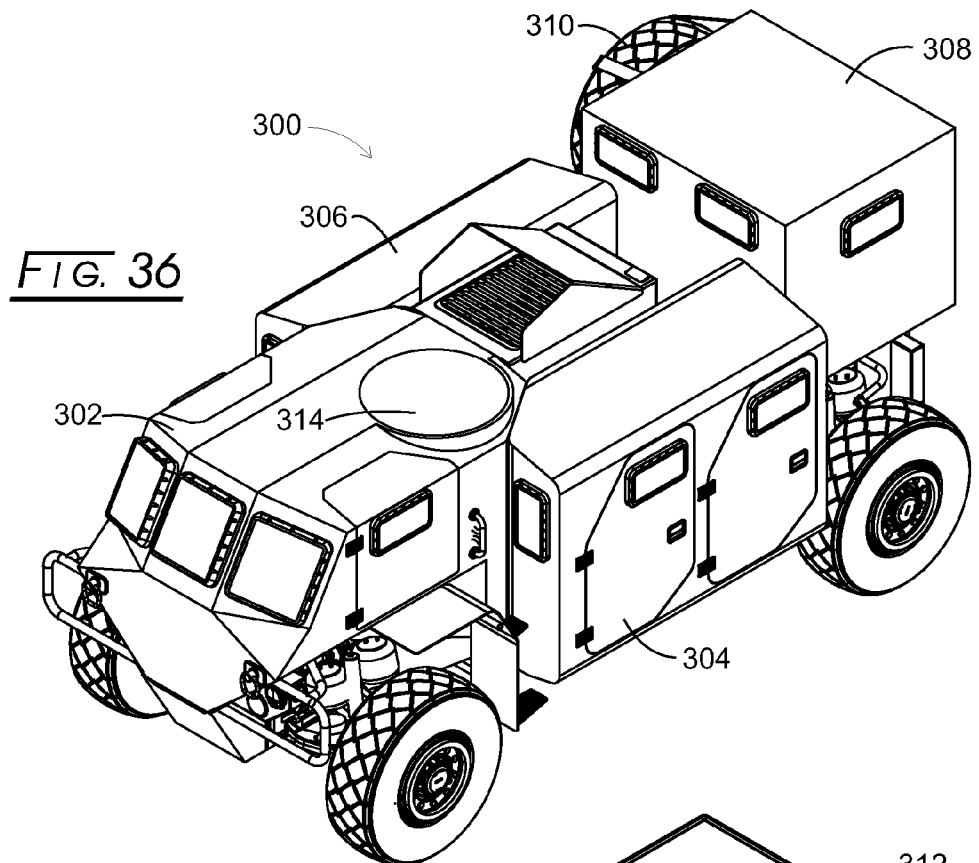
FIG. 36 is an isometric view of a troop carrier embodiment of the modular military vehicle having an enlarged driver module suitable for multiple occupants, as well as troop side pods and rear troop pod.
Figure 37:
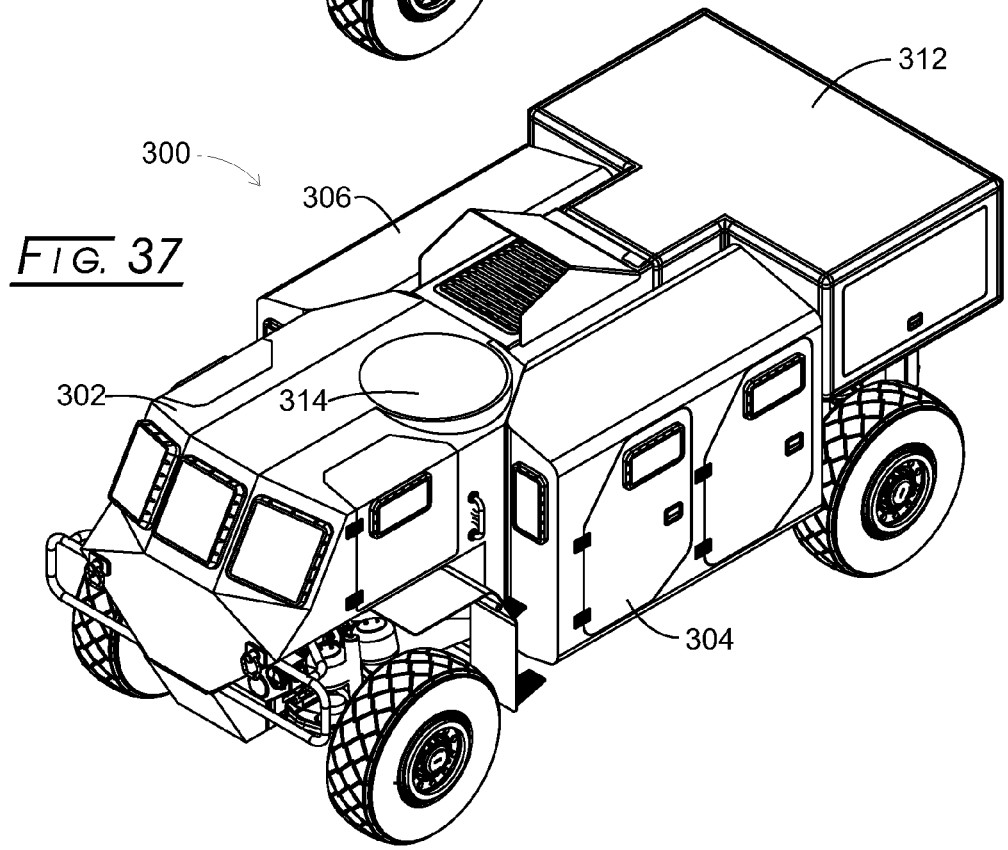
FIG. 37 is an isometric view of a troop carrier embodiment of the modular military vehicle with enlarged driver module, troop side pods, and rear storage pod.

FIG. 36 expands upon the embodiment in FIG. 27 for a modular military vehicle, 300, which has an expanded driver module, 302, which has been widened for accommodating a driver in the forward position and 2 soldiers seated side-by-side behind the driver for a total of 3 troops in driver module 302. Side modules or side pods, 304 and 306, are troop pods adapted for 2 soldiers to be seated in each module. A rear module, 308, also can seat 3 soldiers. A spare tire, 310, is shown affixed to the side of rear pod 308. FIG. 37 depicts the same basic vehicle 300, except that rear troop pod 308 has been replaced with a cargo or armament pod, 312. In both embodiment of vehicle 300, an overhead hatch 314, is located in the roof of driver module 302 for permitting a soldier to rise up for providing cover fire using rifle or other armament.

Commercial or civilian (non-military) versions of the modular vehicle are illustrated in FIGS. 32-35. When not in use, pods can be removed from the vehicle, decreasing the vehicle weight and improving aerodynamics and, therefore, increasing gas mileage and overall performance. In particular, a civilian modular vehicle, 200, is seen to be streamlined in design, but again using the in-line seating design to present a narrow head-on profile for vehicle 200. The rear module contains the engine, with a possible storage disposed behind the engine.

Figure 33:
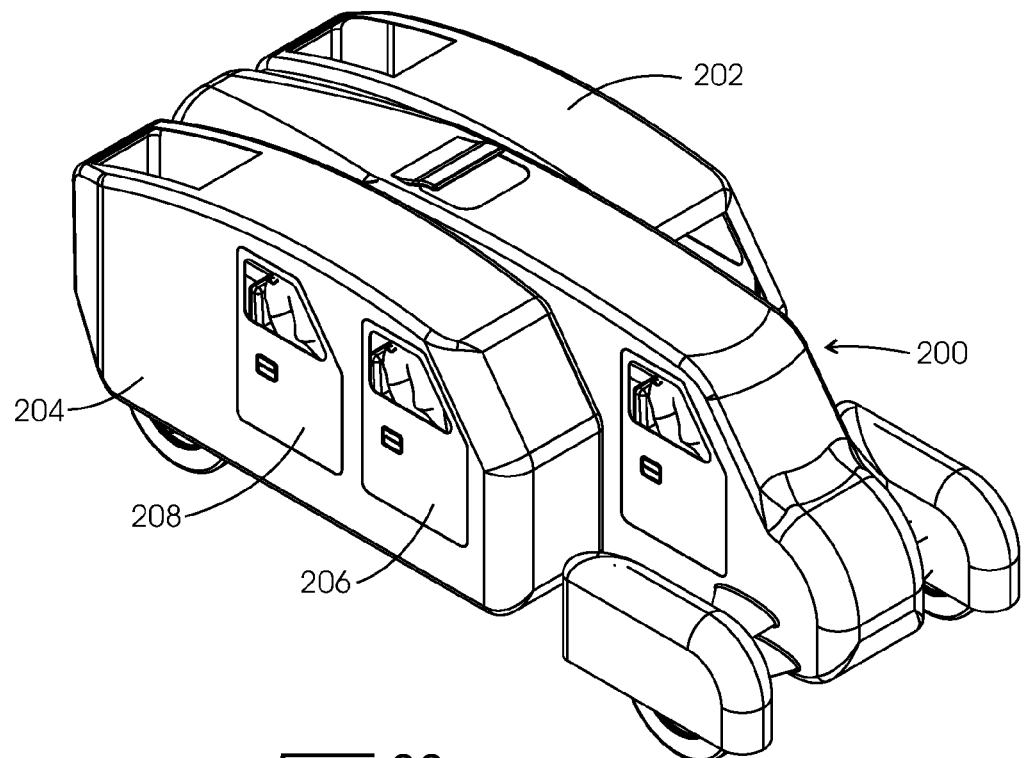
FIG. 33 is an isometric view of a streamlined modular passenger vehicle with side passenger pods.
Figure 34:
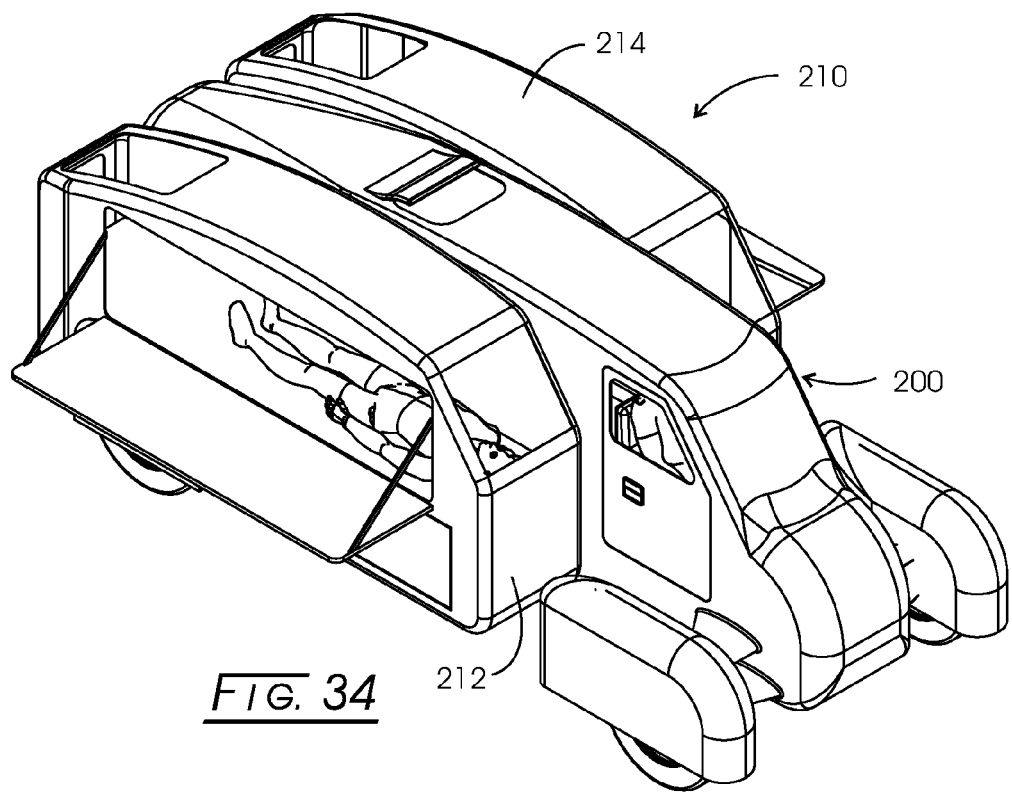
FIG. 34 is an isometric view of a streamlined camping modular vehicle with side pods.

In FIG. 33, side pods, 202 and 204, are hung onto the sides of vehicle 200. Entry for passengers in pods can be gained though doors, 206 and 208, placed in pod 204. Similar doors can be provided for side pod 202 and for the driver. A camping version, 210, is illustrated in FIG. 34, where camp stretcher pods 212 and 214 (fitted with skylights), are hung onto the sides of vehicle 200. In this embodiment, the sides of vehicle 200 will be open to side pods 212 and 214 in order to provide such treatment.

Figure 35:
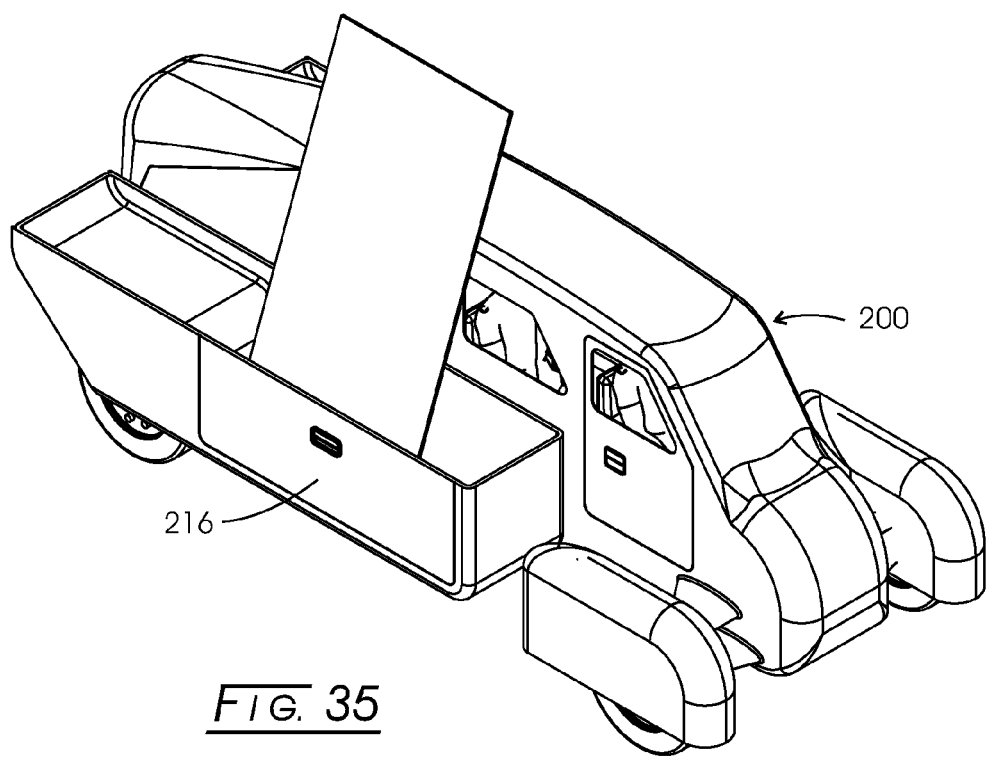
FIG. 35 is an isometric view of a streamlined passenger modular vehicle with cargo side pods.

A "pickup" version of the disclosed modular vehicle is illustrated in FIG. 35 where a side storage pod, 216, is carried on one side of vehicle 200 and entry/exit doors are provided on the side opposite for ingress and egress of people into vehicle 200. Again, depending upon the design goals, a rear storage pod can be carried at the rear of vehicle 200.

Figure 38:
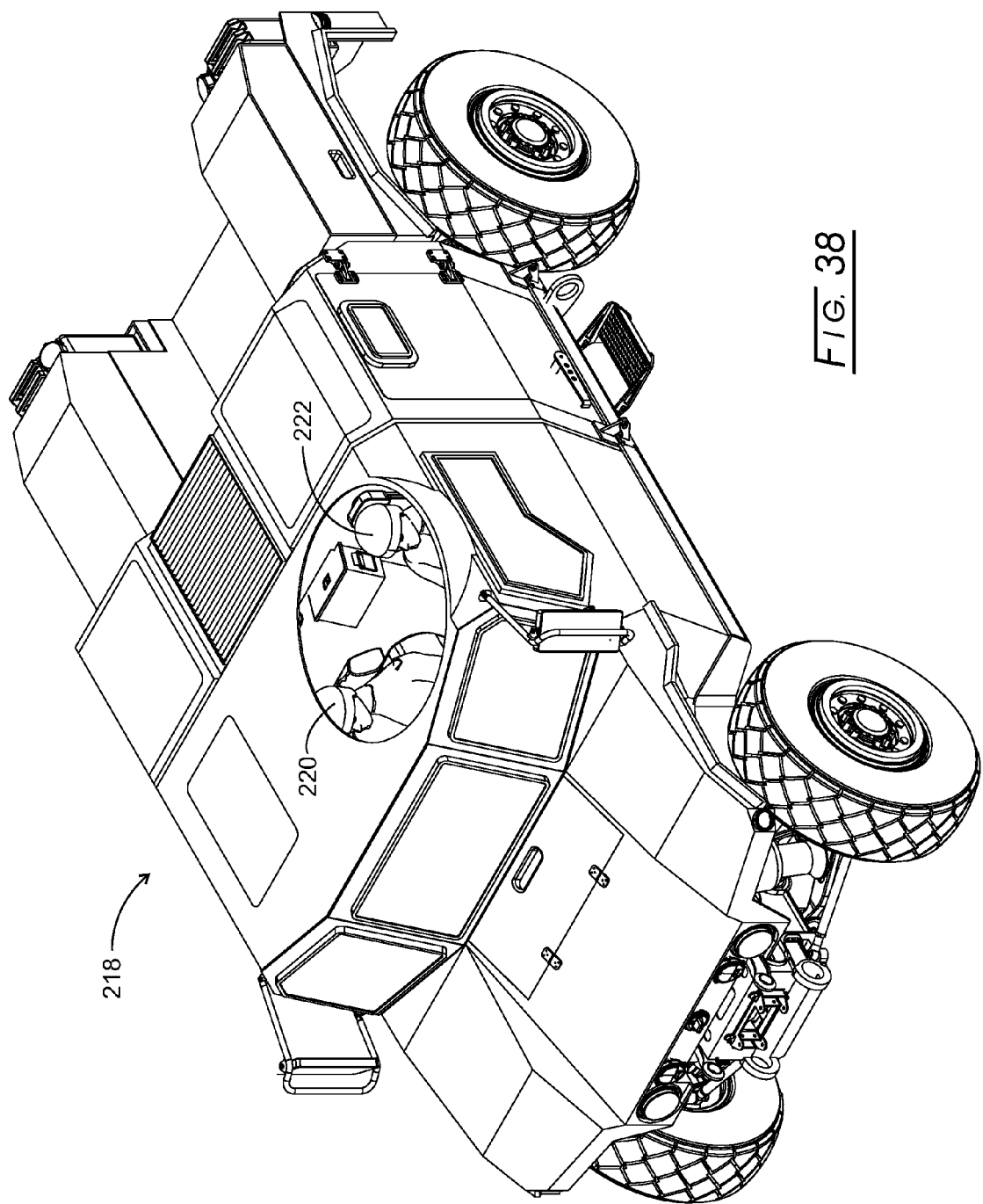
FIG. 38 is an isometric view of an alternate design for light tactical wheeled vehicle having 3 primary seats and two single-seat side pods.

FIG. 38 shows an alternate tactical wheeled vehicle design, 218, having 3 primary seats and two single-seat side pods. This vehicle also maintains the modular design of the prior embodiments as well as the blast survivability features. A driver, 220, and two additional personnel (only one of which, 222, is visible in FIG. 38) sit across width of vehicle 218. The rear of vehicle 218 is adapted in this embodiment for cargo and/or occupant with a variety of cargo and/or additional occupant pods adaptable to be carried at the rear of vehicle 218.

Figure 39:
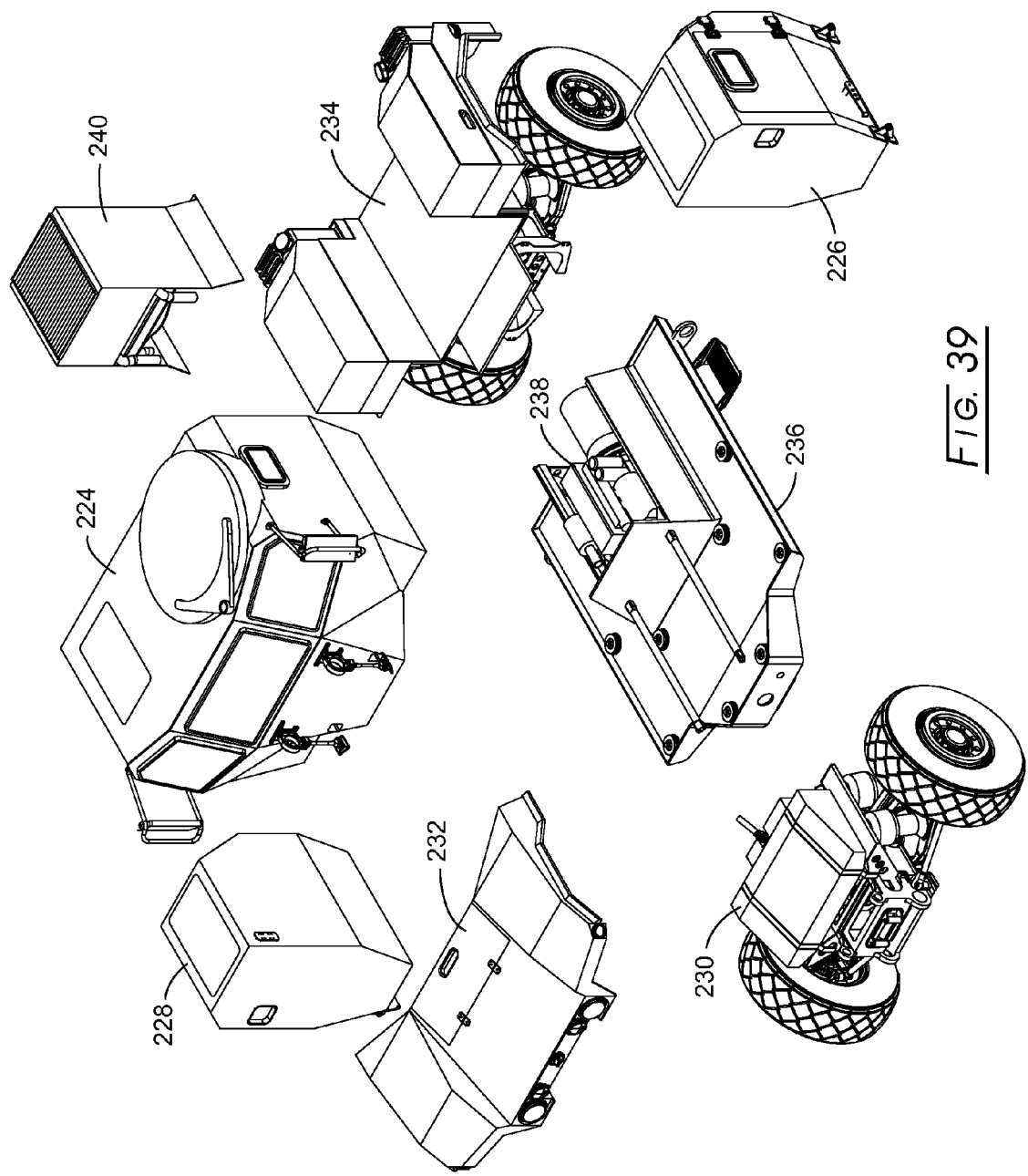
FIG. 39 is an exploded view of the vehicle of FIG. 38.
Figure 40:
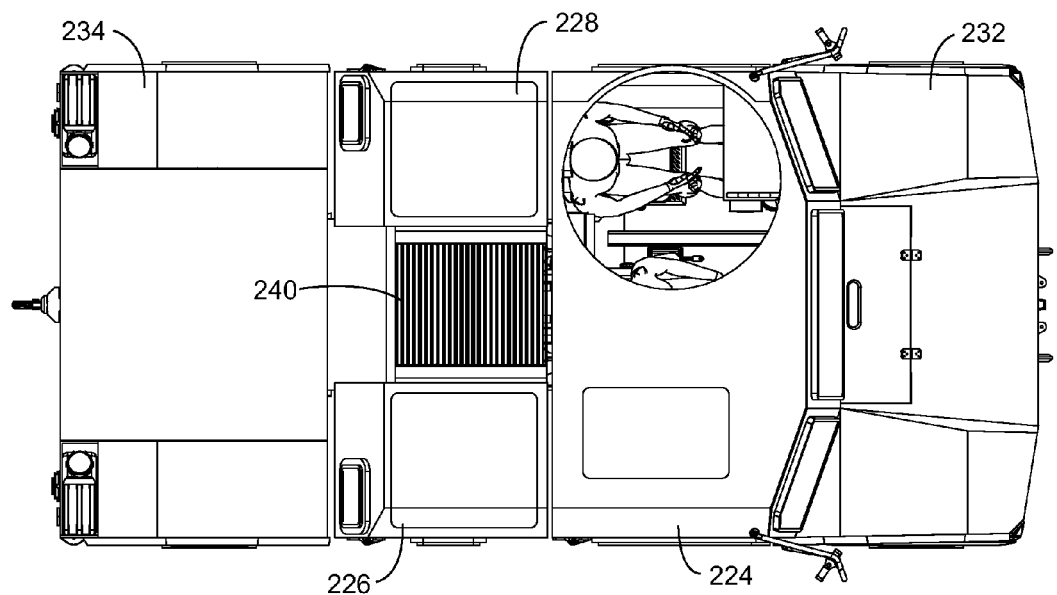
FIG. 40 is a top view of the vehicle of FIG. 38.
Figure 41:
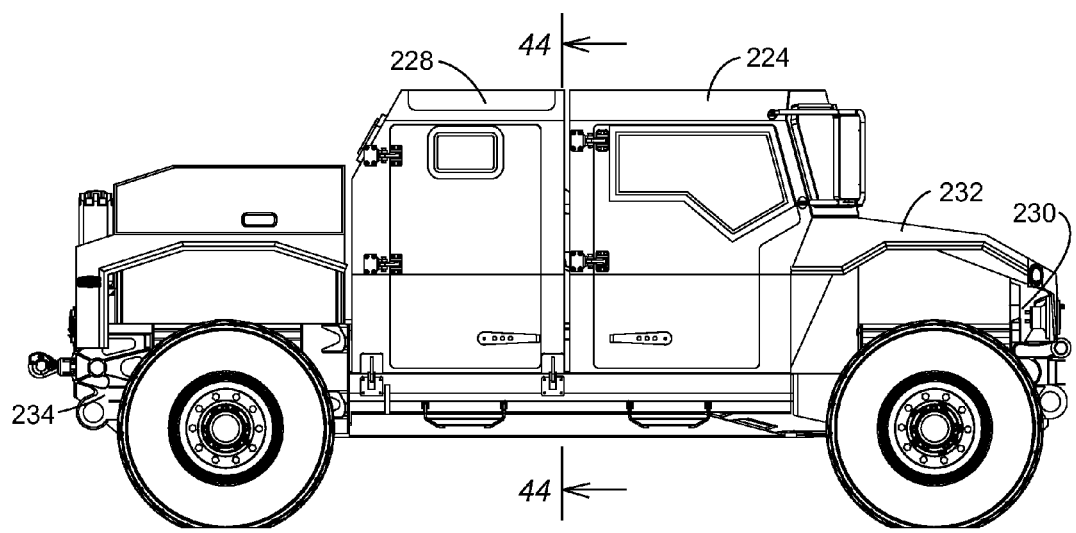
FIG. 41 is a side elevational view of the vehicle of FIG. 38.

Referring now to FIGS. 39-41, vehicle 218 is formed from a plurality of pods as seen in exploded view. A pod, 224, carries driver 220 and the two additional personnel seated on either side of driver 220. Alternatively, one of any of these three seating positions can be replaced with a gunner either with a remote or manual weapon station. A pair of single-person side pods, 226 and 228, are disposed immediately behind driver pod 224. A front tractive unit, 230, can be considered an extension of the chassis and contains the drive system for the front wheels, and is located forward of driver pod 224 and transmits power to the front wheels of vehicle 218. A hood, 232, covers the front tractive unit 230. A rear tractive unit, 234, can be considered an extension of the chassis and houses the drive system for the rear wheels and transmits power the rear wheels of vehicle 218. The front and rear tractive units 230 and 234 respectively may have an open framework design. A chassis, 236, is the platform upon which all of the other modules/pods are carried. Chassis 236 also houses an engine/motor, 238, which supplies power to front and rear tractive units 230 and 234, respectively, as well as for electrical and other systems in vehicle 218. Chassis 236 may be constructed from an open framework, such as from tubular members. Such an embodiment of a modular wheeled military vehicle, then, has a central module ("CM") for present purposes.

A cooling tower, 240, exhausts heat from vehicle 218, including from engine 238 and emits a "cooled" heat signature from vehicle 218 that could be used for tracking the location of vehicle 218. Heat exchangers located within cooling tower 240 aids in vehicle 218 emitting a "cooled" exhaust from engine 238. Note, the direction of airflow through the cooling core is from the top downward and the cooling air exits through the bottom of the engine bay area potentially through a central, apertured skid plate under the engine—this skid has many lightening holes for this purpose.

Figure 42:
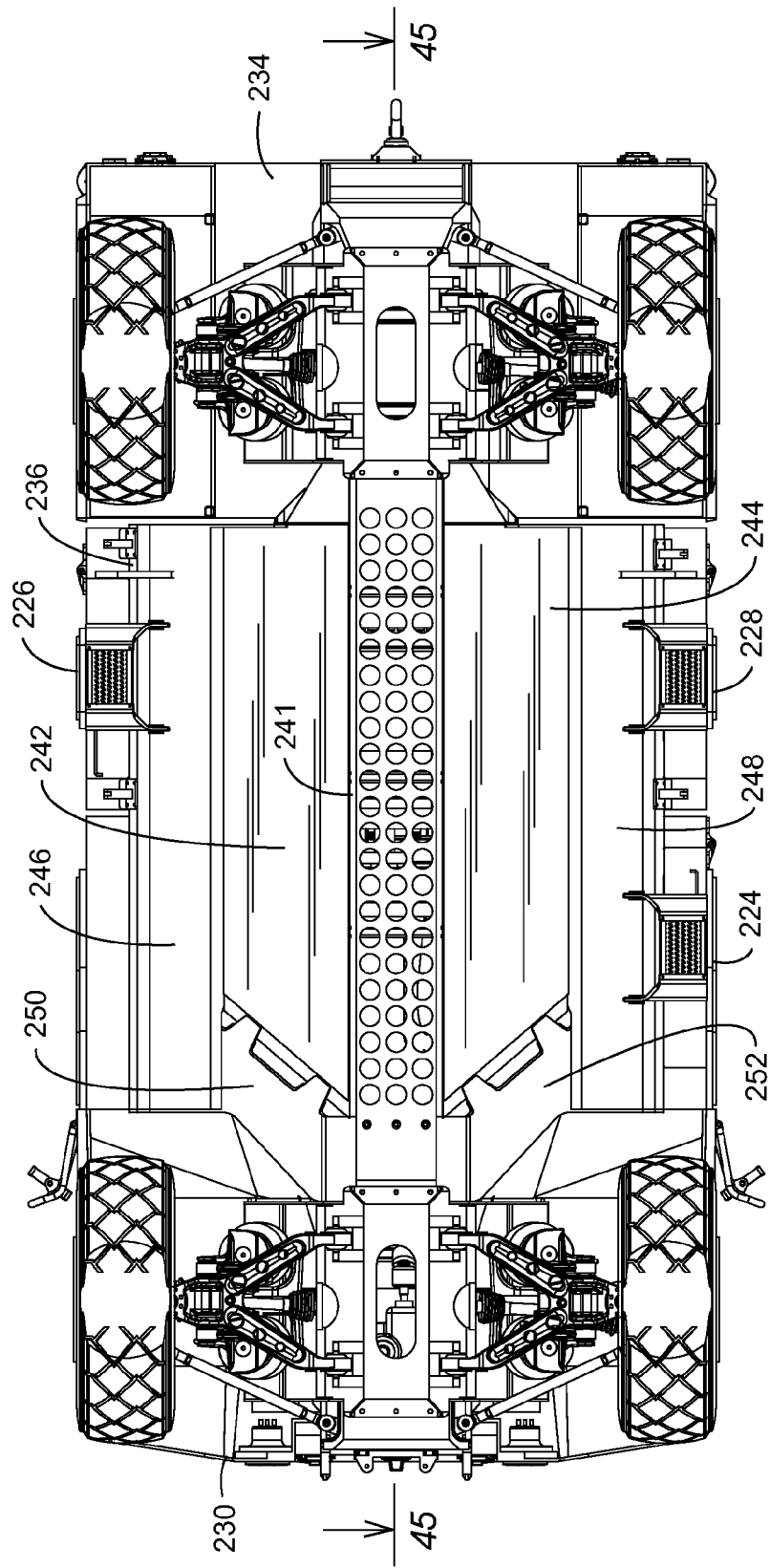
FIG. 42 is a bottom view of the vehicle of FIG. 38.

Referring now also to FIG. 42, the underside of chassis framework 236 and cooling tower 240 are designed to improve blast survivability and blast management from in ground buried explosives or the like. Basically, the underside of chassis 236 under each occupant area exhibits a V-shaped or blast deflecting design creating a V-shape shape to the hull that channels the blast energy in multiple directions through and around the vehicle while providing the structural underpinning for protecting the occupants. This includes channeling the blast up into cooling tower 240, which acts like a chimney through which the blast is vented up and away from vehicle 218. In particular an apertured skid plate, 241, if necessary, could serve as a structural chassis member and provide venting for a blast through its open surface and also act as the vehicle's heat exchanger cooling exit in the reverse flow direction during normal vehicle operation. Panels, 242 and 244, situated on either longitudinal side of skid plate 241 are sacrificial panels, such as, for example, composite material panels, i.e. panels made from material that cannot support much deformation before they fragment into small parts during the high pressure experienced during an under-vehicle blast. These sacrificial panels 242 and 244 only serve the purpose of protecting all of the mechanical elements of the vehicle from brush, rocks, and the like—they serve no other purpose than that and may not be necessary. The solid structural area of items 246 and 248, have minimal horizontal surface area and a reduced blast footprint limiting transfer of blast energy directly to occupants. It should be observed that panels 246 and 248 slope upwardly and outwardly from the vehicle underside. The same is true for forward chassis areas, 250 and 252. This makes it possible for the underside of chassis 236 to have multiple V-shapes or angled hull shapes to maximize blast deflection away and through the vehicle 218. It is worth noting that the apertures in skid plate 241 not only reduces weight but also provides cooling air to flow downwardly past engine 238.

In a broader sense, venting blast events through a "chimney" can be broadly applied in that the chimney does not have to pass through the engine compartment. For example, vehicles having the engine located in a forward position still can provide a centrally located chimney to vent blast events. Moreover, a non-modular vehicle can combine a central chimney with a blast deflecting hull design by shaping the underside of the occupant and driver space to be V-shape (for example multiple V-shapes) while minimizing the surface area most likely to be impacted by blast in order to improve occupant survivability.

Figure 43:
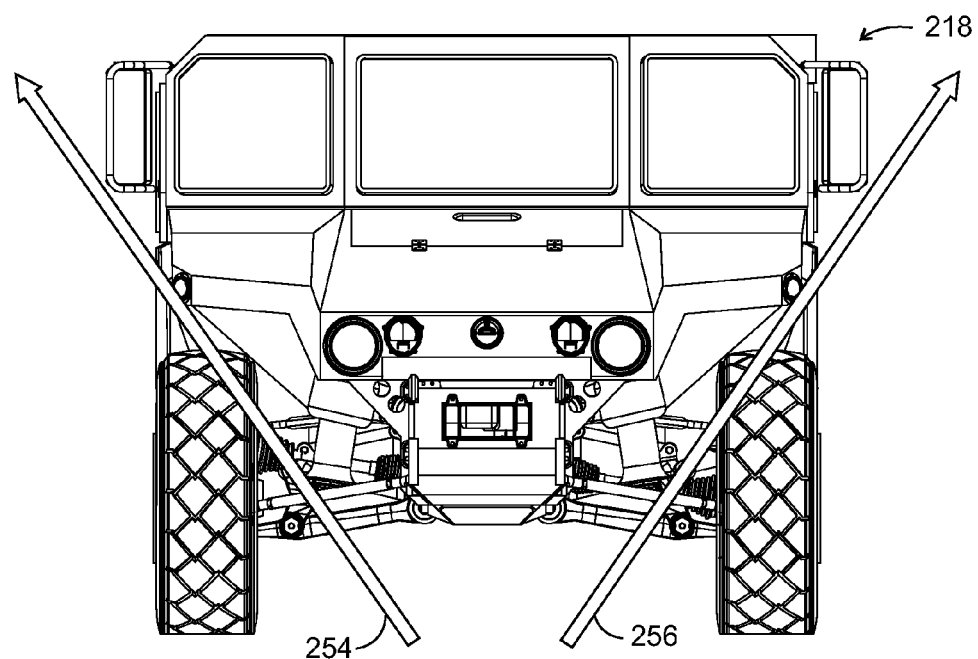
FIG. 43 is a front view of the vehicle of FIG. 38.
Figure 44:
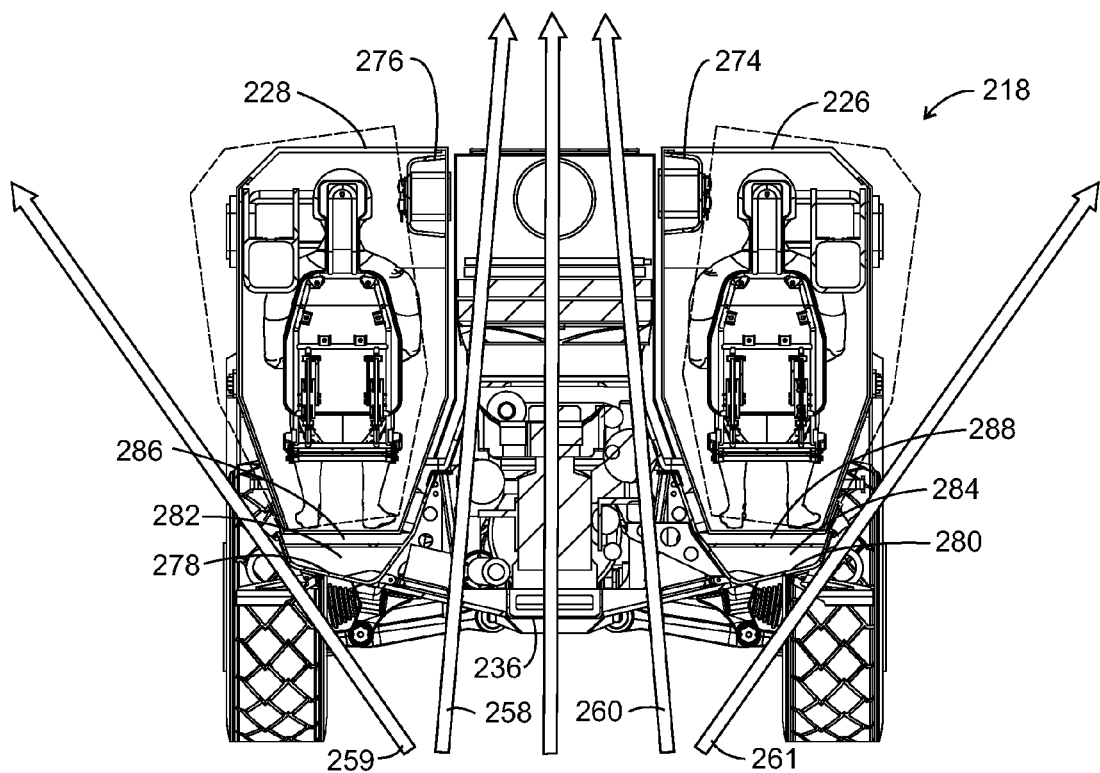
FIG. 44 is a sectional view taken along line 44-44 of FIG. 41.
Figure 45:
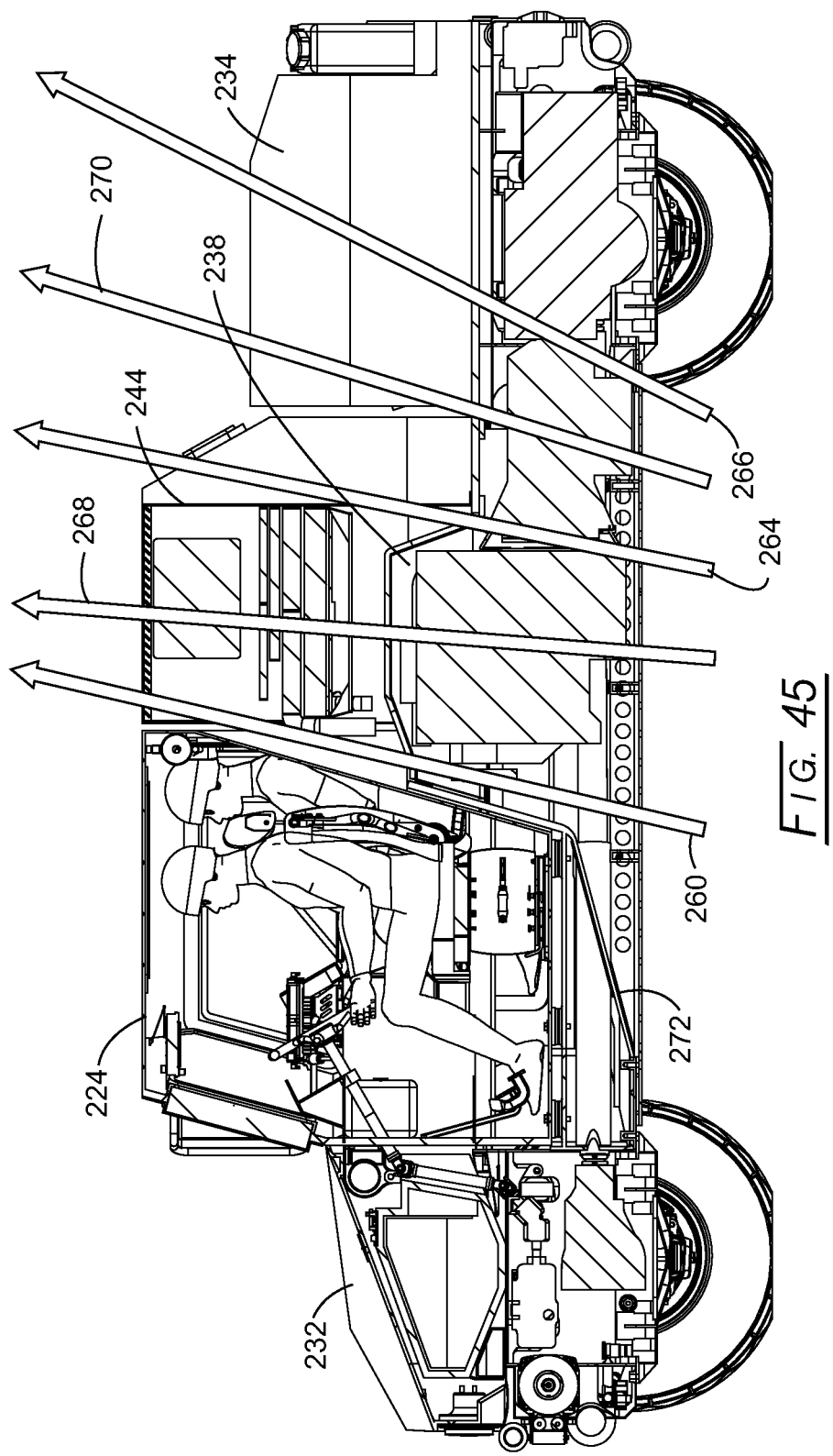
FIG. 45 is a sectional view taken along line 45-45 of FIG. 42.

The V-shape or blast deflecting chassis design under the side pod occupant also can be seen in FIGS. 43 and 44. In FIG. 43 blast arrows 254 and 256 show venting to the outside of the vehicle. In FIG. 44, a second blast path through the center of the vehicle is depicted by arrows, 258 and 260. Blast venting around the vehicle is shown by arrows 259 and 261. FIG. 45 shows multiple blast venting paths through arrows 260, 264, 266, 268, and 270. In particular, a blast event immediately underneath vehicle 218 passes through the engine compartment 238. The blast, then, continues up through cooling tower 240 and to the atmosphere outside of vehicle 218. All mechanical elements in this blast venting path, including engine 238 and cooling tower 240, are frangible and become sacrificial, reducing the loads imparted to the occupants.

In FIG. 44, side pods 226 and 228 also may be pivotally connected at their bottoms to chassis 236, in similar fashion as described in connection with the other vehicle embodiments disclosed herein. A tethering system, 274 and 276, are attached to the side pods and to driver pod 224 (see FIG. 41.) to permit additional blast energy to be absorbed by such side pod rotation without ejecting the side pods and risking additional injury to the personnel seated in each side pod. This rotation also serves to very rapidly increase the cross-sectional area of the center chimney, allowing the blast to vent rapidly upward, reducing the loads imposed on the vehicle occupants. It also is possible to affix driver pod 224 by a similar pivotal connection and with a tether permitting driver pod 224 to rotate forwardly during a blast/shock event to absorb additional energy. It also is possible that the driver pod and side pods do not pivot at all and are joined together for form a single occupant volume. In this design, while the blast venting path through the center chimney is reduced, this may be adequate to meet the military's requirement. Additionally, the front and rear tractive units are designed to have an open framework allowing the blast venting path to propagate through each tractive unit framework and outward above and beyond the vehicle.

In FIG. 45, a bulkhead, 272, is seen to run upwardly at an angle from the forward end of chassis 238 and, thence, at a less severe angle along the rear of driver pod 224 to provide additional blast protection to the occupants of cab 224. In FIG. 44, the blast deflecting and through vehicle venting shape of the chassis 236 underside is evident. Interior chassis volumes, 282 and 284, under side pods 226 and 228, respectively, and chassis sides 278 and 280 provide additional shock/blast attenuation and ballistic protection for side pods 226 and 228. Finally, an attenuation system, 286 and 288, disposed underneath side pods 226 and 228 and atop volumes 282 and 284, respectively, provide additional shock/blast attenuation by isolating the occupants of side pods 226 and 228 from blasts effects for increased occupant survivability. Driver pod 224 can have a tube pass through pod 224 allowing a structural member to pass connecting bulkhead 272 (not indicated in the drawings) of chassis 236 to bolt (or other fastening system that is reversible) directly to front tractive unit 232. Such tube would allow sufficient clearance to permit chassis 236 to move vertically if an impulse load was imparted to the bottom of chassis 236, i.e., when shock attenuating system of layers 282 and 284 become active and collapse somewhat. It also is likely that the shock attenuation material could be placed within chassis volumes 282 and 284.

Referring now to the multi-wheeled vehicle embodiments illustrated in FIGS. 46-49, the same modular concept with blast/shock attenuating system and deflecting features has been designed into multi-wheeled vehicle, 290, and tracked vehicle, 292 (see FIG. 48). Vehicles 290 and 292 have the same design but for the inclusion of tracks for vehicle 292; thus, only a single description will be given herein. Side pods, 294 and 296, carried by vehicle 290, and side pods, 298 and 300, are designed to carry 1 to 5 soldiers or other passengers in each such side pod. Cabs, 302 and 304, of vehicles 290 and 292, respectively, are designed for 1 to 3 soldiers to be seated with one of the soldiers being a driver. Referring additionally to FIGS. 47 and 49, exploded views of vehicles 290 and 292 are illustrated to be modular in design. In particular with reference to vehicle 290 in FIG. 47, a pair of fuel tanks, 306 and 308, are located on each side of driver pod 302 are sit atop a chassis, 310. Chassis 310 has the same design features as chassis 236, described above. Thus, chassis 310 has a blast deflecting shape (quad "V" hull) with a centrally-disposed engine forming a chimney through the vehicle and providing multiple blast venting paths around the vehicle for under vehicle blast events. A rearwardly and centrally located storage pod, 312, is located between side troop pods 294 and 296. A cooling tower, 314, is located over the engine compartment is designed to be part of the chimney through which blast venting occurs protecting vehicle occupants, much in the manner as described in connection with vehicle 218. The problem that exists with the current vehicles used is that the vehicle design places the occupants between the wheels or tracks in close proximity to the ground and, because of the vehicle widths, there is very little possibility of there being any substantial blast deflecting elements and or venting possibilities. The disclosed design creates a blast deflecting design under each of the occupant spaces placing the occupant further from the blast source and substantially above the chassis. A shock attenuation system, like layers 286 and 288, are placed between chassis and occupant pods and also as with the light tactical wheeled vehicle, shock attenuation material can be placed within the chassis. This shock attenuation system also is placed between the driver cab modules and the chassis elements. Occupant pods can readily be replaced with other pods or functional elements including a mobile gun system.

Referring now to FIGS. 48 and 49 and tracked vehicle 292, fuel tanks, 316 and 318, are located beside a driver pod, 304, and atop a chassis, 320. Side occupant pods 298 and 300, and a cooling tower, 322, are provided in the same manner as described in connection with vehicle 290. The underneath side of tracked vehicle 292 is revealed in FIG. 49B. The large opening for blast events to travel around where the occupants are seated can be seen.

Figure 50:
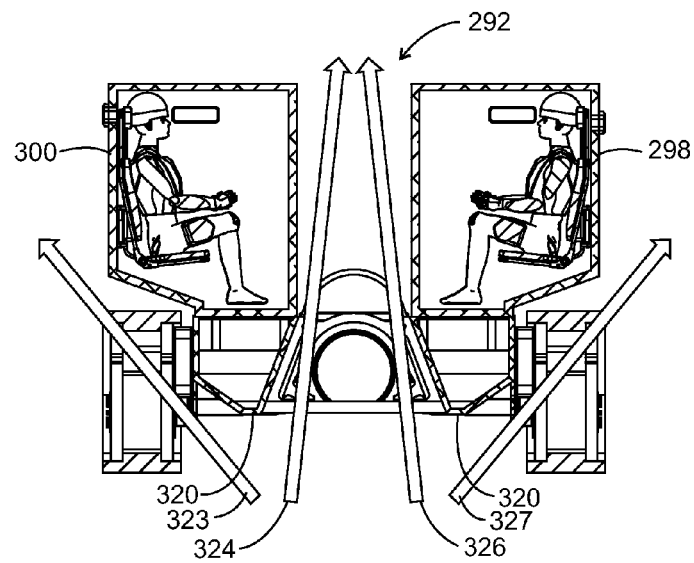
FIG. 50 is a section view along line 50-50 of FIG. 48.
Figure 51:
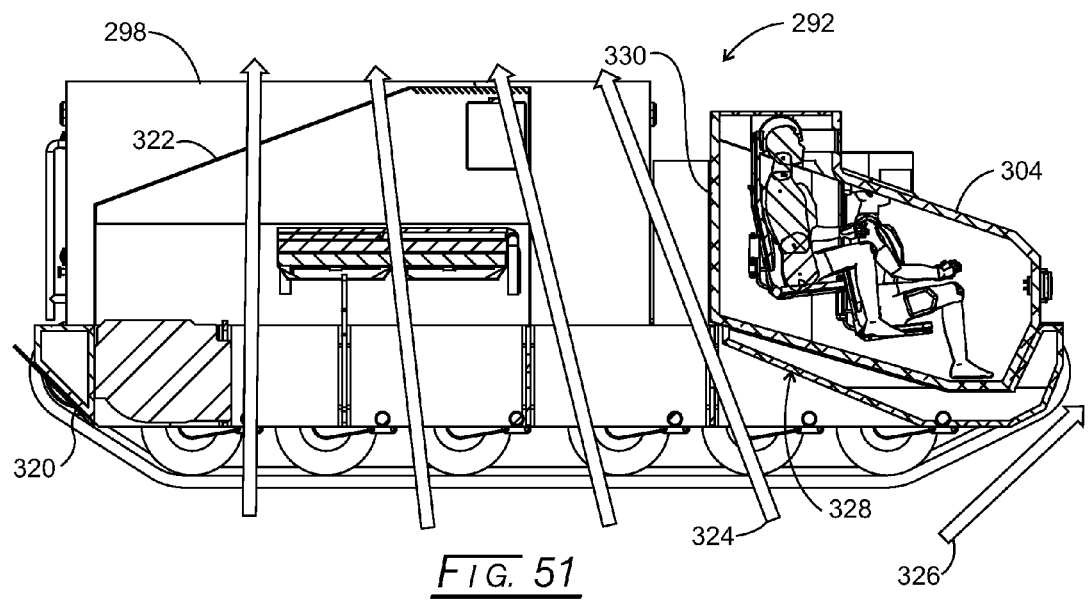
FIG. 51 is a section view along line 51-51 of FIG. 48.
Figure 52:
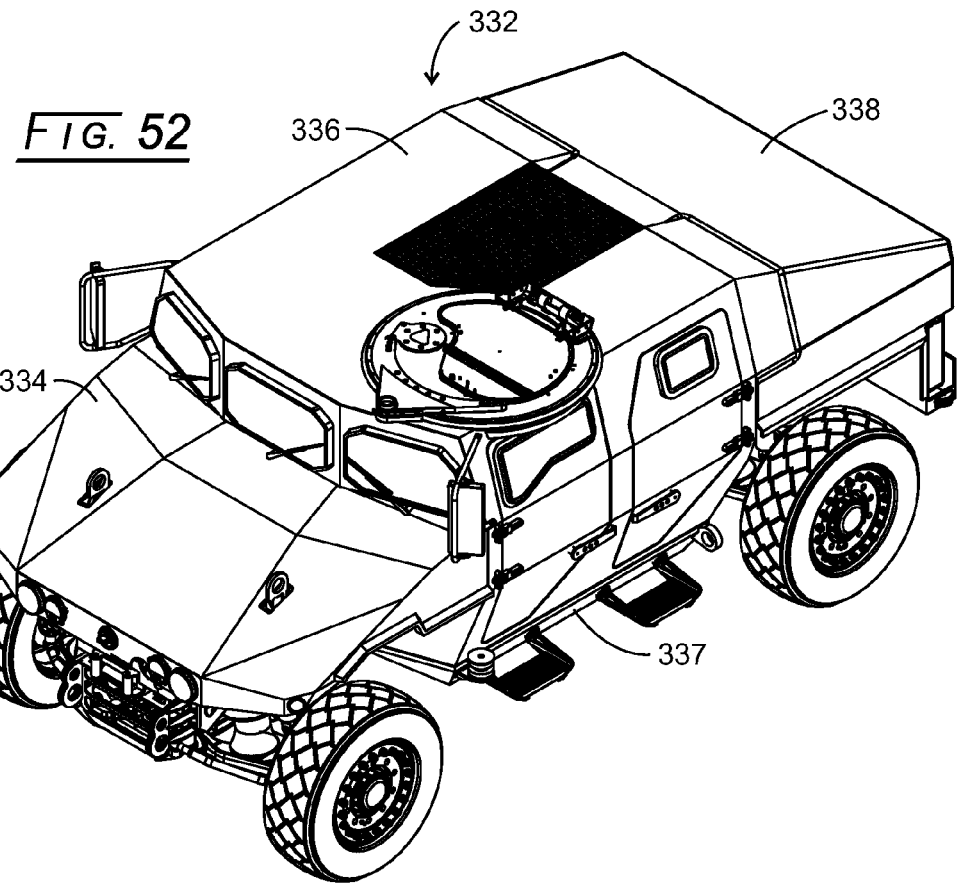
FIG. 52 is an isometric view of yet another embodiment of the disclosed blast venting technology as adapted for a wheeled tactical vehicle.
Figure 53:
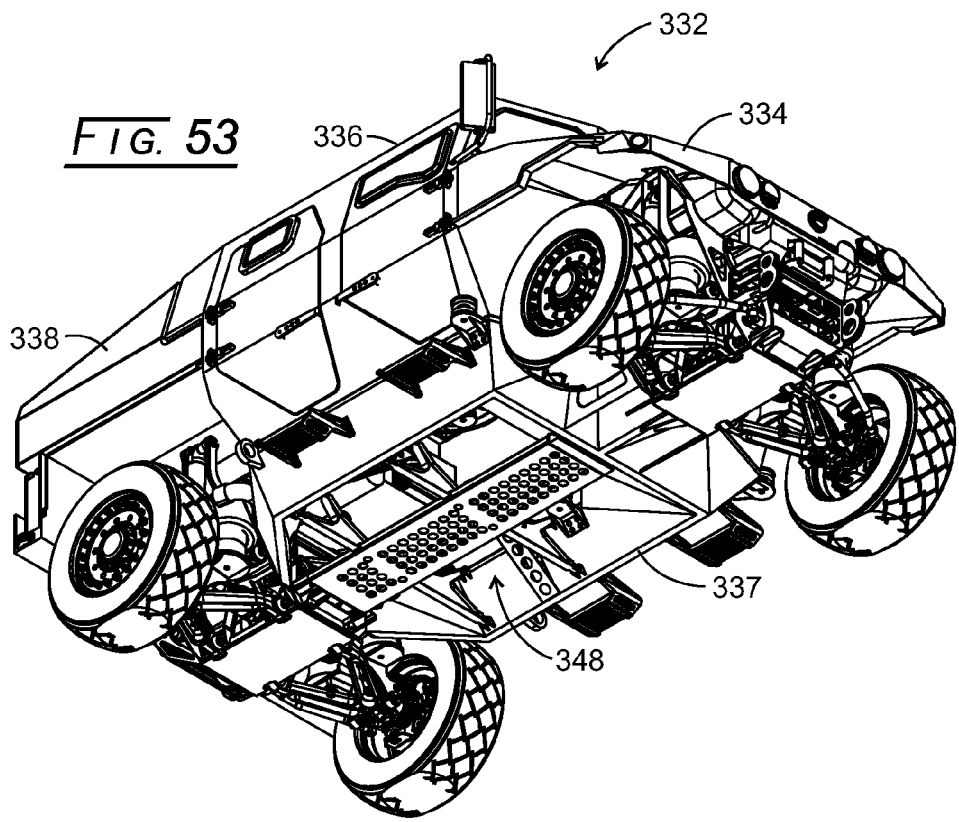
FIG. 53 is an isometric view from beneath the vehicle of FIG. 52.
Figure 54:
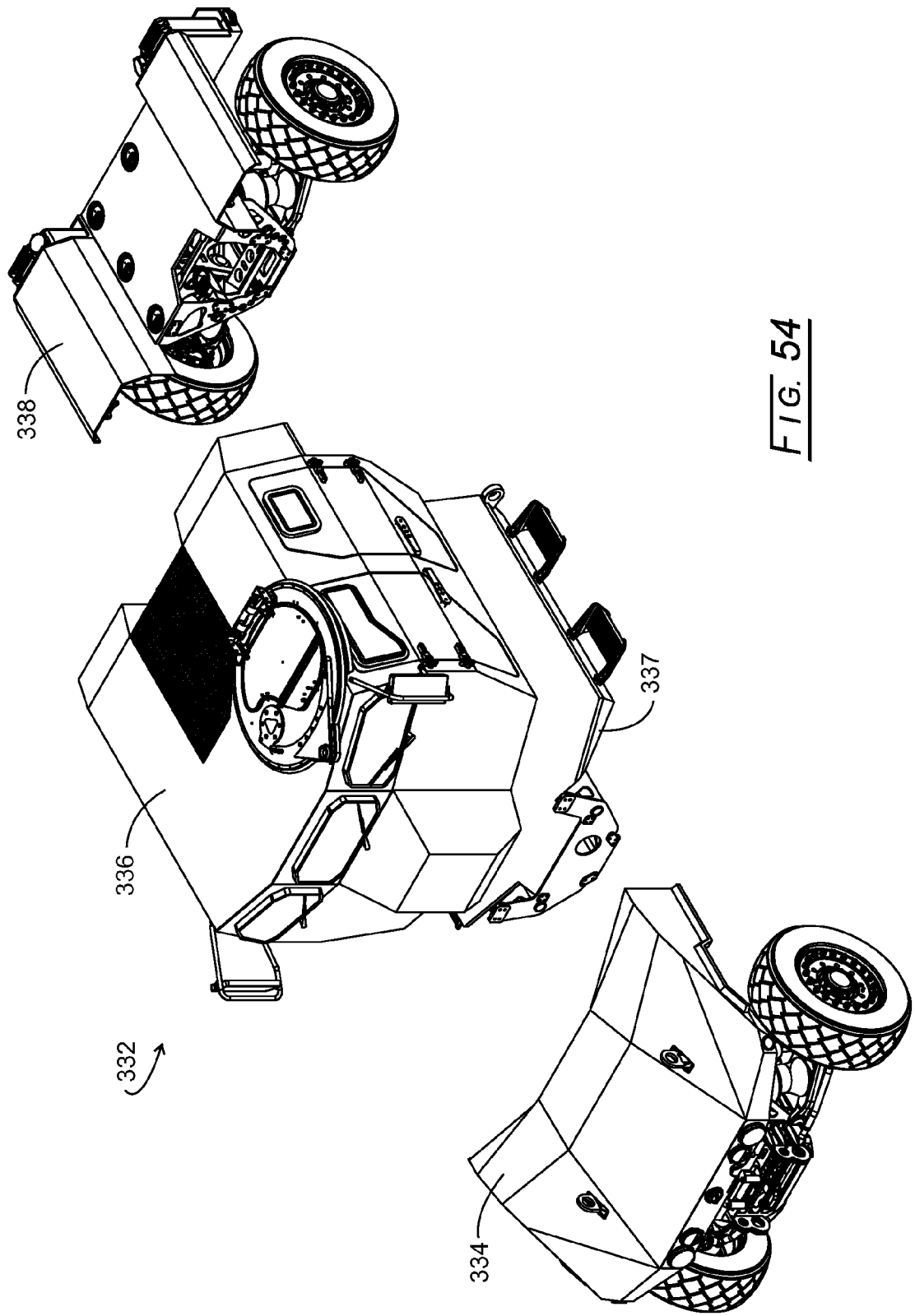
FIG. 54 is an exploded view of the vehicle of FIG. 52.

Referring now to FIGS. 50 and 51, vehicle 292 of FIG. 48 is illustrated in side-to-side and longitudinal cross-section views, respectively. In particular, blast paths, 323, 324, 326, and 327, are shown to direct the blast energy and debris upwardly and behind driver pod 304 due to an upwardly sloping blast plate, 328, located beneath driver pod 304, for blast path 324; and due to the upward sloping forward design of blast plate 328. A bulkhead, 330, located on the rear of driver pod 304 continues to keep the cab occupants safe as the blast energy and debris continues upwardly along blast plate 328 and then beside bulkhead 330. Any equipment and vehicle components placed centrally in the vehicle and rearwardly of bulkhead 330 are sacrificial to keep the occupants in driver pod 304 safe from any underneath road blasts.

Referring now to the wheeled light-tactical vehicle shown in FIGS. 52-60, a WLTV, 332, embodies the modularity and blast venting technology disclosed and described above. In particular with reference to FIGS. 52-54, vehicle 332 is composed of a front and rear tractive unit, 334 and 338 respectively and an occupant pod, 336. The basic components and construction of vehicle 332 is quite similar to the vehicles described above. A lower V-shape portion is represented in FIGS. 52-60 by numeral 337.

Figure 55:
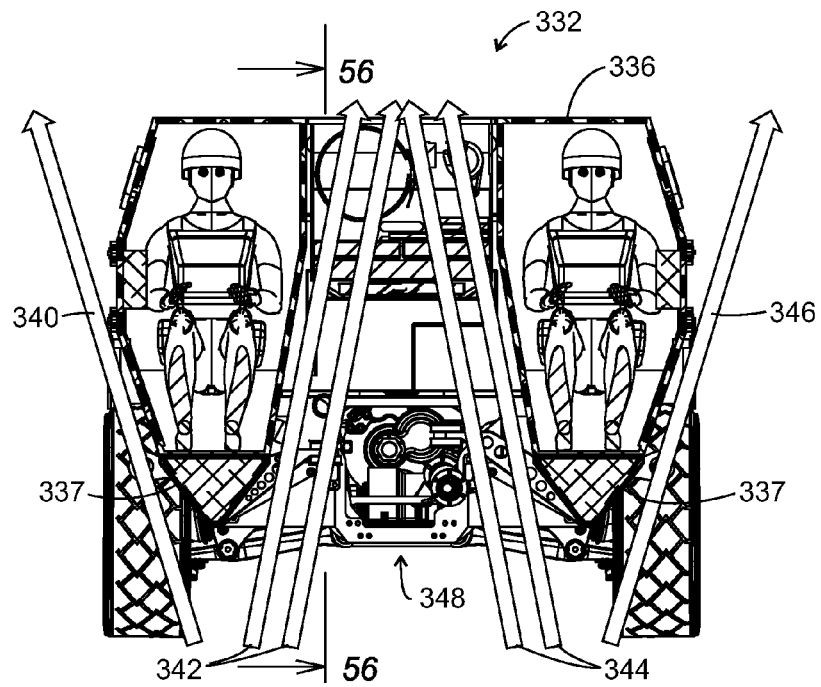
FIG. 55 is a section view along line 55 of FIG. 56 for the vehicle of FIG. 52.
Figure 56:
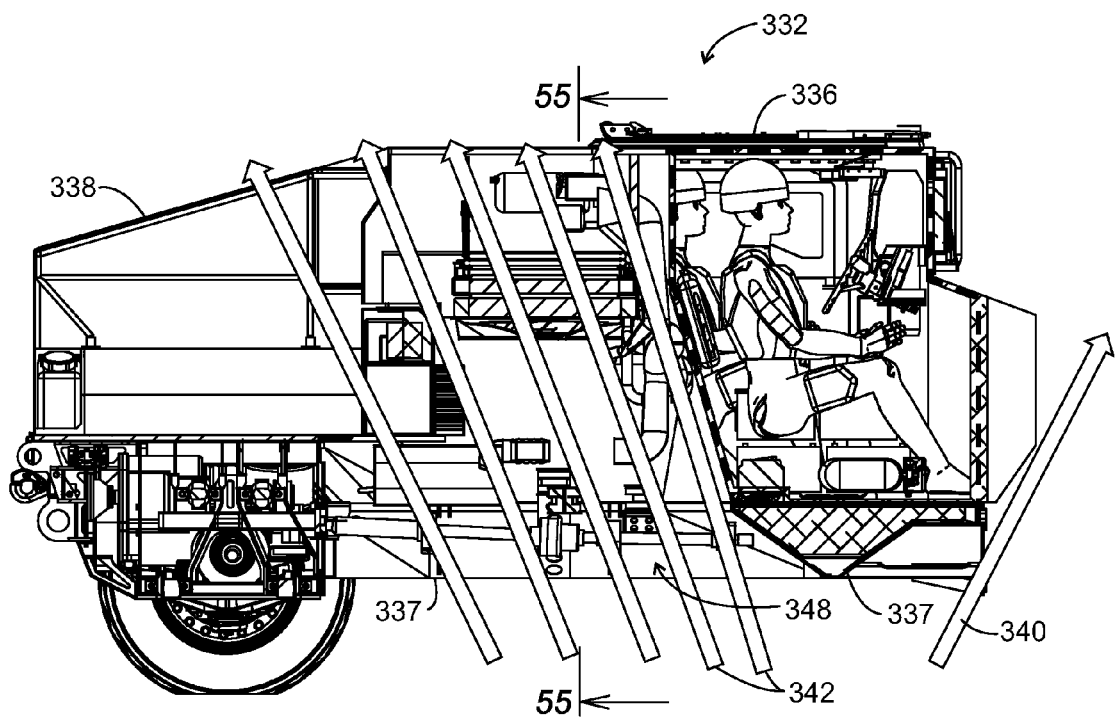
FIG. 56 is a section view along line 56 of FIG. 55.
Figure 57:
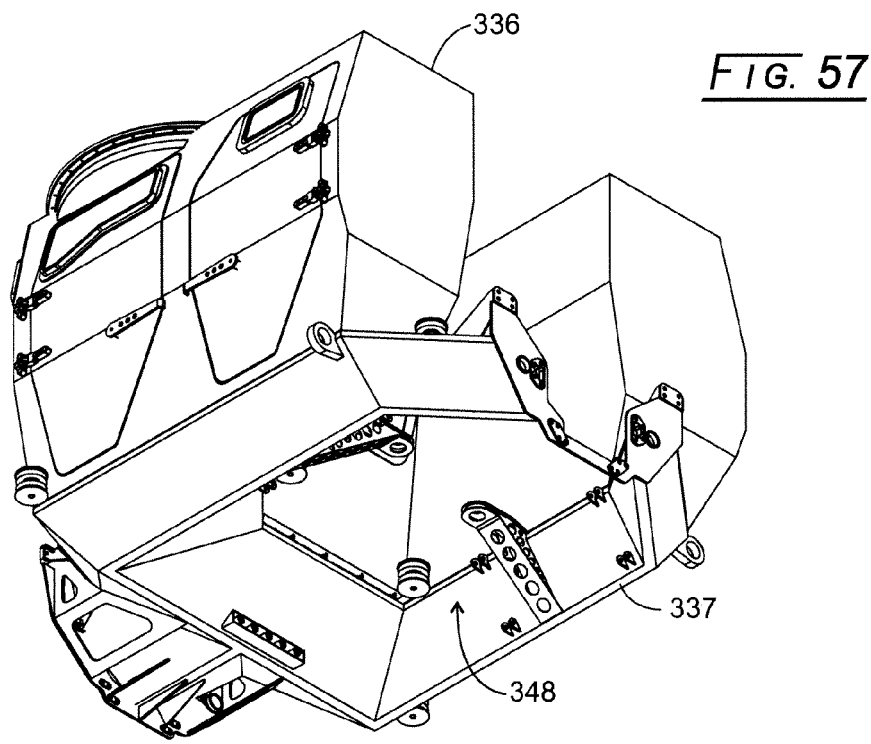
FIG. 57 is an isometric view from beneath the occupant pod of the vehicle of FIG. 54.
Figure 58:
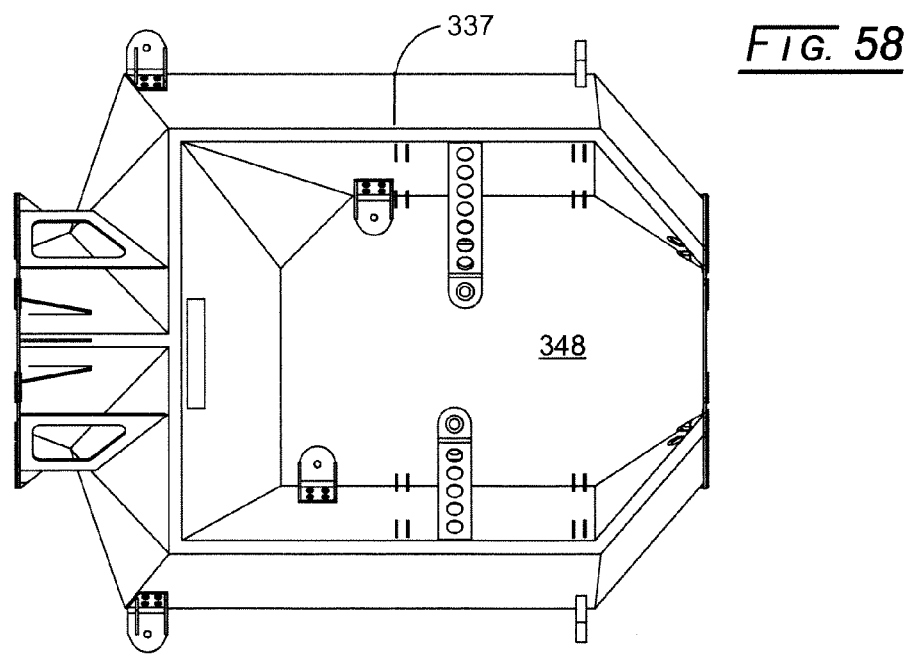
FIG. 58 is a bottom view of the occupant pod of FIG. 57.

Of importance for present purposes is the blast paths designed into vehicle 332 to deflect blast energy and blast debris around occupant pod 336. Referring now to FIGS. 55 and 56, which are cross-sections through vehicle 332, the V-shaped curvilinear design of the underside of vehicle 332 is revealed in the same manner as described above for the other vehicle embodiments. Also shown is the central vent chimney created to permit the blast energy and debris to travel along such chimney and outside of the confines of vehicle 332. The blast paths are designed as 340-346. Any vehicle components within the central blast chimney are considered sacrificial for the benefit of saving the pod occupants. Reinforced occupants spaces, as shown in FIGS. 55 and 56 are helpful in defining the deflected blast paths, as well as in contributing to the safety of the vehicle occupants. The entry of the central blast chimney is revealed in FIGS. 57 and 58 and is identified by item 348.

Figure 59:
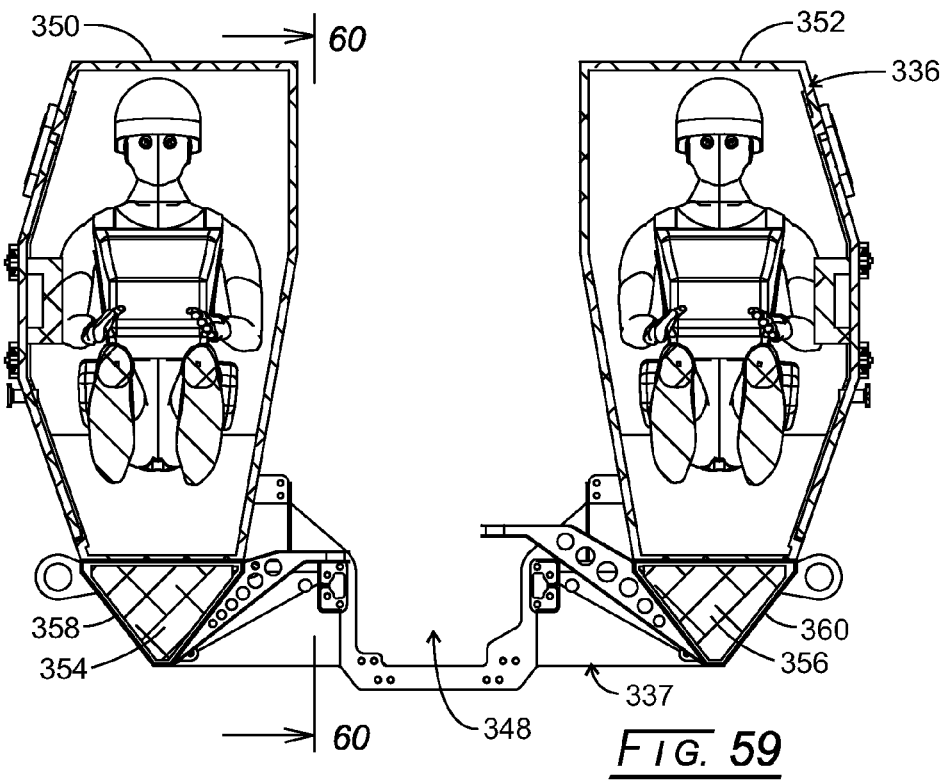
FIG. 59 is a sectional view along line 59 of FIG. 60 of the vehicle of FIG. 52.
Figure 60:
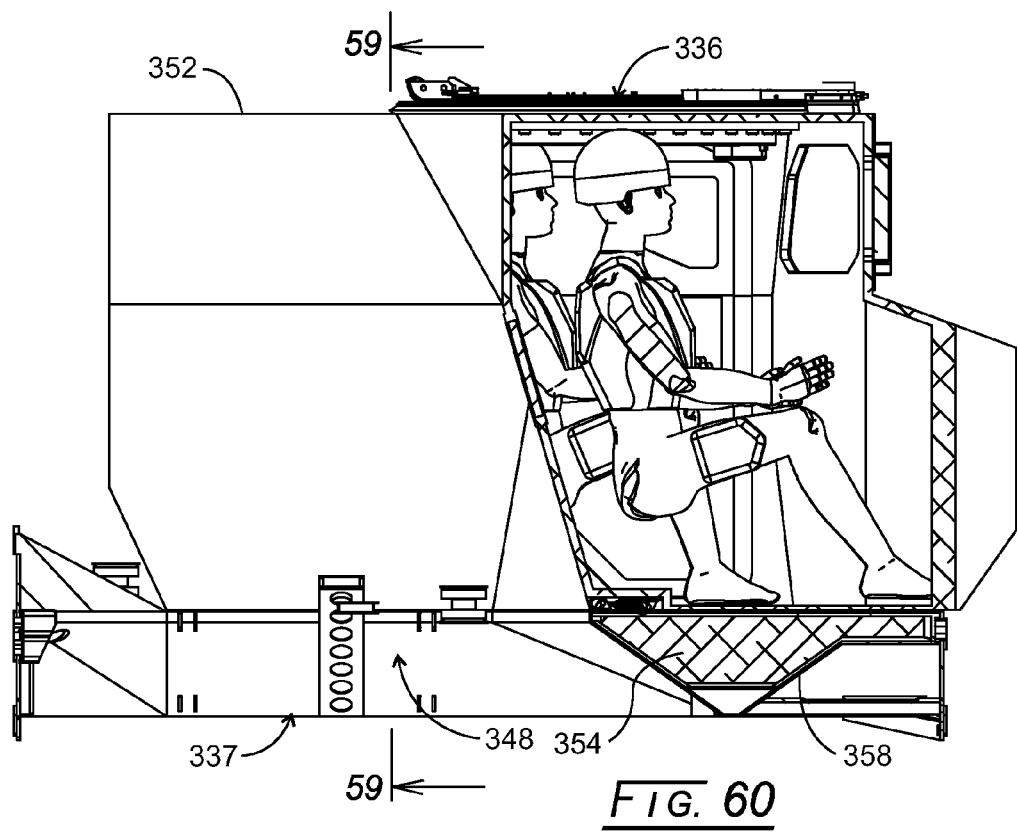
FIG. 60 is a sectional view along line 60 of FIG. 59.
Figure 61:
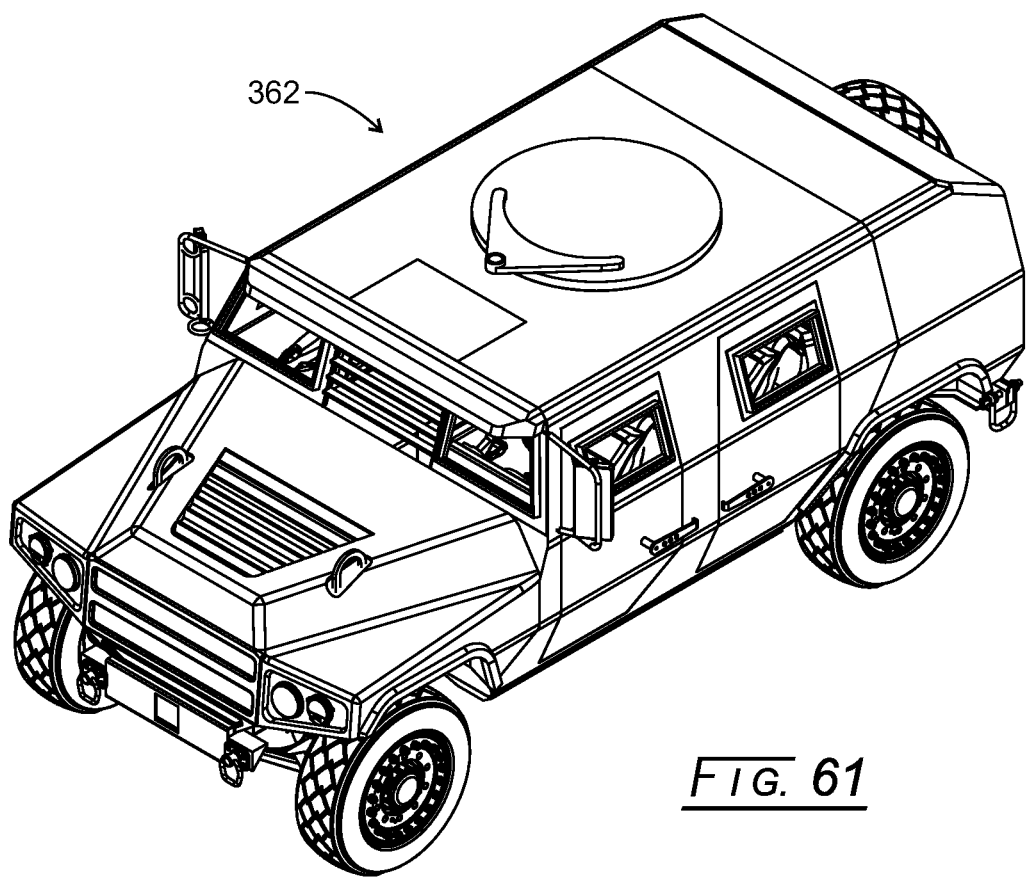
FIG. 61 is an isometric view of yet another embodiment of the disclosed blast venting technology as adapted for a HMMWV type vehicle.
Figure 62:
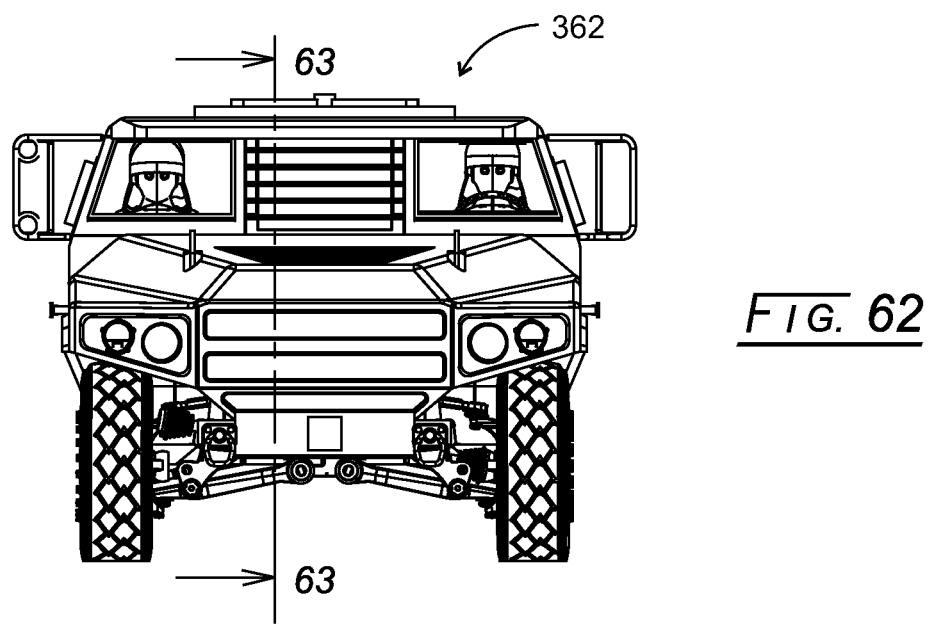
FIG. 62 is a front view of the vehicle of FIG. 61.

Referring now to FIGS. 59 and 60, two occupant spaces, 350 and 352, for the occupants of occupant pod 336 are shown in further detail. In particular, blast attenuating material, 354 and 356, are seen disposed beneath each occupant space 350 and 352, respectively, and such material is retained, in part, by the triangular shaped chassis member, 358 and 360, which provide a lower V-shape or blast deflecting shape to deflect blast energy and blast debris around each occupant space.

Figure 63:
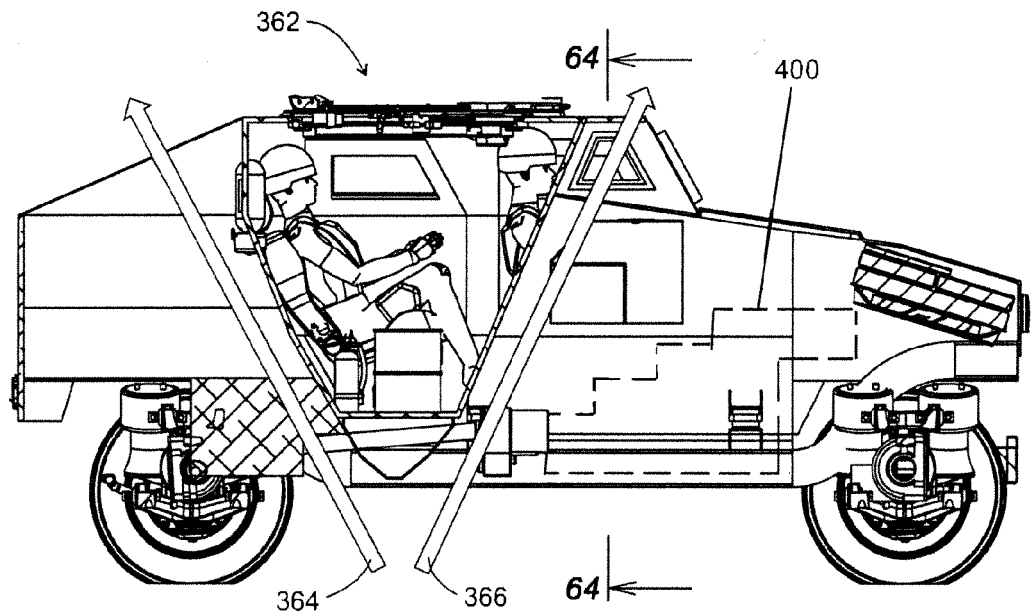
FIG. 63 is a sectional view along line 63 of FIG. 62.

Referring now to the HMMWV wheeled vehicle embodiments depicted in FIGS. 61-66, a wheeled vehicle 362, is rather conventional in component locations, having a front engine 400 (schematically shown in FIG. 63), central occupant space, and rear storage area. It, however, is very unconventional in design, because it has blast-deflecting venting designed into it, as more particularly seen in FIGS. 63 and 64. In FIG. 63, blast paths, 364 and 366, are seen to go upwardly being deflected away from the occupant space. Any vehicle components in the blast path are deemed sacrificial in order to avoid occupant injury.

Figure 64:
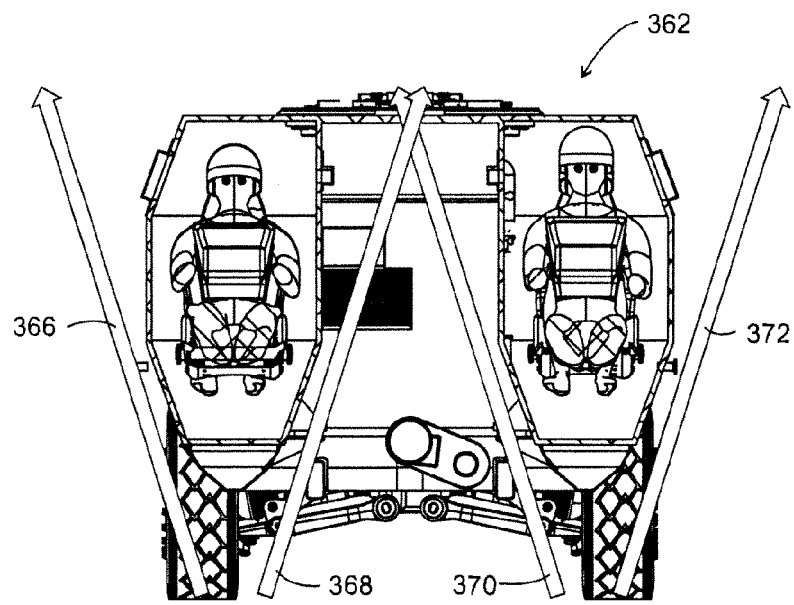
FIG. 64 is a section view along line 64 of FIG. 63.

By the same token, in FIG. 64 the design of the underside of the occupant pod creates multiple blast paths 366, 370, 372 and 368 around the occupant space. Blast paths 368 and 370 traverse upwardly through a blast chimney inwardly within vehicle 362, again with any components within the chimney being deemed sacrificial.

Figure 65:
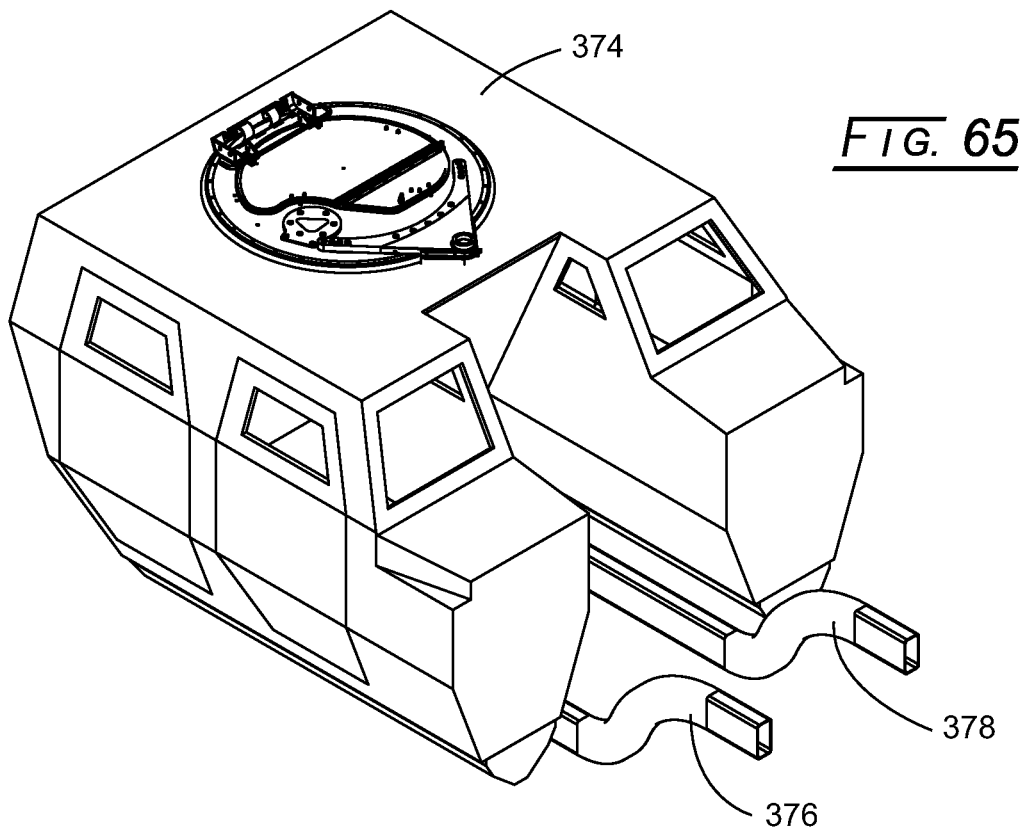
FIG. 65 is an isometric view of the occupant pod of the vehicle of FIG. 61.
Figure 66:
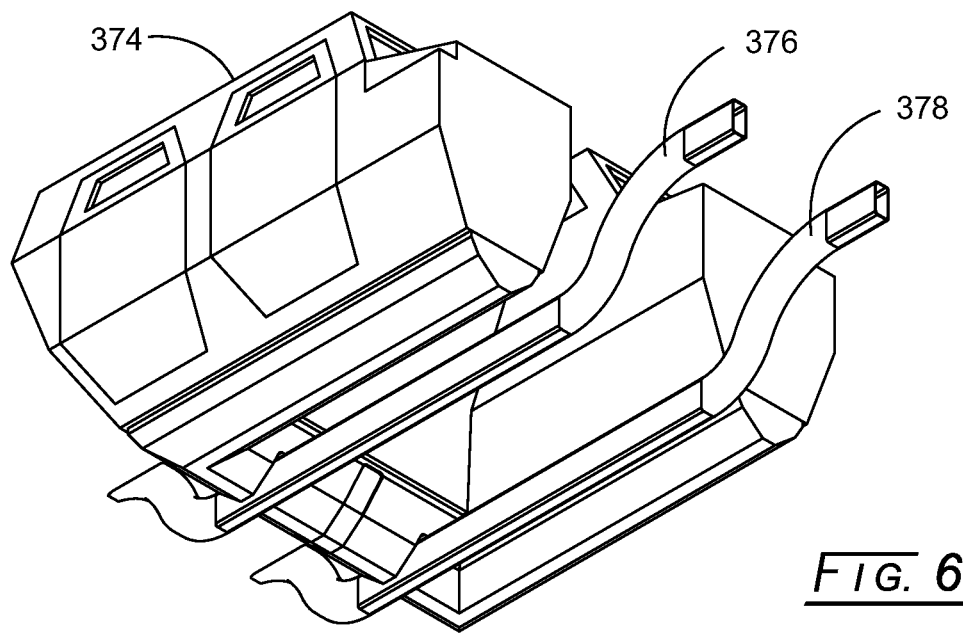
FIG. 66 is an isometric view from beneath the occupant pod of FIG. 65.

Vehicle 362 has a rolling chassis supporting 3 pods: a forward engine pod, a central occupant pod, and a rear, carrier pod. An occupant pod, 374, is illustrated in FIGS. 65 and 66. A pair of longitudinal rails, 376 and 378, support occupant pod 374. Rails 376 and 378 similarly can support the forward engine module, as well as a rear cargo module. Note the large opening on the underneath side of pod 374 between rails 376 and 378 for a blast to travel safely.

Figure 67:
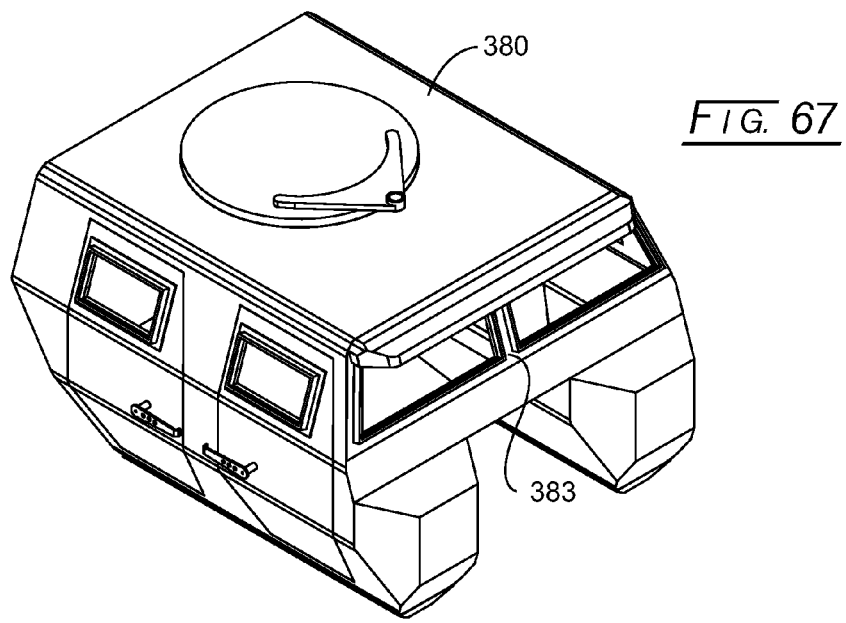
FIG. 67 is an isometric view of the occupant pod of a HMMWV type vehicle, like that in FIG. 61, but with a full with a full front windscreen.
Figure 68:
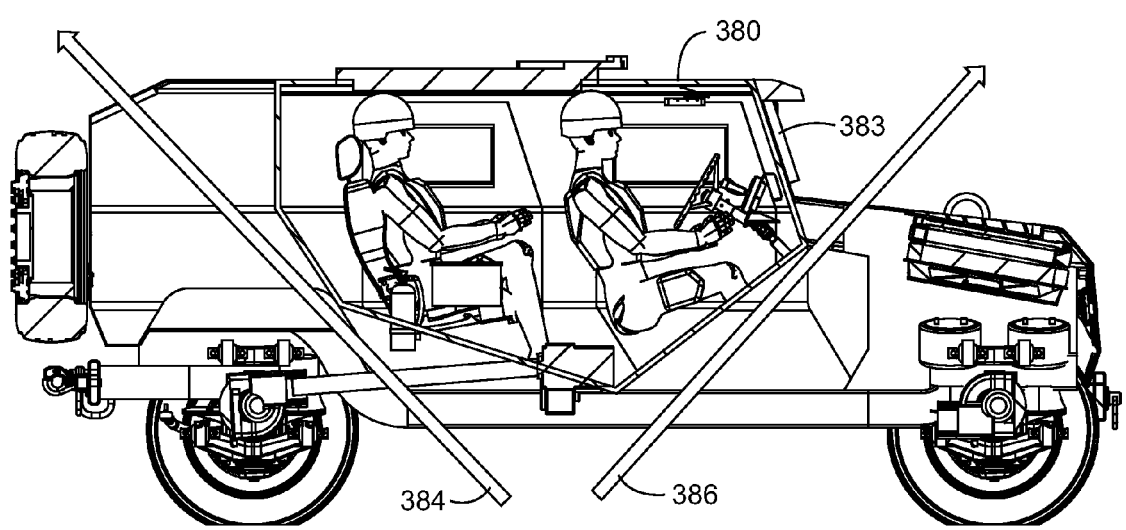
FIG. 68 is a side elevational view of the vehicle of FIG. 67.

FIGS. 67 and 68 depict an alternative HMMWV wheeled vehicle design with a full front windscreen. To that end, an occupant pod, 380, has a full front windscreen, 383. Blast paths, 384 and 386, are seen to go upwardly being deflected away from the occupant space. Any vehicle components in the blast path are deemed sacrificial in order to avoid occupant injury. The remainder of the design of this HMMWV variant is like that disclosed above.

While the apparatus has been described with reference to various embodiments, those skilled in the art will understand that various changes may be made and equivalents may be substituted for elements thereof without departing from the scope and essence of the disclosure. Additionally, many modifications may be made to adapt a particular situation or material to the teachings of the disclosure without departing from the essential scope thereof. Therefore, it is intended that the disclosure may not be limited to the particular embodiments disclosed, but that the disclosure will include all embodiments falling within the scope of the appended claims. In this application the US measurement system is used, unless otherwise expressly indicated. Also, all citations referred to herein are expressly incorporated herein by reference.

I claim:

1. An armored land vehicle comprising:
    (a) a central chassis ("CC") having a forward region, a side and a back, and adapted to receive hull portions on one or more of said sides and back of said CC, which includes:
        (i) a first hull portion, disposed on said CC forward region, and having a generally V-shaped underside with upwardly extending slanted sides, front, and back, to direct blast energy through and around the vehicle; and
        (ii) an engine compartment containing a powertrain for powering said wheeled vehicle and connected with said first hull portion and forming a blast vent through which a blast event is vented up and away from said vehicle;
    (b) at least one side or rear second hull portion affixed to said CC, said second hull portion comprising a generally V-shaped underside for directing blast energy through said engine compartment between said CC and said affixed second hull portion, and around said affixed second hull portion; and
    (c) a forward tractive unit and a rear tractive unit.

2. The armored land vehicle of claim 1, wherein at least two of said second hull portions are mounted to said CC.

3. The armored land vehicle of claim 1, further comprising a rear second hull portion mounted to the back of said CC.

4. The armored land vehicle of claim 1, wherein said second hull portion is reversibly extendable away from said CC.

5. The armored land vehicle of claim 1, wherein said second hull portion is frangibly coupled to the CC permitting said second hull portion to be dislodged from said CC by a blast event.

6. The armored land vehicle of claim 5, wherein one or more tethers are connected between said second hull portion and said CC.

7. The armored land vehicle of claim 1, wherein said second hull portion is pivotally affixed to said CC.

8. The armored land vehicle of claim 1, wherein a blast-attenuating assembly is connected between said first hull portion and second hull portion and said CC.

9. The armored land vehicle of claim 1, wherein said engine compartment, said forward tractive unit, and said rear tractive unit are formed from an open framework, thereby allowing blast energy to propagate through and around said vehicle.

10. The armored land vehicle of claim 1, further comprising an elongated central apertured skid plate.

11. The armored land vehicle of claim 1, wherein said first hull portion and said second hull portion have a sacrificial space between a floor and a bottom of the generally V-shaped part of said hull portions in which mechanical equipment is minimized.

12. The armored land vehicle of claim 1, wherein a shock attenuation system is located between a floor and a bottom of the generally V-shaped hull in said first hull portion and said second hull portion.

13. The armored land vehicle of claim 1, wherein said vehicle is tracked.

14. The armored land vehicle of claim 1, wherein said front and rear tractive unit are removable through a fastening system.

15. An armored land vehicle comprising:
(a) a central hull portion ("CHP") comprising a chassis framework having a forward region, sides and a back, and a generally V-shaped underside with upward-slanted extending sides creating multiple blast paths to direct blast energy through and around said vehicle, comprising:
(i) a first hull portion located on top of said chassis framework, and
(ii) an engine compartment open to both the upper and lower surfaces of said CHP and located between said chassis framework and adjacent to said first hull portion; said engine compartment containing a powertrain for powering said armored land vehicle and forming a blast vent through which a blast event is vented up and away from said armored land vehicle;
(iii) said chassis framework adapted to receive at least one second hull portion on said side(s) or said back of said chassis framework; and
(b) a forward tractive unit and a rear tractive unit.

16. The armored land vehicle of claim 15, further comprising a shock attenuation system located in said chassis framework or within a flooring system of one or more of said first and second hull portions.

17. The armored land vehicle of claim 15, wherein said chassis framework comprises a sacrificial space in which mechanical equipment is minimized.

18. The armored land vehicle of claim 15, wherein a second hull portion is pivotally connected to said CHP.

19. The armored land vehicle of claim 15, wherein said chassis framework carries said forward and rear tractive units, wherein said chassis framework, said engine compartment, and said forward and rear tractive units are formed from an open framework to promote venting away of a blast event from said hull portions.

20. The armored land vehicle of claim 15, wherein said front and rear tractive unit are modular and removable through a fastening system.

21. The armored land vehicle of claim 15, wherein said first hull portion and said second hull portion are integrally formed with said chassis framework.

22. The armored land vehicle of claim 15, wherein said second hull portion is connected through a fastening system that fails in a blast event allowing said second hull portion to separate from said CHP thereby absorbing and directing blast energy away from the vehicle.

23. The armored land vehicle of claim 15, further comprising an elongated central apertured skid plate.

24. The armored land vehicle of claim 15, wherein said vehicle is tracked.

25. The armored land vehicle of claim 15, further comprising an elongated second hull portion adapted to seat multiple occupants.

26. The armored land vehicle of claim 15, wherein said first hull portion and said second hull portion comprise a single assembly.

27. An armored land vehicle comprising:
(a) a chassis rail system attached to a hull having a lower surface, an upper surface, a rear surface, and a front surface, said lower surface having a generally upward sloping generally V-shaped underside creating multiple blast paths to direct blast energy through and around said vehicle,
(b) a hull portion disposed on top of said chassis rail system, and
(c) an engine compartment adjacent to said hull portion, said engine compartment comprising an engine assembly for powering said armored land vehicle and forming a blast vent through which a blast event is vented up and away from said armored land vehicle.

28. The armored land vehicle of claim 27, wherein a shock attenuation system is located within the flooring system of said hull portion.

29. The armored land vehicle of claim 27, further comprising a sacrificial space under the floor of said hull portion in which mechanical equipment is minimized.

30. The armored land vehicle of claim 27, wherein said chassis rail system includes forward and rear tractive units, wherein said chassis rail system, said forward and rear tractive units and said engine compartment are formed from an open framework to promote venting away of a blast event from said hull portion.

31. The armored land vehicle of claim 30, wherein said forward and rear tractive units are modular and removable through a fastening system.

* * * * *